United States Patent [19]

Mukunoki et al.

[11] Patent Number: 5,336,589

[45] Date of Patent: * Aug. 9, 1994

[54] PHOTOGRAPHIC MATERIAL

[75] Inventors: Yasuo Mukunoki; Yukio Shinagawa; Junichi Yamanouchi; Kiyokazu Hashimoto, all of Kanagawa, Japan

[73] Assignee: Fuji Photo Film Co., Ltd., Kanagawa, Japan

[*] Notice: The portion of the term of this patent subsequent to Sep. 15, 2009 has been disclaimed.

[21] Appl. No.: 13,995

[22] Filed: Feb. 5, 1993

Related U.S. Application Data

[63] Continuation of Ser. No. 760,042, Sep. 13, 1991, abandoned.

[30] Foreign Application Priority Data

| Sep. 14, 1990 | [JP] | Japan | 2-245794 |
| Sep. 14, 1990 | [JP] | Japan | 2-245800 |
| Sep. 14, 1990 | [JP] | Japan | 2-245807 |
| Jan. 21, 1991 | [JP] | Japan | 3-207117 |
| Apr. 4, 1991 | [JP] | Japan | 3-097887 |

[51] Int. Cl.$^5$ ............... G03C 1/76; G03C 3/00
[52] U.S. Cl. ................. 430/501; 430/140; 428/694 B
[58] Field of Search ........... 430/140, 501; 354/106; 352/236; 428/694 B

[56] References Cited

U.S. PATENT DOCUMENTS

| 2,588,765 | 3/1952 | Robijns | 430/501 |
| 4,132,552 | 1/1979 | Van Paesschen et al. | |
| 4,279,945 | 7/1981 | Audran et al. | |
| 4,302,523 | 11/1981 | Audran et al. | 430/140 |
| 4,312,585 | 1/1982 | Otsu et al. | |
| 4,445,768 | 5/1984 | Gold | 430/501 |
| 4,661,439 | 4/1987 | Ruskin | 430/449 |
| 4,827,298 | 5/1989 | Sasaki et al. | |
| 4,866,469 | 12/1989 | Shiba et al. | |
| 4,887,776 | 12/1989 | Niedospial, Jr. et al. | |
| 4,974,096 | 11/1990 | Wash | 354/76 |
| 5,057,407 | 10/1991 | Okamura et al. | 430/950 |
| 5,101,225 | 3/1992 | Wash et al. | 354/109 |
| 5,130,745 | 7/1992 | Cloutier et al. | 430/496 |
| 5,147,768 | 9/1992 | Sakakibara | 430/501 |
| 5,215,874 | 6/1993 | Sakakibara | 430/501 |
| 5,227,283 | 7/1993 | Mori | 430/140 |
| 5,229,259 | 7/1993 | Yokota | 430/140 |

FOREIGN PATENT DOCUMENTS

| 0334367 | 9/1989 | European Pat. Off. |
| 2941283 | 4/1980 | Fed. Rep. of Germany |
| 2331062 | 6/1977 | France |
| 2382325 | 9/1978 | France |
| 2-230513 | 9/1990 | Japan |
| 9004205 | 4/1990 | PCT Int'l Appl. |

OTHER PUBLICATIONS

Patent Abstracts of Japan, vol. 14, No. 512 (P-1129)(4455), Nov. 9, 1990.
Patent Abstracts of Japan, vol. 9, No. 68 (P-344)(1791), Mar. 28, 1985.

*Primary Examiner*—Charles L. Bowers, Jr.
*Assistant Examiner*—Mark F. Huff
*Attorney, Agent, or Firm*—Sughrue, Mion, Zinn, Macpeak & Seas

[57] ABSTRACT

A photographic material comprising a silver halide photographic material which has a magnetic recording layer having a coercive force of at least 400 Oe and a patrone for silver halide photographic material wherein a leading end of a silver halide photographic material wound around a spool is delivered from a film leading-out port of a main body of the patrone to the outside by rotating said spool in the direction of film delivery, said spool being rotatably provided in the main body of the patrone.

16 Claims, 10 Drawing Sheets

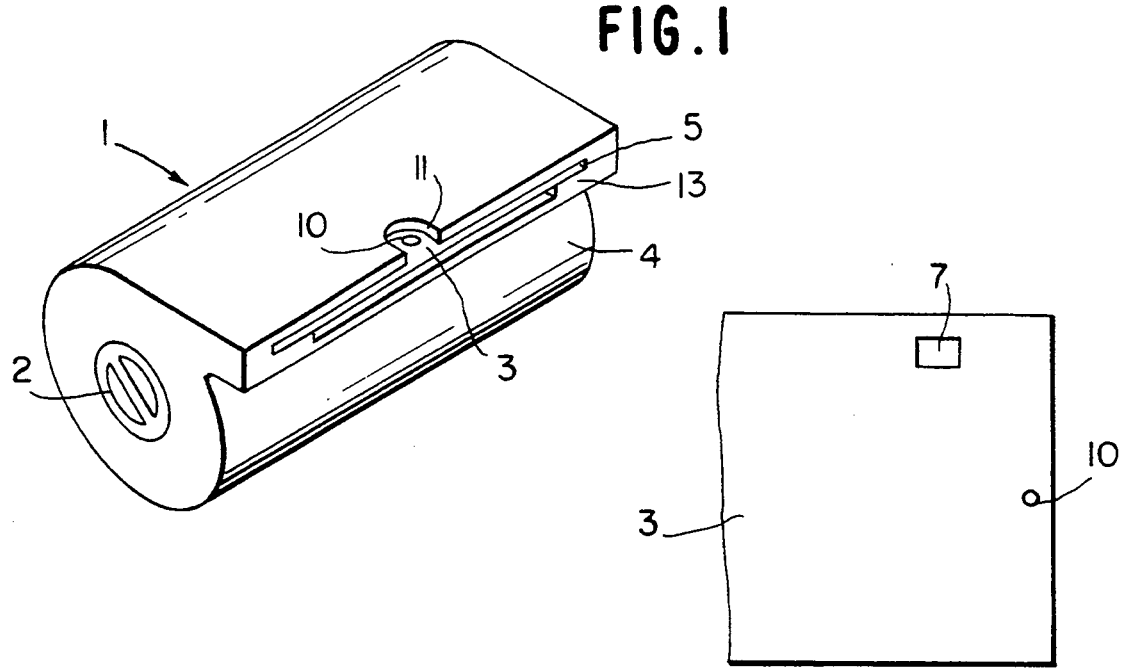
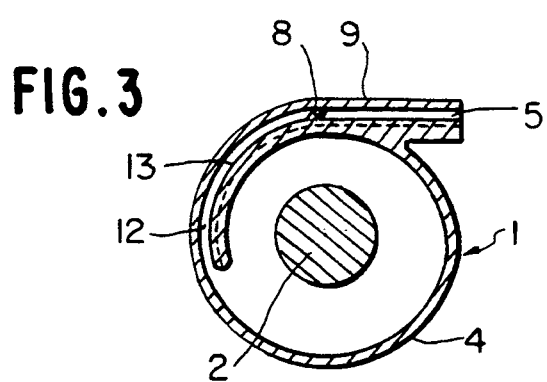
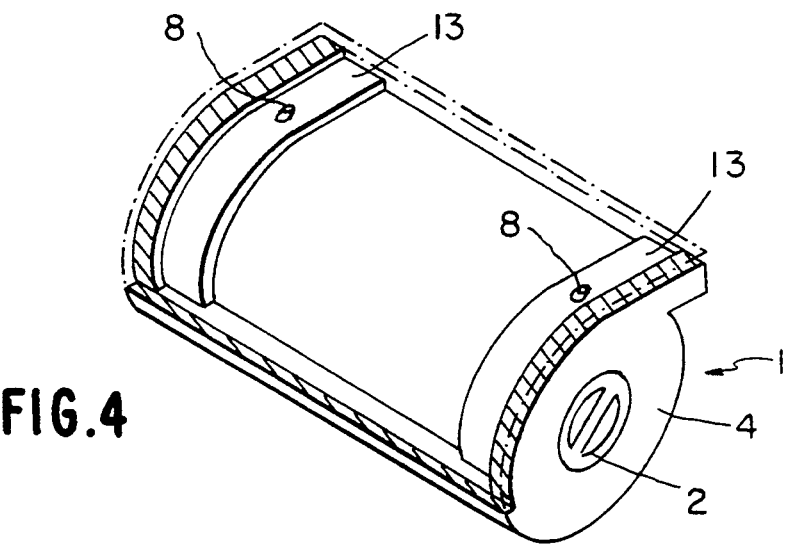

FIG. 11

| SECOND PROTECTIVE LAYER |
| FIRST PROTECTIVE LAYER |
| THIRD BLUE-SENSITIVE LAYER |
| SECOND BLUE-SENSITIVE LAYER |
| FIRST BLUE-SENSITIVE LAYER |
| YELLOW FILTER LAYER |
| THIRD GREEN-SENSITIVE LAYER |
| SECOND GREEN-SENSITIVE LAYER |
| FIRST GREEN-SENSITIVE LAYER |
| INTERLAYER |
| THIRD RED-SENSITIVE LAYER |
| SECOND RED-SENSITIVE LAYER |
| FIRST RED-SENSITIVE LAYER |
| INTERLAYER |
| ANTIHALATION LAYER |
| GELATIN UNDERCOAT |
| BASE (TAC) |
| TRANSPARENT MAGNETIC LAYER |
| FIRST BACK LAYER |
| SECOND BACK LAYER |

FIG. 12

| SECOND PROTECTIVE LAYER |
|---|
| FIRST PROTECTIVE LAYER |
| THIRD BLUE-SENSITIVE LAYER |
| SECOND BLUE-SENSITIVE LAYER |
| FIRST BLUE-SENSITIVE LAYER |
| YELLOW FILTER LAYER |
| THIRD GREEN-SENSITIVE LAYER |
| SECOND GREEN-SENSITIVE LAYER |
| FIRST GREEN-SENSITIVE LAYER |
| INTERLAYER |
| THIRD RED-SENSITIVE LAYER |
| SECOND RED-SENSITIVE LAYER |
| FIRST RED-SENSITIVE LAYER |
| INTERLAYER |
| ANTIHALATION LAYER |
| GELATIN UNDERCOAT |
| BASE (PET) |
| MAGNETIC LAYER |
| FIRST BACK LAYER |
| SECOND BACK LAYER |
| THIRD BACK LAYER |

FIG. 13

| |
|---|
| SECOND PROTECTIVE LAYER |
| FIRST PROTECTIVE LAYER |
| THIRD BLUE-SENSITIVE LAYER |
| SECOND BLUE-SENSITIVE LAYER |
| FIRST BLUE-SENSITIVE LAYER |
| YELLOW FILTER LAYER |
| THIRD GREEN-SENSITIVE LAYER |
| SECOND GREEN-SENSITIVE LAYER |
| FIRST GREEN-SENSITIVE LAYER |
| INTERLAYER |
| THIRD RED-SENSITIVE LAYER |
| SECOND RED-SENSITIVE LAYER |
| FIRST RED-SENSITIVE LAYER |
| INTERLAYER |
| ANTIHALATION LAYER |
| GELATIN UNDERCOAT |
| BASE (POLYCARBONATE) |
| MAGNETIC LAYER (STRIPE FORM) |
| FIRST BACK LAYER |
| SECOND BACK LAYER |

FIG. 14

| |
|---|
| SECOND PROTECTIVE LAYER |
| FIRST PROTECTIVE LAYER |
| THIRD BLUE-SENSITIVE LAYER |
| SECOND BLUE-SENSITIVE LAYER |
| FIRST BLUE-SENSITIVE LAYER |
| YELLOW FILTER LAYER |
| THIRD GREEN-SENSITIVE LAYER |
| SECOND GREEN-SENSITIVE LAYER |
| FIRST GREEN-SENSITIVE LAYER |
| INTERLAYER |
| THIRD RED-SENSITIVE LAYER |
| SECOND RED-SENSITIVE LAYER |
| FIRST RED-SENSITIVE LAYER |
| INTERLAYER |
| ANTIHALATION LAYER |
| GELATIN UNDERCOAT |
| BASE (POLYESTER COPOLYMER) |
| FIRST BACK LAYER |
| SECOND BACK LAYER (MAGNETIC LAYER) |
| THIRD BACK LAYER |
| FOURTH BACK LAYER |

PHOTOGRAPHIC MATERIAL

This is a continuation of application Ser. No. 07/760,042 filed Sep. 13, 1991, now abandoned.

FIELD OF THE INVENTION

This invention relates to a photographic material comprising a magnetic recordable silver halide photographic light-sensitive material (hereinafter referred to as photographic film, photographic light-sensitive material, photographic material or film) which is wound around a spool into a roll.

BACKGROUND OF THE INVENTION

In conventional photographic film patrone, a photographic film is not closely wound around a spool in the patrone, but is loosely housed therein. Hence, the photographic film cannot be delivered from the patrone to the outside even when the spool is rotated in the opposite direction from the winding direction of the film. Accordingly, one end with an appropriate length has previously been taken out of the patrone, and said one end of the photographic film has been fixed to the film delivery mechanism of a camera by a photographer.

However, this operation requires much time and great skill to some degree. There is often a possibility that failure in charging the film into the camera is made. When failure in charging the film into the camera, there is caused a problem that unphotographed photographic film is exposed.

Hence, it has been demanded to develop a camera system which can dispense with such operation.

Such a camera system can be realized by making it possible to deliver the photographic film from the inside of the patrone. If the photographic film can be delivered from the inside of the patrone, the film can be interlocked with the film delivery mechanism in the camera by delivering the one end of the film, and as a result, the operation for charging the one end of the film into the film delivery mechanism in the camera is not required.

Various informations (e.g., photographing date, weather, enlargement ratio, the number of sheets of prints, etc.) can be scarcely inputted into conventional silver halide photographic materials (hereinafter abbreviated to photographic materials). Only the photographing date can be optically inputted.

Input of information into photographic materials themselves during printing can not be made at all, and this greatly interferes with high-speed printing and reduction in costs.

Input of various informations into the photographic materials is a very important means for upping camera operability and making simplification. Magnetic recording method as a means for inputting information is a very important means because input and output can be arbitrarily made and the method is inexpensive. Accordingly, the method has been conventionally studied.

For example, providing a magnetic recording layer on the back side of the photographic material having a transparent support is described in U.S. Pat. Nos. 3,782,947, 4,279,945 and 4,302,523, said magnetic recording layer having transparency required for the photographic material during photographing and having no adverse effect on graininess. Systems for signal input into the magnetic recording layer are disclosed in WO (POT) 90-4205 and 90-04212.

Input of various informations into the photographic material which is conventionally impossible has been made possible by providing the magnetic recording layer and developing the systems for signal input and output. For example, it has been made possible that photographing date, weather, photographing conditions such as enlargement or reduction ratio, the number of reprints, places to be zoomed, development of messages and printing conditions are inputted into the magnetic recording layers of the photographic materials and outputted therefrom. Further, it can be expected that the magnetic recording layer can be utilized as a means for inputting and outputting signals when images are formed on TV/VTR by directly outputting signals from the photographic materials.

However, these methods have a problem of coloring because colored magnetic materials are contained in image area, and sufficient amounts of the magnetic materials could not be used. Accordingly, sufficient magnetic output could not be obtained. There is a serious problem that much errors during magnetic input and output are made.

When the housing (patrone) described in Japanese Patent Application No. 1-21862 is used, the operator can dispense with an operation for charging the film into the film delivery mechanism in the camera, and the developed film can be effectively kept. Further, there are advantages that arrangement and storage can be readily made by customers and processing such as an additional print can be simply made. However, there is a problem that since the spool is rotated in the camera to draw out one end of the film, plush provided on the patrone to screen light is scratched and the property with regard to magnetic input and output error is greatly deteriorated.

SUMMARY OF THE INVENTION

Accordingly, an object of the present invention is to provide a photographic material having photographically excellent transmittance which is a photographic material for use in a patrone system in which a spool rotatably provided in the main body of a patrone is rotated in the direction of film delivery.

Another object of the present invention is to provide a photographic material for use in the above-described patrone system, which is excellent in magnetic recordability.

Still another object of the present invention is to provide a photographic material which is excellent in magnetic recordability and does not cause sticking even when stored over a long period of time.

These objects of the present invention have been achieved by providing a photographic material comprising a silver halide photographic material which has a magnetic recording layer having a coercive force of at least 400 Oe and a patrone for silver halide photographic materials wherein a leading end of a silver halide photographic material wound around a spool is delivered from a film leading-out port of a main body of the patrone to the outside by rotating said spool in the direction of film delivery, said spool being rotatably provided in the main body of the patrone.

BRIEF DESCRIPTION OF THE DRAWINGS

FIG. 1 is a perspective view of a photographic film patrone according to the present invention.

FIG. 2 is a plane view of the leading end of a photographic film.

FIG. 3 is a cross-sectional view of the patrone.

FIG. 4 is a partial cutaway view showing the inside of the patrone.

FIG. 5-1 is a plane view of a magnetic recording track layer, and FIG. 5-2 is a cross-sectional view thereof.

FIG. 11 shows the layer structure of the film prepared in Examples 20 according to the present invention.

FIG. 12 shows the layer structure of the film prepared in Example 21 according to the present invention.

FIG. 13 shows the layer structure of the film prepared in Example 22 according to the present invention.

FIG. 14 shows the layer structure of the film prepared in Example 23 according to the present invention.

Figure 5A:
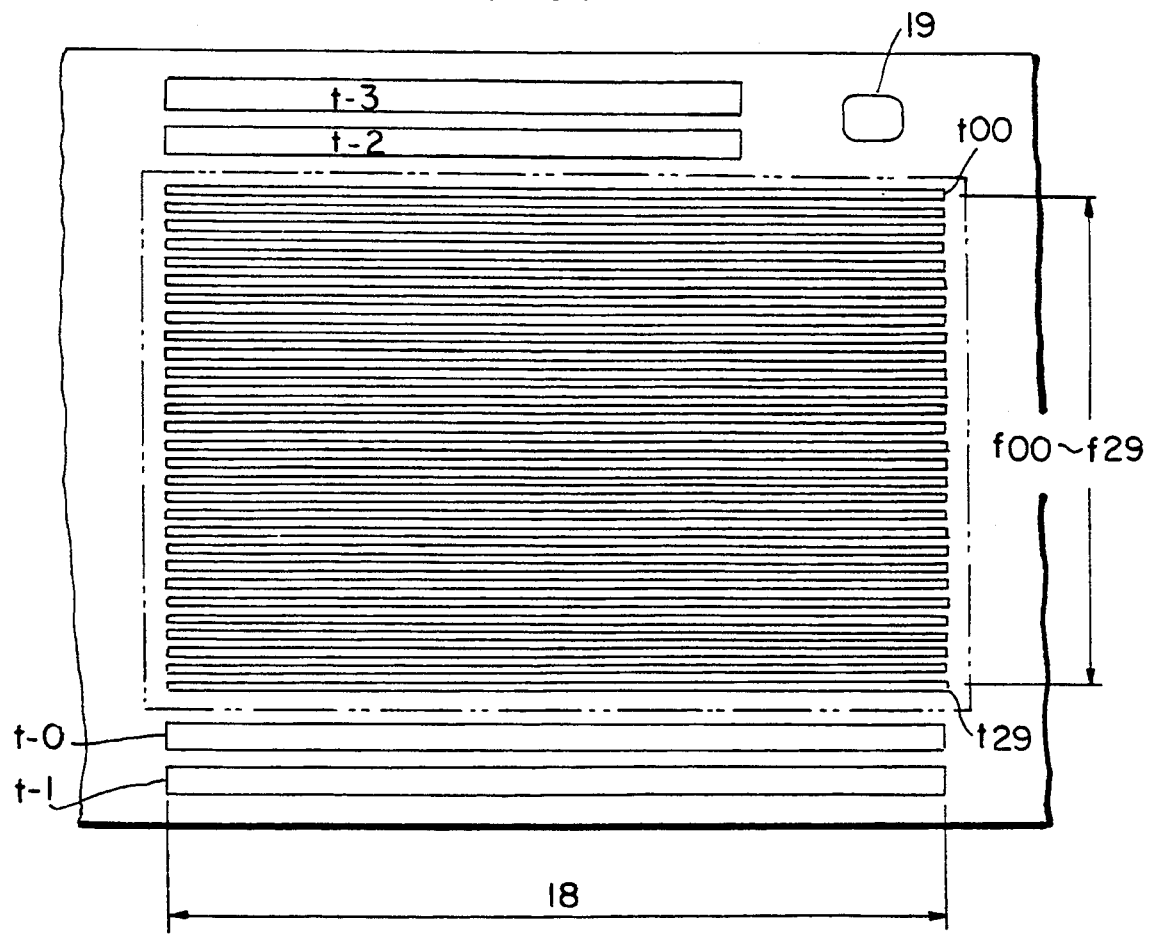

In these drawings, each numeral shows the following member.

1: Photographic film patrone,
2: Spool,
3: Photographic film,
4: Main body of patrone,
5: Film leading-out port,
7: Perforation,
8: Protuberance,
9: Protrusion,
10: Hole,
11: Notch,
12: Film passageway,
13: Step part,
14: Emulsion constituent layer,
15: Support,
16: Transparent magnetic substance layer,
17: Antistatic layer+mar resistant layer+lubrication layer,
18: One frame component,
19: Perforation,
t-0 to t-3: Magnetic recording track,
$f_{00}$ to $f_{29}$: Magnetic recording track,
120: Photographic film patrone,
101: Spool,
102: Photographic film,
103: Main body of patrone,
104: Film leading-out port,
104a: Light screening member,
106: Leading end of film,
107: Top end of film lead-out port,
108: Rib,
102a: Innermost periphery of film,
201: Photographic film patrone,
205: Photographic film,
205a: Leading end of film,
206: Spool,
206a: Flange,
206b: Flange,
206c: End part,
206d: End part,
207: Main body of patrone,
208: Side plate,
209: Side plate,
208a: Bearing opening,
209a: Bearing opening,
208b: Protruded article part,
209b: Protrusion,
211: Plush,
212: Film leading-in and -out port,
75: Spool,
76: Photographic film,
77a: Ring,
77b: Ring,
78: Main body of cartridge,
79a: Groove,
79b: Groove.

DETAILED DESCRIPTION OF THE INVENTION

The film patrone of the present invention is illustrated below.

The patrone of the present invention comprises mainly a synthetic plastic. In the molding of the plastic of the present invention, a plasticizer is optionally mixed with the plastic. Typical examples of the plasticizer include trioctyl phosphate, tributyl phosphate, dibutyl phthalate, diethyl sebacate, methyl amyl ketone, nitrobenzene, γ-valerolactone, di-n-octyl succinate, bromonaphthalene and butyl palmitate.

Concrete examples of the plastic material which can be used in the present invention include, but are not limited to, polystyrene, polyethylene, polypropylene, polymonochlorotrifluoroethylene, vinylidene chloride resins, vinyl chloride resins, vinyl chloride-vinyl acetate copolymer resins, acrylonitrile-butadiene-styrene copolymer resins, methyl methacrylate resins, vinyl formal resins, vinyl butyral resins, polyethylene terephthalate, Teflon, nylon, phenolic resins and melamine resins.

The plastic materials which are particularly preferred in the present invention are polystyrene, polyethylene and polypropylene. The patrone of the present invention may contain various antistatic agents. Preferred examples of the antistatic agents include, but are not limited to, carbon black, metal oxide particles, nonionic surfactants, anionic surfactants, cationic surfactants, betaine surfactants and polymers. Patrones to which antistatic properties are imparted by these antistatic agents are described in JP-A-1-312537 (the term "JP-A" as used herein means an "unexamined published Japanese patent Application") and JP-A-1-312538.

Particularly, those having a resistance of $10^{11}$ Ω or below at 25° C. and 25% RH are preferred.

Generally, the patrones are prepared from plastics containing carbon black or a pigment to impart light screening properties thereto.

The size of the patrone as conventionally marketed may be used. However, when the diameter of the cartridge is reduced from the current size of 25 mm to not larger than 22 mm, preferably not larger than 20 mm, but not smaller than 14 mm, camera can be effectively miniaturized.

The capacity of the patrone case is not larger than 30 cm³, preferably not larger than 25 cm³, more preferably 20 cm³. The weight of the plastic used for the patrone and the patrone case is not lower than 1 g, but not more than 25 g, preferably not lower than 5 g, but not more than 15 g.

The ratio of the internal volume of the patrone case to the weight of the plastic used for the patrone and the patrone case is 4 to 0.7, preferably 3 to 1.

In the case of the patrone containing a 135 color photographic material housed therein according to the present invention, the total weight of the plastic used for the patrone and the patrone case is generally not lower than 1 g, but not more than 25 g, preferably not lower than 5 g, not more than 15 g. Any of patrones can be used in the present invention without particular limitation with regard to the shape thereof.

Figure 5B:
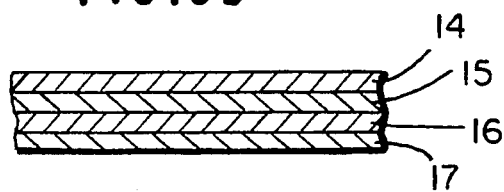

It is preferred that there is ,used a new camera to be fitted to the patrone containing a photographic material housed therein according to the present invention. FIG. 1 shows one embodiment of the patrone according to the present invention. FIGS. 2 to 4 show the inner structure thereof. FIG. 5 illustrates the magnetic recording track of the film. Further, the patrone which is used in the present invention and delivers the film by the rotation of the spool is illustrated blow. An example of the patrone includes patrone described in Japanese Patent Application No. 1-21862.

Figure 6A:
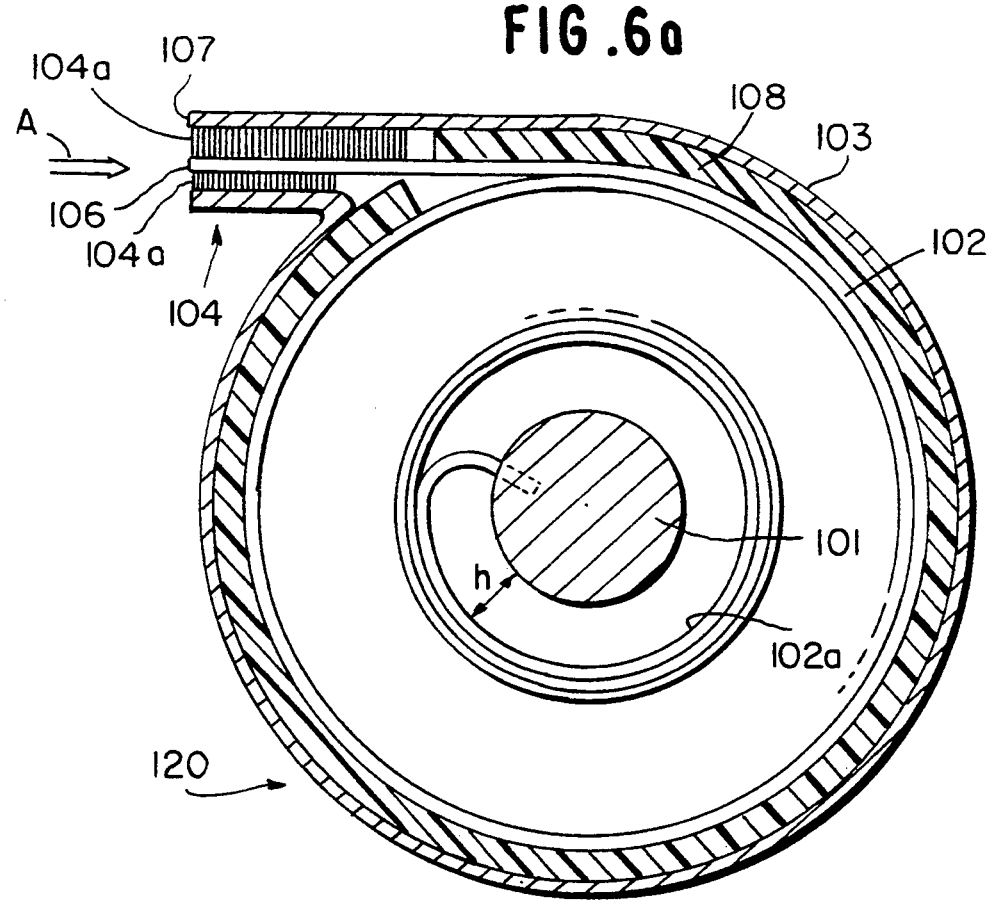
FIG. 6(a) and 6(b) show each another embodiment of the patrone.
Figure 6B:
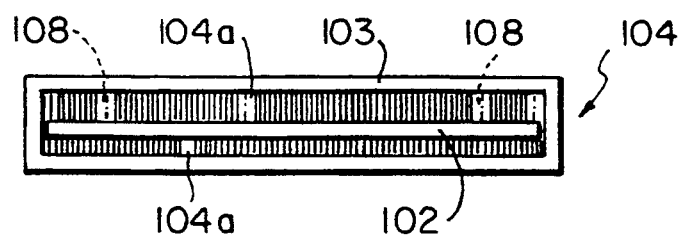

FIG. 6 shows another embodiment of the patrone which can be used in the present invention. A photographic film patrone 120 comprises a spool 101, a photographic film 102 and a main body 103 of the patrone. The film is wound around the spool 101 into a roll, and one end thereof is locked by the spool 101. The spool 101 is provided in the inside of the main body 103 of the patrone so that it is rotatable round its longitudinal axis. The main body 103 of the patrone can be externally rotated. The main body 103 of the patrone is provided with a photographic film leading-out port 104 for drawing out the film 102. The inner surface of the photographic film leading-out port 104 is provided with a light screening member 104a to thereby keep the inside of the main body 103 of the patrone in a light screening state.

In the photographic film patrone 120, a pair of ribs 108 having a width of about 15 to 20% of the width of the film extend in the circumferential direction along the inner surface of the main body 103 of the patrone and are provided on both ends of the film 102 in the crosswise direction. The ribs 108 are opened towards the direction of the film leading-out port 104 so that the film 102 can be led out from the film leading-out port 104. A leading end 106 of the film 102 is arranged so as to be adjusted to a top end 107 of the photographic film leading-out port 104.

The ribs 108 are abutted against the outermost periphery of the film 102 to thereby press a roll of the film 102 from the outermost periphery, whereby a state where the film 102 is closely wound around the spool 101 can be kept.

Figure 7:
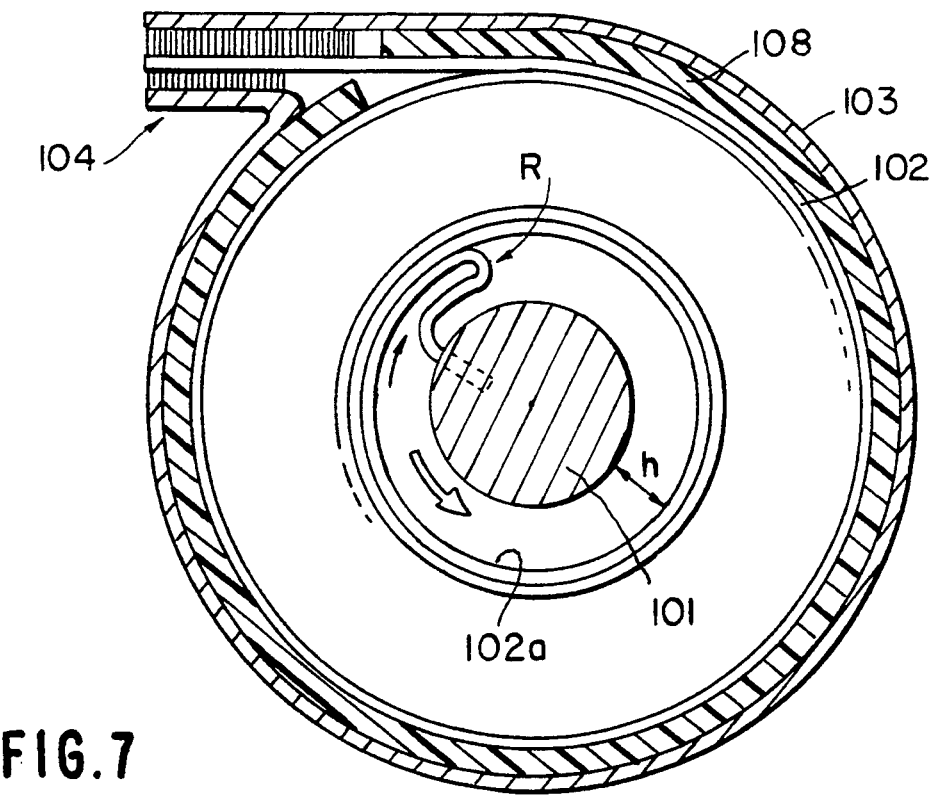
FIGS. 7, 8, 9 and 10 (a, b, c) each illustrates still another embodiment of the patrone which can be used in the present invention.

The outer diameter of the spool 101 is determined in the following manner. As described above, it is difficult that the film 102 is closely wound around the spool 101 into a roll while the innermost periphery 102a of the film is in contact with the outer periphery of the spool 101. Hence, it can not be avoided that a gap is formed between the innermost periphery 102a of the film and the spool 101. When a space h between the innermost periphery 102a of the film and the spool 101 is too large, a contrarotation phenomenon is caused as shown in FIG. 7. Thus, the outer diameter of the spool 101 is set so that the space h between the innermost periphery 102a of the film and the spool 101 becomes 2 mm or shorter when a gap therebetween is formed. Namely, the outer diameter can be determined by the following formulas.

$$b/2 = a/2 + h + c \cdot d + t$$

wherein a is the outer diameter of the spool; b is the inner diameter of the main body of the patrone; t is the thickness of the rib; c is the thickness of the film; and d is the number of turns of the roll and varies depending on the length of the film.

*Therefore,* $a/2 = b/2 - t - h - c \cdot d$

The space h can be determined by the following formula.

$$h = b/2 - a/2 - c \cdot d - t$$

When $h \leq 2$ mm, the outer diameter a of the spool can be determined by the following formula $$b/2 - t - c \cdot d - 2 \leq a/2$$

The contrarotation phenomenon of the photographic film 102 can be prevented from being caused when the h is set to 2 mm or shorter and the revolving torque of the spool is set to 0.8 kgf·cm or below.

It is not necessary that the ribs 108 are wholly provided in the circumferential direction along the inner surface of the main body 103 of the patrone. The ribs 108 may be partially provided in the circumferential direction along the inner surface of the main body 103 of the patrone. The ribs 108 may be provided on both sides of the film in the crosswise direction or may be wholly provided on the film 102 in the crosswise direction.

The material of the ribs 108 is chosen from among materials by which the film is difficultly marred (it is not necessary that the material is fully mar-resistant). For example, a member such as urethane which is somewhat elastic, may be chosen. The thickness of the rib 108 is determined so that the rib 108 composed of urethane is shrunk when the film 102 as closely wound around the spool is charged into the main body 103 of the patrone. Since the outer periphery of the roll of the film 102 is pressed by the elastic force of the shrunk ribs 108, the state where the film is closely wound up can be kept even when the film 102 is drawn out by a considerable length and the outer diameter of the roll is reduced.

The light screening of the film leading-out port may be arbitrarily made. Conventional felt light screening member called plush may be used. The film leading-out port may be formed so that the port can be opened or closed. The port may be closed when not required. It is not always necessary that the leading end 106 of the film 102 is arranged so as to be adjusted to the top end 107 of the film leading-out port 104. The leading end 106 may be housed in the inside of the main body 103 of the patrone, but it is desirable that the leading end 106 may be housed in the film leading-out port 104.

Further, there can be mentioned the patrones described in JP-A-3-37645 in which the film is delivered by rotating the spool while deforming the flange of the spool and pressing also the end part of the outermost periphery of the roll of the film.

Figure 8:
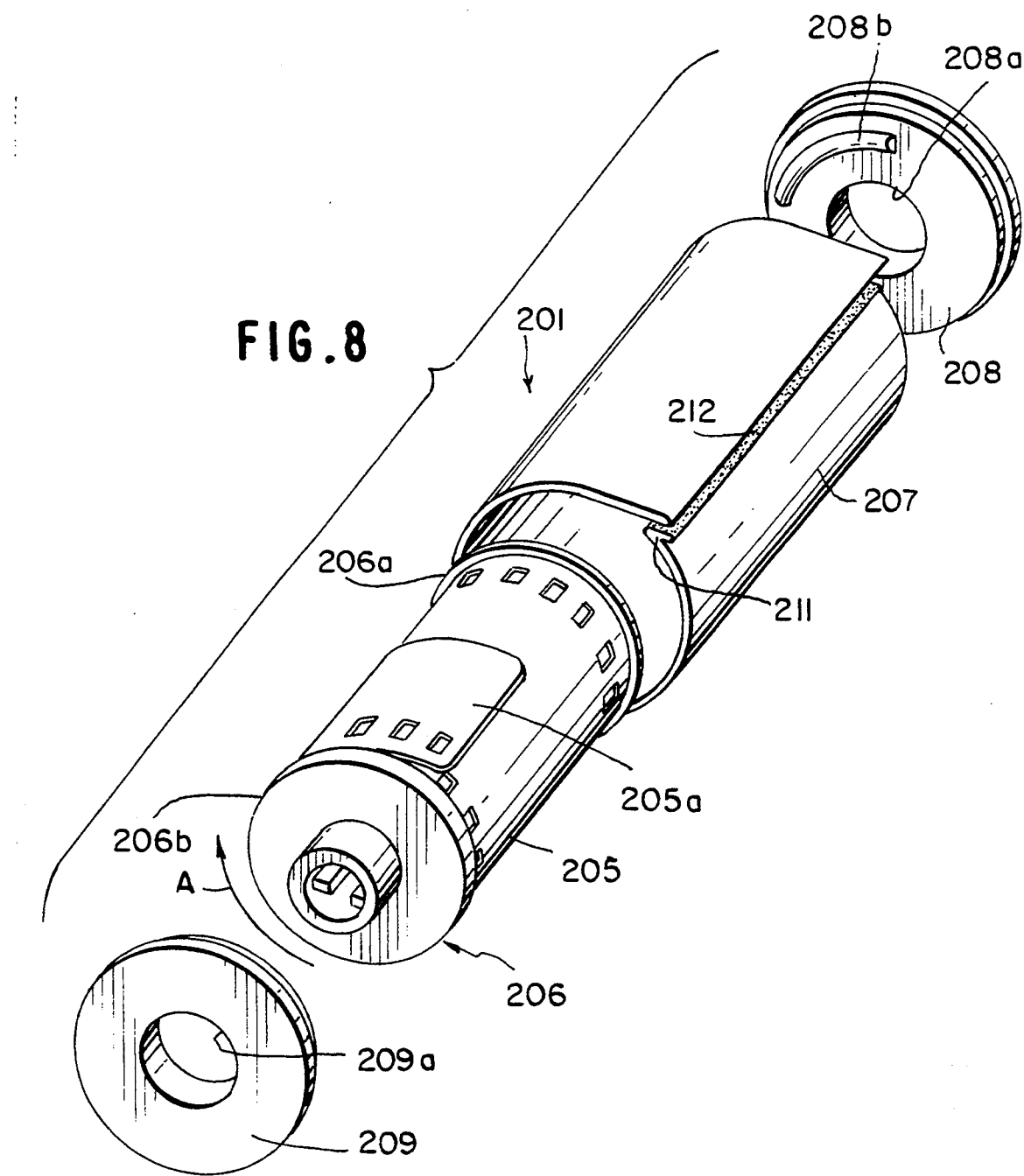

FIG. 8 shows a photographic film patrone in the disassembled form. A photographic film patrone 201 comprises a spool 206 around which a photographic film 205 is wound, a main body 207 of the patrone (the spool together with the film being housed in the main body) and side plates 208, 209 which rotatably support the spool 206 and closely shut the main body 207 of the patrone against light.

The spool 206 is provided with a flange 206a which is thin and flexible and a flange 206b which is thick and not flexible. They are integrally formed by using a plastic. The terminal of the photographic film 205 is fixed to the spool 206 between the flange 206a and the flange 206b, and the film 205 is wound around the spool 206 into a roll in such a manner that edges are wound along the inner sides of the flanges 206a, 206b. The film 205 including the leading end is completely wound up in the main body 207 of the patrone. The main body 207 of the patrone is provided with a film leading-in and -out port 212 to which a light-screening plush 211 is bonded.

A bearing opening 208a which rotatably supports an end part 206c (see, FIG. 9) of the spool 206 is provided in the central part of the side plate 208. A protruded article part 208b which presses a part of the flange 206a is provided on the inner wall thereof. A bearing opening 209a which rotatably supports an end part 206d of the spool 206 is provided in the central part of the side plate 209. In the vicinity thereof, there is provided a protrusion 209b (see, FIG. 9) to reduce friction between the inner wall of the side plate 209 and the protrusion 209b.

Figure 9:
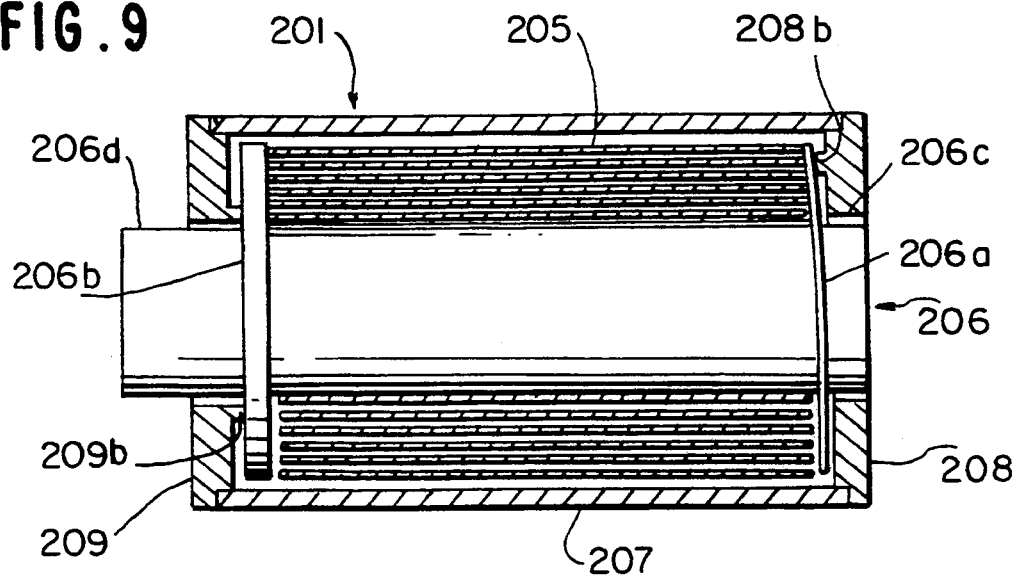

In FIG. 9 which shows a cross-sectional view of the photographic film patrone 201, the size of the inner side of the protruded article part 208b and the protrusion 209b is so set that the size is smaller than the size of the outer side of the flanges 206a, 206b. The flange 206a is pressed by the protruded article part 208b to deform it, whereby the edges of the film 205 on the outer side thereof can be held by the flanges 206a, 206b more firmly than the edges of the film 205 on the inner side thereof. Accordingly, when the spool 206 is rotated in the direction of an arrow A of FIG. 8, a leading end 205a of the photographic film 205 is delivered from the film leading-in and -out port 212 of the main body 207 of the patrone to the outside by the frictional interlocking of the flanges 206a, 206b with the edges of the film 205.

In the above structure, the size of the inner side of the protruded article part 208b and the protrusion 209b can be made larger than the size of the outer size of the flanges 206a, 206b. In this case, when the spool 206 as a part of a camera is pushed from the flange 206b toward the flange 206a, the size of the inner side of the flanges 206a, 206b becomes smaller than the size of the photographic film 205 and the edges of the photographic film 205 can be pressed, whereby the photographic film 205 can be delivered from the main body 207 of the patrone to the outside by the rotation of the spool 206.

Further, patrones described in U.S. Pat. Nos. 4,834,306, 4,846,416 and 4,832,275 can be preferably used.

Figure 10A:
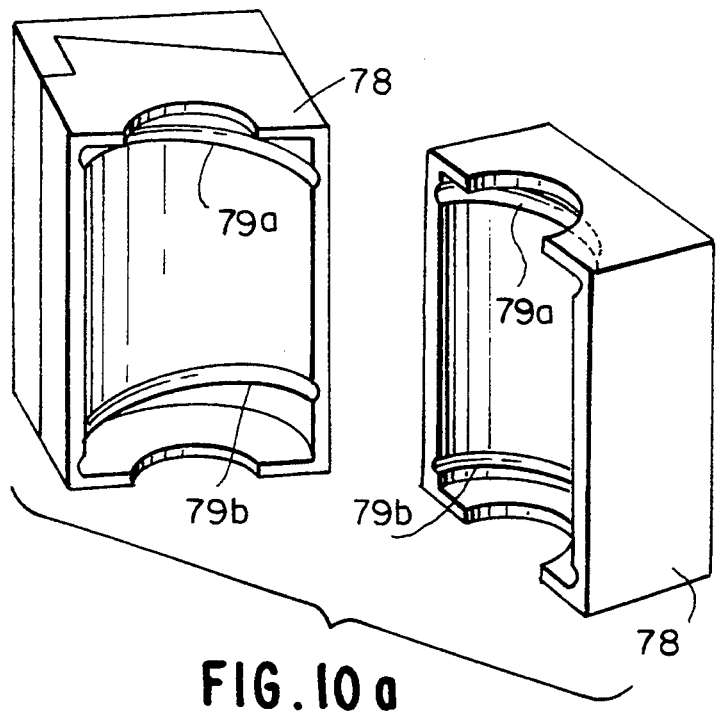
Figure 10B:
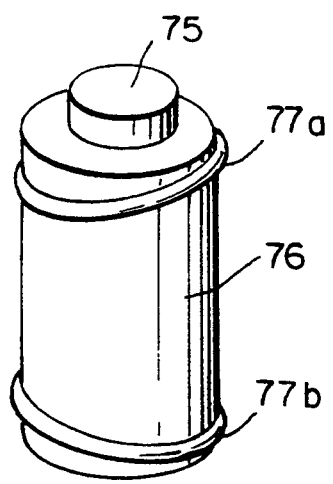
Figure 10C:
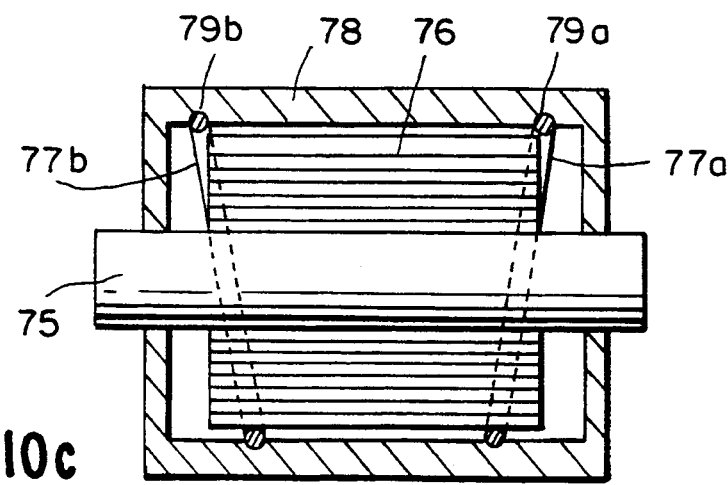

An example thereof is shown in FIG. 10(a), (b) and (c). A photographic film 76 which is closely wound around a spool 75 into a roll can be kept in the form of a roll of a film as closed wound around the spool 75 by a pair of rings 77a, 77b provided at both ends thereof. In the inside of a main body 78 of the cartridge, grooves 79a, 79b into which the rings 77a, 77b are fitted are formed at an angle of a slope to the axis of the main body 78 of the cartridge. Accordingly, the rings 77a, 77b are abutted against the outer periphery of the roll of the photographic film 76 at an angle of a slope to the axis of the spool 75, whereby the winding of the photographic film 76 can be prevented from loosening as shown in FIG. 10(b) and (c). The rings 77a, 77b can be rotated along the grooves 79a, 79b, while they are sliding in the grooves 79a, 79b.

The photographic film 76 is kept in the form of a roll of a film as closely wound around the spool 75. Accordingly, when the spool 75 is rotated in the opposite direction from the winding direction of the film, the film 76 can be delivered from a photographic film leading-out port (not shown).

The magnetic recording layer of the present invention is illustrated below.

The magnetic recording layer of the present invention has a coercive force of at least 400 Oe, preferably at least 500 Oe, and more preferably 600 to 1100 Oe. If the coercive force is lower than 400 Oe, the inputted information readily disappears and an output error is caused. On the other hand, if it exceeds 1100 Oe, an excessive voltage is required at inputting, and it is difficult to rewrite the inputted recording information.

Examples of ferromagnetic substances which can be used for the magnetic recording layer of the present invention include ferromagnetic iron oxide, Co-doped ferromagnetic iron oxide, ferromagnetic chromium dioxide, ferromagnetic metals, ferromagnetic alloys and barium ferrite.

Examples of the ferromagnetic alloys include those having a metallic component content of at least 75% by weight wherein at least 80% by weight of said metallic component comprises at least one ferromagnetic metal or alloy (e.g., Fe, Co, Ni, Fe-Co, Fe-Ni, Co-Ni, Co-Fe-Ni), and not more than 20% by weight of the metallic component comprises other component (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, Bi). The ferromagnetic metallic component may contain a small amount of water, a hydroxide or an oxide.

Method for preparing these ferromagnetic substances are known. The ferromagnetic substances which can be used in the present invention can be prepared by conventional methods.

The ferromagnetic substances having various shapes and sizes can be used without particular limitation with regard to shape and size.

When the ferromagnetic substances are used in the form of a powder, the powder may be any of a needle form, a rice grain form, a spherical form, a cubic form or a plate form, However, needle powder and plate powder are preferred from the viewpoint of electromagnetic characteristics. Though there is no particular limitation with regard to crystallite size and specific surface area, the crystallite size is preferably not larger than 400 Å and the specific surface area ($S_{BET}$) is preferably not smaller than 20 m$^2$/g, particularly preferably not smaller than 30 m$^2$/g.

There is no particular limitation with regard to the pH of the ferromagnetic powder and the surface treatment thereof. The surface of ferromagnetic powder may be treated with materials containing titanium, silicon or aluminum element or organic compounds such as carboxylic acids, sulfonic acids, sulfuric esters, phosphoric esters or adsorbing compounds having a nitrogen-containing heterocyclic ring (e.g., benztriazole). Preferred pH is in the range of 5 to 10. When fine powder of ferromagnetic iron oxide is used, the ratio of iron(II) to iron(III) is not critical.

The content of ferromagnetic fine powder is from $4 \times 10^{-4}$ to 3 g, preferably from $10^{-3}$ to 2 g, more preferably from $4 \times 10^{-3}$ to 1 g, per m$^2$ of the support.

The magnetic recording layer of the present invention can be provided by incorporating the magnetic material in a binder solution, co-extruding it together with support, laminating a film of the magnetic material onto the support, or depositing the magnetic material. Examples of binders used in the binder solution for forming magnetic recording medium include conventional binders such as thermoplastic resins, thermosetting resins, radiation-curable resins, reactive resins and mixtures thereof.

The binder resins having a glass transition temperature (Tg) of from $-40$ to $150°$ C. and a weight-average molecular weight of from 10,000 to 300,000, preferably 10,000 to 100,000.

Examples of the thermoplastic resins include vinyl copolymers such as vinyl chloride-vinyl acetate copolymers, copolymers of vinyl chloride and vinyl acetate with vinyl alcohol, maleic acid and/or acrylic acid, vinyl chloride-vinylidene chloride copolymers, vinyl chloride-acrylonitrile copolymers and ethylene-vinyl acetate copolymers; cellulose derivatives such as nitrocellulose, cellulose acetate propionate and cellulose acetate butyrate; acrylic resins, polyvinyl acetal resins, polyvinyl butyral resins, polyester polyurethane resins, polyether polyurethane resins, polycarbonate polyurethane resins, polyester resins, polyether resins, polyamide resins and amino resins; rubbery resins such as styrene-butadiene resins and butadieneacrylonitrile resins; silicone resins, fluoro resins and biolytic binders.

Examples of the radiation-curable resins include those obtained by bonding a group having a carbon-to-carbon unsaturated bond as a radiation-curable functional group to the above thermoplastic resins. Preferred functional groups include acryloyl group and methacryloyl group.

A polar group (e.g., epoxy group, $CO_2M$, $OH$, $NR_2$, $NR_3X$, $SO_3M$, $OSO_3M$, $PO_3M_2$, $OPO_3M_2$, wherein M is hydrogen atom, an alkali metal or ammonium, and two or more M's may be the same or different when two or more M's exist in one group; and R is hydrogen or an alkyl group) may be introduced into the molecules of the above binders.

The above-described high-molecular binders may be used alone or as a mixture of two or more of them. Hardening can be conducted by adding conventional isocyanate crosslinking agents and/or radiation-curable vinyl monomers.

Hydrophilic binders can be used in the magnetic recording layer of the present invention. Usable hydrophilic binders include water-soluble polymers, cellulose esters, latex polymers and water-soluble polyesters described in *Research Disclosure* No. 17643, page 26 and ibid., No. 18716, page 651. Examples of the water-soluble polymers include gelatin, gelatin derivatives, casein, agar-agar, sodium alginate, starch, polyvinyl alcohol, polyacrylic acid copolymers and maleic anhydride copolymers. Examples of the cellulose esters include carboxymethyl cellulose and hydroxyethyl cellulose. Examples of the latex polymers include vinyl chloride copolymers, vinylidene chloride copolymers, acrylic ester copolymers, vinyl acetate copolymers and butadiene copolymers. Among them, gelatin is most preferred.

There can be used any of gelatin including alkali-processed (lime-processed) gelatin prepared by alkali bath immersion before the extraction of gelatin, acid-processed gelatin prepared by acid bath immersion before extraction, alkali- and acid-processed gelatin and enzyme-processed gelatin. If desired, a part of gelatin may be replaced with colloidal albumin, casein, cellulose derivatives (e.g., carboxymethyl cellulose, hydroxyethyl cellulose), sugar derivatives (e.g., agaragar, sodium alginate, starch derivatives, dextran), synthetic hydrophilic colloid (e.g., polyvinyl alcohol, poly-N-vinylpyrrolidone, polyacrylic acid copolymers, polyacrylamide or derivatives or partial hydrolyzates thereof) or gelatin derivatives.

The gelatin-containing magnetic recording layer is preferably hardened with a hardening agent for gelatin. Examples of suitable hardening agents include aldehyde compounds, e.g., formaldehyde and glutaraidehyde; ketone compounds, e.g., diacetyl and cyclopentanedione; bis(2-chloroethylurea); 2-hydroxy-4,6-dichloro-1,3,5-triazine; compounds containing a reactive halogen atom described in U.S. Pat. Nos. 3,288,775 and 2,732,303 and British Patents 974,723 and 1,167,207; divinyl sulfone; 5-acetyl-1,3-diacryloylhexahydro-1,3,5-triazine; compounds containing a reactive olefin as described in U.S. Pat. Nos. 3,635,718 and 3,232,763 and British Patent 994,869; N-hydroxymethylphthalimide; N-methylol compounds described in U.S. Pat. Nos. 2,732,316 and 2,586,168; isocyanate compounds described in U.S. Pat. No. 3,103,437; aziridine compounds described in U.S. Pat. Nos. 3,107,280 and 2,983,611; acid derivatives described in U.S. Pat. Nos. 2,725,294 and 2,725,295; epoxy compounds described in U.S. Pat. No. 3,091,537; and halogencarboxyaldehydes, e.g., mucochloric acid. In addition, inorganic hardening agents, such as chromium alum, zirconium sulfate, and carboxyl-activated hardening agents disclosed in JP-B-56-12853 (the term "JP-B" as used herein means an "examined published Japanese patent Application"), JP-B-58-32699, Belgian Patent 825,726, JP-A-60-225148, JP-A-51-126125, JP-B-58-50699, JP-A-52-54427, and U.S. Pat. No. 3,321,313, are also suitable.

The hardening agent is typically used in an amount of from 0.01 to 30% by weight, and preferably from 0.05 to 20% by weight, based on the weight of dry gelatin.

Acid-decomposable binders, alkali-decompsable binders or biolytic binders are illustrated below.

Any of acid-or alkali-decomposable binders can be used, so long as the solubility thereof is abruptly increased by a treatment under acidic or alkaline conditions over a long period of time (at least one hour) and the binders are isolated from the support, or the binders are chemically decomposed under acidic or alkaline conditions and isolated from the support.

Preferred examples of these binders include cellulose derivatives (e.g., monoacetylcellulose, diacetylcellulose, propionylcellulose, hydroxyethyl cellulose, methyl cellulose), poly(meth)acrylic esters [e.g., examples of ester residue include hydroxyalkylor aryl group (e.g., hydroxyethyl, hydroxyethylphenyl), carboxyalkyl or aryl group (e.g., carboxyethyl, carboxyphenyl), aminoalkyl-or aryl group (e.g., aminoethyl, aminoethylphenyl) and poly(meth)acrylamides [e.g., poly-(N,N-dihydroxyethylacrylamide)].

Preferred examples of the biolytic binders include poly($\beta$-hydroxyalkanoate), polycaprolactone, starch and starch-containing polymers (e.g., polyethylene, polypropylene). More preferred are polymers mainly composed of poly(3-hydroxyvalerate), poly(3-hydroxybutyrate or poly(4-hydroxybutyrate), starch-containing polyethylene and starch-containing polypropylene.

The details thereof are described in *Biolytic Plastics—Kaigai Doko Chosa Hokokusho* (Jun. 1989, published by Bioindustry Society. In the recovery of the support by removing the magnetic substance layer containing the acid- or alkali-decomposable or biolytic binder or a binder layer which forms a layer on the support from the photographic material, it is preferred that the photographic material is previously finely divided to accelerate the solubility or decomposability of the binder. It is also preferred that a treating bath for use in the decomposition of the binder is properly heated or stirred, or air is blown into the bath. In the treatment of the photographic material containing the acid- or alkali-decomposable or biolytic binder, a treating solution is generally used. Though there is no particular limitation with regard to solvents for use in the treatment of the photographic material, preferred solvents include water, alcohols (e.g., methanol, ethanol, propanol), ketones (e.g., acetone, methyl ethyl ketone, acetophenone) and mixed solvents thereof.

Preferred acid and alkaline compounds which can be used in the present invention include acid compounds such as hydrochloric acid, sulfuric acid, nitric acid, phosphoric acid and acetic acid and alkaline compounds such as sodium hydroxide, potassium hydroxide, lithium hydroxide, calcium hydroxide and ammonia. Among them, hydrochloric acid, sulfuric acid, sodium hydroxide and potassium hydroxide are particularly preferred.

Method for decomposing and treating the photographic material containing the biolytic binder is illustrated below.

In the present invention, the recovered photographic material is finely divided and treated with a gelatinase such as amylase, when gelatin emulsion is contained, to remove the gelatin emulsion. The resulting material is then decomposed in activated sludge to remove the magnetic recording layer. Activated sludge of *Kagakuhin Kensa Kyokai Kagakuhin Anzen Center* (CBC) can be used, though there is no particular limitation with regard to the activated sludge to be used.

Decomposition rate can be expedited by blowing air into the bath and keeping the temperature at 20° to 35° C. A time required for decomposing the biolytic polymers of the present invention in the above method is such that a longer time is better. However, when a recovery efficiency in the present invention is taken into consideration, the time is preferably at least 12 hours, but not longer than 20 days, more preferably not shorter than one day, but not longer than 7 days.

A crosslinking agent may be added to the magnetic substance layer containing the acid- or alkali-decomposable or biolytic binder or the constituent layers nearer the support than the magnetic substance layer. Examples of such crosslinking agent include epoxy type, isocyanate type and silane coupling type crosslinking agents.

The thickness of the magnetic recording layer is 0.1 to 10$\mu$, preferably 0.2 to 5$\mu$, more preferably 0.5 to 3$\mu$.

It is preferred that the magnetic recording layer is provided on the back side of the photographic material. The magnetic recording layer can be provided on the whole surface of the back of a transparent support or in the stripe form on the back of the support by coating or printing. It is preferred that the transparent support having the magnetic recording layer is prepared by cocasting a polymer containing magnetic particles dispersed therein and a polymer for preparing the transparent support in the striped form. In this case, it is preferred that the compositions of two polymers are substantially the same.

Methods for coating the magnetic recording layer in the stripe form include air doctor coating, blade coating, air knife coating, squeeze coating, dip coating, reverse roll coating, transfer roll coating, gravure coating, kiss roll coating, cast coating and spray coating. If desired, other coating methods can be used. The details thereof are described in *Coating Engineering*, pp. 253–277 (Mar. 20, 1971, Asakura Shoten)

Magnetic powder in the magnetic layer coated on the support in the manner described above is subjected to an orientation treatment while the magnetic layer is optionally dried immediately. The thus-formed magnetic layer is then dried. The conveying rate of the support is generally 10 to 500 m/min, and the drying temperature is controlled to from 20° to 120° C. A surface smoothing processing is optionally carried out to prepare the magnetic recording medium of the present invention. For example, these methods are described in JP-B-40-23625, JP-B-39-28368 and U.S. Pat. No. 3,473,960. It is considered that the method described in JP-B-41-13181 is a basic and important technique in this field.

The magnetic recording layer may be formed in the stripe form by depositing method. The magnetic recording layer in the stripe form can be formed by using ferromagnetic iron and covering non-striped area by a certain method. For example, deposition is carried out by sticking a tape on the non-striped area, or deposition is carried out in the striped form by using a depositing device provided with window.

These deposition methods can be achieved by applying the methods described in JP-A-56-139095, JP-A-56-181479 and JP-A-60-157717.

It is preferred that the stripe-form magnetic recording layer is provided on other area than the image forming area of the film. The number of stripes may be at least one. For example, one stripe or two or more stripes may be provided on one edge of the surface of the film. When two stripes are present, one of them contains a large amount of a magnetic material and is opaque, and the other contains a small amount of a magnetic material. Two stripe-form magnetic recording layers may be present on both edges of the surface of the film wherein one of them is opaque and the other is transparent. When the stripe-form magnetic recording layer is transparent, there is a merit that optical recording can be made and the magnetic recording layer can be provided without detriment to conventional optical system. Further, there is no problem even when the stripe is transparent.

Further, when the stripe-form magnetic recording layer is provided, the non-stripe part is generally depressed in comparison with the stripe part. Hence, there are caused various problems. For example, there are caused problems that adhesion is deteriorated, photographic pressure fogging in the vicinity of the stripe is caused and powder on the edge of the stripe drops out when the photographic material is stored under high temperature and humidity condition over a long period of time.

A method for solving these problems is that the stripe-form magnetic recording layer and the non-stripe part are provided on the same plane. Namely, the non-stripe part other than the stripe-form magnetic recording layer is coated with the non-magnetic recording layer having the same thickness as that of the stripe layer.

The non-magnetic layer may be provided by any method. For example, the magnetic recording layer in the stripe form is coated on the photographic material by coating, printing, deposition or transfer, and the non-magnetic recording layer is then coated by separating it from the magnetic recording layer.

The magnetic recording layer and the non-magnetic recording layer may be simultaneously coated. For example, a coating solution for the magnetic recording layer and a coating solution for the non-magnetic recording layer may be alternately extruded by using a Giesser which is partitioned on the same plane. Alternatively, said solutions are alternately coated when a gravure coater is used.

In addition to the method wherein the coating solutions are extruded on the same plane, the coating solutions are separately extruded on different planes to form a stripe, whereby the thickness of the stripe-form magnetic recording layer and that of the non-magnetic recording layer can be made the same.

Further, the stripe-form magnetic recording layer can be provided when the support is prepared. Namely, there is used a cocasting die having a plurality of manifolds wherein the cross-sectional form of the slits of one or two manifolds is in the form of the teeth of a comb. When the cross-sectional form of the slits of two manifolds is in the form of the teeth of a comb, the coating solutions are joined together so as to allow the openings of the slits to be interpolated alternately in the crosswise direction. In this way, the object can be achieved by the method for preparing a photographic film support using a die capable of cocasting a stripe without causing a difference in level.

In the method for preparing a film by cocasting wherein a plurality of solutions are coextruded by using a die having a plurality of manifolds, adjoining manifolds among the manifolds have slits having a cross section in the form of the teeth of a comb, and the solutions through said two manifolds are joined together so as to allow the openings of the slits in the form of the teeth of a comb to be interpolated alternately in the crosswise direction, whereby there can be prepared a support having a stripe-form magnetic recording layer and a uniform thickness.

Binders for forming the non-magnetic recording layer part having the same thickness as that of the stripe-form magnetic recording layer of the present invention include those for forming the stripe-form magnetic recording layer. It is preferred that the binder for forming the magnetic recording layer is the same as that for forming the non-magnetic recording layer.

The magnetic substance layer can be provided on the whole surface of the support by molding a binder containing a magnetic substance and the support into a film as described in JP-A-2-29920. The binder containing a magnetic substance may be a polymer having the same composition as that of the support.

Further, a film containing a magnetic substance may be laminated onto the support of the present invention as described in JP-A-57-25954.

The magnetic recording layer may be designed so as to have functions capable of improving lubricity, controlling curling, exhibiting antistatic properties and preventing sticking from being caused. Separately, layers exhibiting these functions may be provided. If desired, a protective layer adjacent to the magnetic recording layer may be provided to improve mar resistance.

The S/N ratio of magnetic signals can be improved by calendering the back of the transparent support having the magnetic recording layer to improve smoothness. In the case, it is preferred that light-sensitive layers are coated on the transparent support after calendering.

The photographic film which can be used in the present invention may be an undeveloped film, that is, a raw film before development or a developed film.

It is preferred that both sides of a raw film or a developed film to be housed in the patrone having the film delivery function of the present invention have a coefficient of static friction of not higher than 0.25. The coefficient of static friction according to the present invention is illustrated below.

The term "coefficient of static friction of not higher than 0.25" as used herein refers to a value obtained by moisture conditioning a sample at 25° C. and 60% RH and then measuring a coefficient of static friction by using a 5 mm$\phi$ stainless steel ball and HEIDON-10 static friction coefficient-measuring apparatus. A smaller numerical value means better slipperiness (lubricity).

When a coefficient of static friction is lowered, friction between the emulsion layer side of the film and the back side thereof, the inner surface of the patrone and the film, or the film and the outlet of the patrone in the delivery of the film from the patrone by the rotation of the film can be reduced, a reduction in driving torque can be achieved and the film can be prevented from being marred.

The film of the present invention has a coefficient of static friction of preferably not higher than 0.25, more preferably not higher than 0.23, still more preferably not higher than 0.21, particularly preferably not higher than 0.20. It is preferable that both the emulsion side and the back side have a lower coefficient of static friction. It is more preferable that the back side has a lower coefficient of static friction.

The film of the present invention can be designed so as to have a coefficient of static friction of not higher than 0.25 by containing a slip agent (lubricant) in the emulsion layer and back layer of the film. It is particularly preferred that the slip agent is contained in the outermost layers of both sides.

The slip agent can be contained in the layers by using a coating solution containing the slip agent. After the film is prepared, the slip agent may be deposited thereon. Further, the slip agent can be added to the film by immersion method, spray method, dip coating, bar coating and spin coating.

The slip agent of the present invention may be previously contained in the undeveloped film or may be coated on the film before or after development, so long as the static friction coefficient of the film can be lowered to 0.25 or below.

Slip agents which can be used in the present invention to lower a coefficient of static friction to 0.25 or below are illustrated below.

The slip agents which can be preferably used in the present invention include those conventionally used for films.

Typical examples of the slip agents which can be used in the present invention include silicone slip agents described in U.S. Pat. No. 3,042,522, U.K. Patent 955,061, U.S. Pat. Nos. 3,080,317, 4,004,927, 4,047,958 and 3,489,567, U.K. Patent 1,143,118 and JP-A-1-234843; higher fatty acid, alcohol and acid amide slip agents described in U.S. Pat. Nos. 2,454,043, 2,732,305, 2,976,148 and 3,206,311, German Patents 1,284,295 and 1,284,294; metallic soaps described in U.K. Patent 1,263,722 and U.S. Pat. No. 3,933,516; and ester and ether slip agents described in U.S. Pat. Nos. 2,588,765 and 3,121,060 and U.K. Patent 1,198,387.

First, organopolysiloxane slip agents are illustrated below.

Among the above-described organopolysiloxane compounds, preferred compounds are those having a constituent unit represented by the following general formula (I) and a terminal group represented by the following general formula (II). The compounds have at least two terminals, and these terminals may be the same or different, so long as the terminals are groups represented by the following general formula (II).

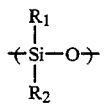
(I)

In general formula (I), $R_1$ represents hydrogen atom, hydroxyl group or an organic group; $R_2$ represents an organic group; and when both $R_1$ and $R_2$ are an organic group, the organic groups may be the same or different groups. Examples of the organic group include an alkyl group, an alkenyl group, an alkoxy group, an oxyalkylene group, an aryl group each having 1 to 45 carbon atoms and a group having one or more of these groups.

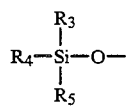
(II)

In general formula (II), $R_3$, $R_4$ and $R_5$ represent each hydrogen atom, a halogen atom, hydroxyl group or an organic group; and $R_3$, $R_4$ and $R_5$ may be the same or different groups. Examples of the organic group include an alkyl group, an alkenyl group, an alkoxy group, an oxyalkylene group, an aryl group each having 1 to 45 carbon atoms and a group having one or more of these groups.

Concretely, the halogen atom represented by $R_3$, $R_4$ and $R_5$ in general formula (II) include fluorine atom and chlorine atom.

Concrete examples of the alkyl group represented by $R_1$, $R_2$, $R_3$, $R_4$ and $R_5$ in general formulas (I) and (II) include methyl group, ethyl group, propyl group, isopropyl group, t-butyl group, hexyl group, dodecyl group, tetradecyl group, heptadecyl group and octadecyl group. Examples of the alkenyl group include vinyl group and butenyl group. Examples of the alkoxy group include methoxy group, ethoxy group and butoxy group. Examples of the oxyalkylene group include oxyethylene group, oxypropylene group and polyoxyethylene group. Examples of the aryl group are phenyl group.

Concrete examples of the group having an alkyl group represented by $R_1$, $R_2$, $R_3$, $R_4$ and $R_5$ include
—$CH_2CH_2CF_3$, —$CH_2CH_2CH_2Cl$, —$CH_2CH_2COOH$,
—$CH_2CH_2CH_2COOH$, —$CH_2CH_2CH_2NH_2$,
—$CH_2CH_2CH_2NHCH_2CH_2NH_2$,

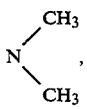

—$CH_2CH_2SH$, —$CH_2CH_2CH_2CN$ and —$OOCC_{17}H_{35}$.

Concrete examples of the group having an alkenyl group include

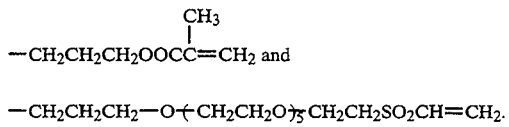

Concrete examples of the group having an alkoxy group include —$CH_2CH_2$—O—$C_4H_9(n)$ and —$OCH_2CH_2OH$.

Examples of the group having an oxyalkylene group include

—$CH_2CH_2CH_2$—$(OC_2H_4)_7$—$OCH_3$,

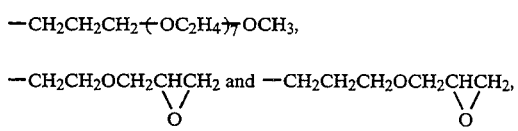

Examples of the group having an aryl group are

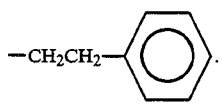

The organopolysiloxanes of the present invention have generally a viscosity of about 10 to 100,000 cSt as measured at 25° C., though there is no particular limitation with regard to the viscosity.

The polysiloxanes of the present invention have a molecular weight ranging from 1,000 to 1,000,000 according to purpose, but the molecular weight is preferably 2,000 to 100,000.

The compounds which can be used in the present invention include, but are not limited to, the following compounds.

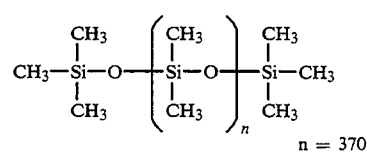
S-1
n = 370

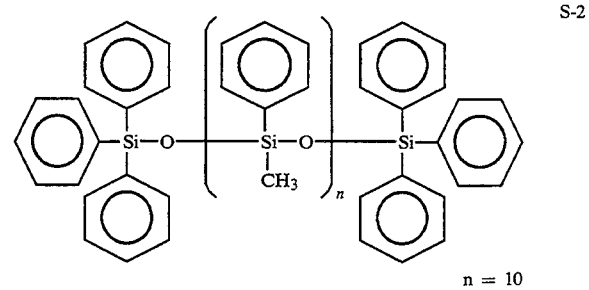
S-2
n = 10

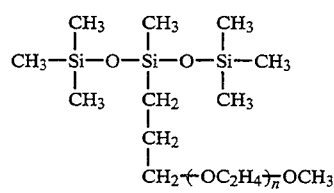
S-3
n = 7

-continued

S-4
$$CH_3-Si(CH_3)(CH_3)-O-[Si(CH_3)(CH_2\text{-})-O]_3-[Si(CH_3)(CH_3)-O]_{27}-Si(CH_3)(CH_3)-CH_3$$
with side chain: $-CH_2-O-CH_2-CH(-CH_2)-O$ (epoxide)

S-5
$$CH_3-Si(CH_3)(CH_3)-O-[Si(CH_3)(CH_3)-O]_{25}-[Si(CH_3)(CH_2\text{-})-O]_5-Si(CH_3)(CH_3)-CH_3$$
with side chain: $-CH_2-CH_2-O(CH_2CH_2O)_5CH_2CH_2SO_2CH=CH_2$ S-6
$$Cl-Si(CH_3)(CH_3)-O-[Si(CH_3)(CH_3)-O]_6-Si(CH_3)(CH_3)-Cl$$

S-7
$$CH_3-Si(CH_3)(CH_3)-O-[Si(CH_3)(CH_3)-O]_x-[Si(CH_3)(CH_2\text{-})-O]_y-Si(CH_3)(CH_3)-CH_3$$
$x + y \approx 50$
with side chain: $-CH_2-CH_2-(OCH_2CH_2)_5OH$ S-8
$$CH_3-Si(CH_3)(CH_3)-O-[Si(CH_3)(CH_3)-O]_x-[Si(CH_3)(CH_2\text{-})-O]_y-$$
with side chain: $-CH_2-CH_2-NH_2$ The ester slip agents are illustrated below.

Compounds represented by the following general formula (III) are particularly preferred.

$$(R_6)_{l_1}(COO)_{m_1}(R_7)_{n_1} \qquad (III)$$

In the above general formula, $R_6$ and $R_7$ represent each a substituted or unsubstituted alkyl group, alkenyl group, arylalkyl group or aralkyl group having 1 to 60 carbon atoms, and the total of carbon atoms in $R_6$ and $R_7$ is at least 10; and $l_1$, $m_1$ and $n_1$ represent each an integer of 1 to 6.

The total of carbon atoms in $(R_6)l_1$ and $(R_7)n_1$ is preferably at least 30, more preferably at least 40. Further, the total of carbon atoms in $R_6$ and $R_7$ is particularly preferably at least 30, and still more preferably at least 40.

Preferred examples of $R_6$ and $R_7$ include butyl, octyl, dodecyl, tetradecyl, hexadecyl, octadecyl, $C_pH_{2p+1}$ (wherein p is a number of 20 to 60), eicosyl, docosanyl, melissyl, octenyl, myristoyl, oleyl, erucyl, phenyl, naphthyl, benzyl, nonylphenyl and dipentylphenyl. In addition thereto, $R_7$ may be ethylene, propylene, phenylene, glycerin, trimethylolpropane, pentaerythritol or sorbitol. These compounds are described in JP-A-58-90633.

Examples of the ester slip agents which can be preferably used include the following compounds.

III-1) $(n)C_{15}H_{31}COOC_{16}H_{33}(n)$
III-2) $(n)C_{17}H_{35}COOC_{18}H_{37}(n)$
III-3) $(n)C_{17}H_{35}COOC_{18}H_{37}(iso)$
III-4) $(n)C_{21}H_{43}COOC_{22}H_{45}(n)$
III-5) $(n)C_{15}H_{31}COOC_{40}H_{81}(n)$
III-6) $(iso)C_{17}H_{35}COOC_{36}H_{73}(iso)$
III-7) $(C_{15}H_{31}COOCH_2)_3CCH_3$ III-8) $C_{15}H_{31}COO-CH_2$
       $\qquad\qquad\quad -CH$
       $\qquad\qquad\quad -CH_2$ III-9) $(n)C_{18}H_{37}OOC(CH_2)_6COOC_{18}H_{37}(n)$ III-10) benzene with two ortho $COOC_{18}H_{37}$ groups III-11) benzene with four $COOC_{18}H_{37}$ groups ($H_{37}C_{18}OOC$ shown)

Liquid paraffin can be preferably used as the slip agent of the present invention. Amides described in JP-A-55-79435 can also be used.

Concrete examples of these slip agents include the following compounds.

A-1: Liquid paraffin
A-2: Stearamide
A-3: Erucamide
A-4: Erucic acid diethylamide
A-5: Oleic acid dipropylamide When the slip agent is used in the present invention, the slip agent must be contained in the emulsion layer and back layer, particularly outermost layers of the photographic material after processing. A sufficient amount of the slip agent may be previously added to both outermost layers, or may be deposited on both outermost layers after processing. The amount of the slip agent to be contained in the outermost layers after processing is 0.0005 to 1 g/m² preferably 0.001 to 0.5 g/m², particularly preferably 0.001 to 0.2 g/m².

The slip agent of the present invention may be added by any method. Generally, the slip agent as such is added to coating solutions for the outermost layer. Water-insoluble slip agents are previously dissolved in an organic solvent and then added, or a dispersion thereof in water or a hydrophilic colloid solution is prepared and then added to the coating solutions for the outermost layers. When the slip agents are used in the form of a dispersion, it is preferred that the slip agents are finely dispersed by using various surfactants as dispersants. Examples of the dispersants which can be preferably used include sodium salts of dodecylbenzenesulfonic acid, p-nonylphenoxybutanesulfonic acid, dioctyl α-sulfosuccinate and N-methyloleyltaurine.

Examples of the organic solvent include alcohols (e.g., methanol, ethanol, propanol), esters (e.g., methyl, ethyl or butyl eater of acetic acid, and methyl, ethyl or propyl ester of formic acid) and amides (e.g., dimethylformamide, dimethylacetamide). When the slip agents are dispersed, hydrophilic colloid is preferable, and particularly gelatin is effectively used.

In carrying out dispersion, the slip agents are dispersed in the presence of an appropriate dispersant in an ultrasonic homogenizer or pulp. homogenizer to a fine particle size of preferably 0.05 to 10 μm when a hydrophilic colloid layer is used.

When the slip agents of the present invention are solid, the agents are finely divided and may be added to the outermost layers. The slip agents can be finely divided by using various ball mills (e.g., rotary ball mill, vibrating ball mill, planetary ball mill), paint shaker, sand mill and kneader. Various dispersants and stabilizers can be used when the slip agents are finely divided. Examples thereof include surfactants (e.g., sodium dodecylbenzenesulfonate, sodium p-octylphenoxyethoxyethoxyethanesulfonate, poly(degree of polymerization: 10)-oxyethylene monocetyl ether ), inorganic compounds (e.g., sodium pyrophosphate, sodium phosphate) and polymers (e.g., polyvinyl alcohol, polysodium acrylate, polypotassium styrenesulfonate, phenolic resins, polystyrene, vinyl chloride resins, vinylidene chloride resins, methyl methacrylate resins, triacetylcellulose, diacetylcellulose).

Further, the slip agents can be deposited after development by coating a coating solution containing the slip agent, for example, by various coating methods (e.g., spray coating, dip coating, bar coating, gravure coating, spin coating).

Method for winding up the film in the patrone according to the present invention is illustrated below.

When the film is conventionally wound up on the patrone, the film is wound up on the patrone in such a manner that the light-sensitive layer side is inwardly positioned. This is because when the winding of the film is loosened in conventional patrone system, the outer side of the winding is brought into contact with the patrone and the outer side of the winding of the film is liable to be marred. Accordingly, the film is wound up on the patrone so that the light-sensitive layer side is inwardly positioned to protect the light-sensitive layer. Further, there is an advantage that camera is designed so as to be made compact when the film is wound up in the patrone in such a manner that the light sensitive layer side is inwardly positioned.

In the present invention, the film is closely wound up in the patrone so as not to cause the loosing of the winding of the film as described above, and there is no possibility that the film is loosened, brought into contact with the patrone and marred. Accordingly, the film is wound up on such a manner the light-sensitive layer side may be positioned inwardly or outwardly. Further, when the developed film is wound up on the patrone for the purpose of storage only, it is not necessary that the handling of the film in the camera is taken into consideration, and the film may be wound up on the patrone in such a manner that the light-sensitive layer side is positioned inwardly or outwardly.

The fixing of the shape of the winding during storage can be reduced by utilizing the shrinking power of gelatin which accounts for the majority of the light-sensitive layer when the light-sensitive layer side is wound up on the opposite direction from conventional direction, that is, the film is wound up so that the light-sensitive layer side is outwardly positioned. This mechanism is illustrated below.

Generally, the majority of the light-sensitive layers of the silver halide photographic material comprises gelatin. Gelatin is highly hygroscopic, absorbs water in air and expands. When gelatin which sufficiently absorbed water is placed under low humidity conditions, water absorbed is released from gelatin in air and gelatin shrinks. This change is reversible, and shrinkage and expansion are repeated with a change in relative humidity. At this time, stress generates. Stress during expansion is considerably smaller than that during shrinkage. This is because water absorbed during expansion functions as a plasticizer and modulus of gelatin is lowered. Accordingly, when the expansion and shrinking stress of gelatin is utilized to recover the shape of the winding, it is advantageous that shrinking stress is utilized.

The shrinking stress is remarkable when the water content of the gelatin layers is not higher than 14% by weight, more preferably not higher than 12% by weight based on the total amount of gelatin. The water content can be obtained under relative humidity conditions of 40% and 30% at 25° C.

It is necessary that the film is wound up so that the light-sensitive layer side is outwardly positioned when the shrinking power is utilized to reduce the fixing of the shape of the winding. This is because the outer periphery of the film wound up is longer than the inner periphery thereof and is in a state where the film is more extended, the extension can be inhibited by the shrinking power of gelatin, and as a result, the shape of the winding can be recovered.

It is most preferred that the whole of a laboratory in which a printer is set is brought into low humidity condition when the shape of the winding is practically recovered by utilizing a change in humidity. It is desirable that user's films are moisture-conditioned in the laboratory for at least 30 minutes, dried and passed through the printer.

The whole of the laboratory is not moisture-conditioned on such a large scale. In another embodiment, a desiccator kept under low humidity conditions is prepared, and the film is dried in the desiccator for at least 30 minutes, taken out of the desiccator and immediately passed through the printer. In this case, the film must be processed within 20 minutes. When the film is left to stand for a long period of time, the film absorbs water and is restored to the original state and the effect of the present invention is reduced. General printing is completed within a period of the above time. Hence, a serious problem is not caused.

The photographic film which can be used in the present invention may be raw film before development or the developed film as described above. The raw film and the developed film may be housed in the same fresh patrone or in different patrones. Particularly, the developed photographic film is stored over a long period of time. Hence, the patrone for the developed film may be larger than that for raw film so that the spool is readily rotated and a light screening mechanism (e.g., plush) is not required. It is preferred that fresh patrone contains sufficiently the slip agent and an antistatic agent in some cases.

The film of the present invention is briefly illustrated below.

Various plastic films can be used as the supports of the photographic materials in the present invention without particular limitation. Preferred examples of the plastic films include cellulose derivatives (e.g., diacetyl-, triacetyl-, butanoyl-, acetylpropionylcellulose); polyamides; polycarbonates described in U.S. Pat. No. 3,023,101; polyesters (e.g., polyethylene terephthalate, poly-1,4-cyclohexanedimethylene terephthalate, polyethylene naphthenate) described in JP-B-48-40414; polystyrene, polypropylene, polyethylene, polysulfone, polyacrylates and polyetherimides. Among them, triacetylcellulose and polyethylene terephthalate are particularly preferred.

The polyester support of the present invention comprises a polyester obtained by using a dibasic acid and a glycol as principal constituent components. Polyethylene terephthalate (PET) is conventionally known as a polyester material. The term "polyester having a hydrophilic group" as used herein refers to a polyester having a water content higher than that of PET.

The hydrophilic group of the polyester of the present invention may be introduced into any of the dibasic acid and the glycol which are the constituent components.

Examples of the hydrophilic group which can be introduced include monovalent or divalent substituent groups such as sulfo group (or a salt), sulfinic acid group (or a salt), phosphonic acid group (or a salt), carboxyl group (or a salt), a polyalkyleneoxy group, an alkoxy group, an alkoxycarbonyl group, a sulfamoyl group, a carbamoyl group, an acylamino group, a sulfonamido group, a disulfonamide group, a ureido group, a urethane group, an alkylsulfonyl group and an alkoxysulfonyl group. Among them, sulfo group (or a salt), sulfinic acid group (or a salt), phosphonic acid group (or a salt), carboxyl group (or a salt), a polyalkyleneoxy group and a disulfonamido group are particularly preferred.

Preferred examples of the dibasic acid as the constituent component having a hydrophilic group include 5-sodium sulfoisophthalate, 2-sodium sulfoterephthalate, 4-sodium sulfophthalate, 4-sodium sulfo-2,6-naphthalenedicarboxylate, monosodium salt of 1,3,5-benzenetricarboxylic acid and compounds represented by the following chemical formulas.

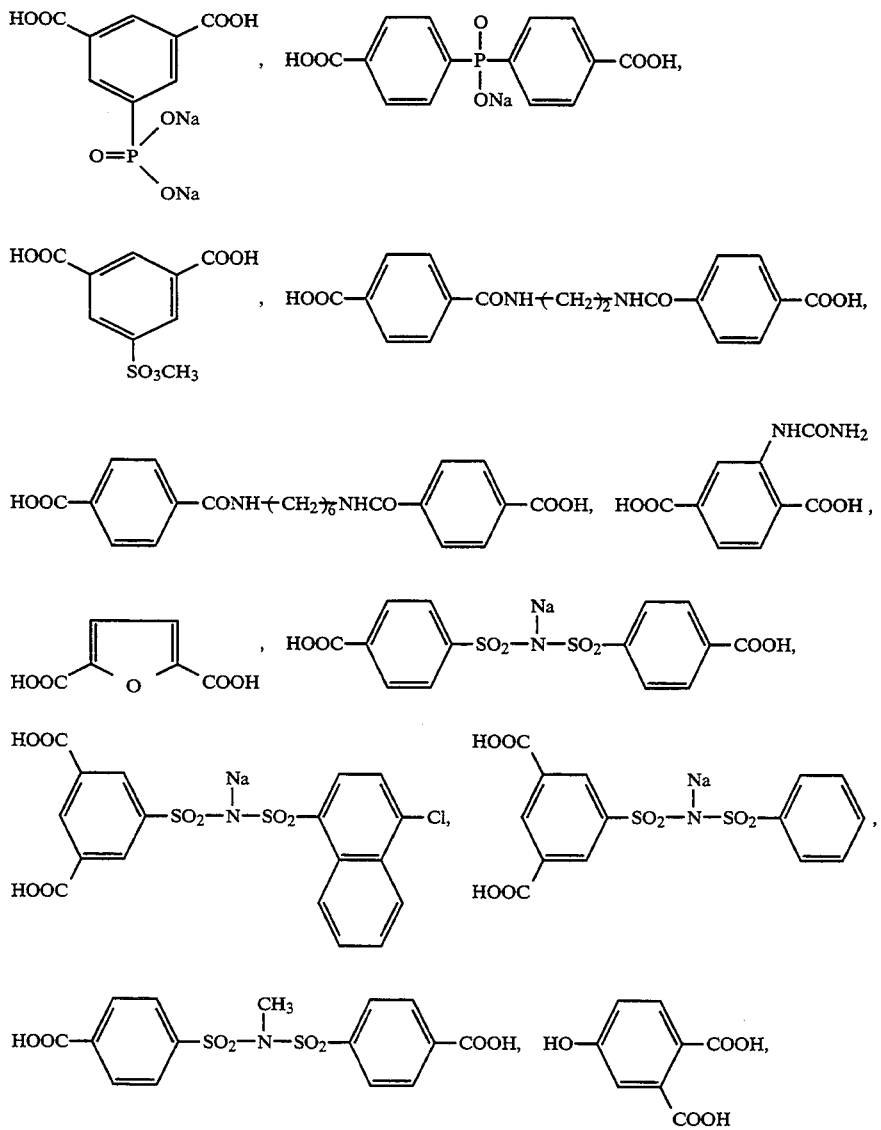

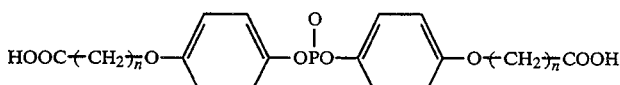

(n is an integer of at least 1)

Sodium atom of the compounds in the form of a sodium salt in the above-described dibasic acids may be replaced with hydrogen atom or other metal atom such as lithium or potassium. Further, carboxyl group of these dibasic acids may be optionally in the form of an ester (e.g., an alkyl or aryl ester) or an acid chloride for the convenience of preparation.

Preferred examples of the glycol having a hydrophilic group include HO—$(CH_2)_2$—$(OCH_2CH_2)_n$—O—$(CH_2)_2$—OH (wherein n is an integer of 1 to about 20), HO—$(CH(CH_3)CH_2O)_n$—H (wherein n is an integer of 1 to about 20) and

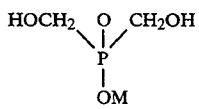

(wherein M is hydrogen atom or an alkali metal such as Li, Na or K).

In addition thereto, hydroxypolyesters, hydroxypolyacetals and hydroxyesteramides can be used as diol components.

The polyesters having hydroxyl group are reaction products between a polyhydric (mainly dihydric) alcohol and a dibasic carboxylic acid. The hydroxyacetals can be obtained from glycols (e.g., diethylene glycol) and formaldehyde. The hydroxyesteramides are condensates obtained, for example, from dibasic carboxylic acids and aminoalcohols alone or in a mixture with diamines or polyamines.

In addition to the above-described compounds, various compounds can be used as the constituent components for the polyesters.

Examples of other dibasic acids which can be used as the constituent compositions for the polyesters include terephthalic acid, isophthalic acid, phthalic acid, phthalic anhydride, succinic acid, glutaric acid, adipic acid, sebacic acid, succinic anhydride, maleic acid, fumaric acid, maleic anhydride, itaconic acid, citraconic anhydride, tetrahydrophthalic anhydride, diphenylene-p,p'-dicarboxylic acid, tetrachlorophthalic anhydride, 3,6-endomethylenetetrahydrophthalic anhydride, 1,4-cyclohexanedicarboxylic acid and compounds represented by the following chemical formulas:

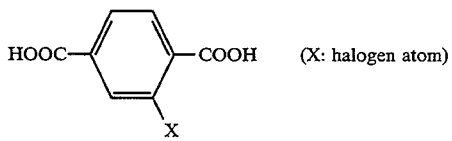
(X: halogen atom)

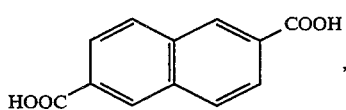

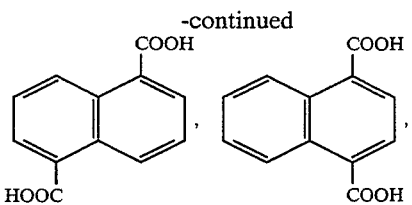

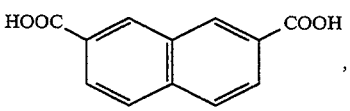

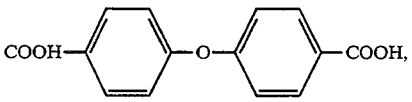

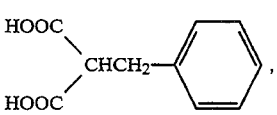

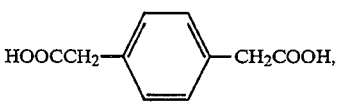

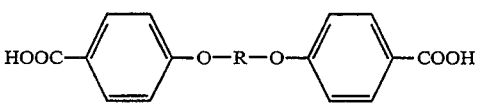

(R: $C_1$~$C_5$ alkylene)

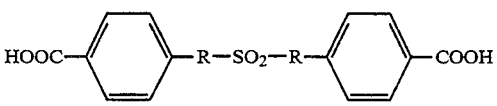

(R: $C_1$~$C_5$ alkylene)

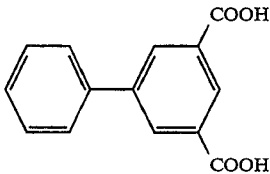

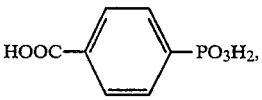

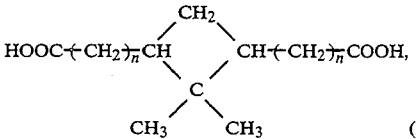
(n = 0, 1)

HOOC—R—$SO_2$—R—COOH    (R: $C_3$~$C_5$ alkylene)

-continued

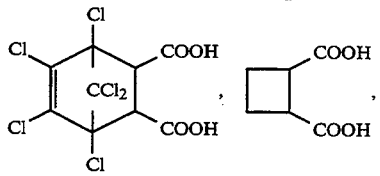

Examples of the other diols which can be used include ethylene glycol, 1,3-propanediol, 1,2-propanediol, 1,4-butanediol, 1,5-pentanediol, 1,6-hexanediol, 1,7-heptanediol, 1,8-octanediol, 1,10-decanediol, 1,12-dodecanediol, 1,4-cyclohexanediol, 1,4-cyclohexanedimethanol, 1,3-cyclohexanediol, 1,1-cyclohexanedimethanol, catechol, resorcin, hydroquinone, 1,4-benzenedimethanol and compounds represented by the following chemical formulas:

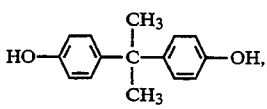

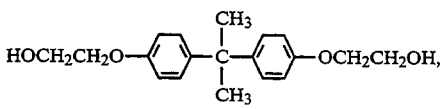

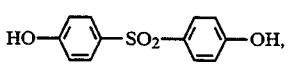

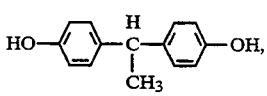

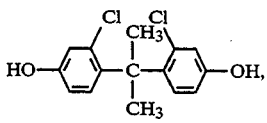

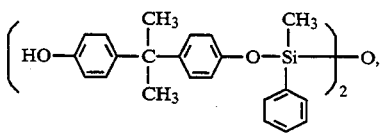

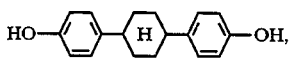

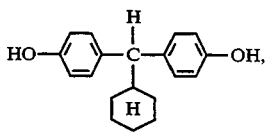

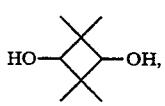

-continued

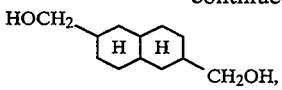

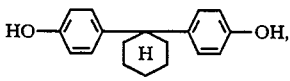

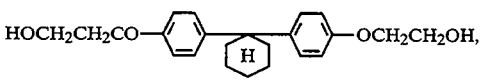

If desired, monofunctional or tri- or polyfunctional compounds having hydroxyl groups or compounds having acid groups may be optionally copolymerized.

In the preparation of the polyesters of the present invention, compounds having hydroxyl group as well as carboxyl group (or its ester) in the molecule may be copolymerized.

Examples of such compounds include the following compounds.

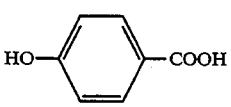

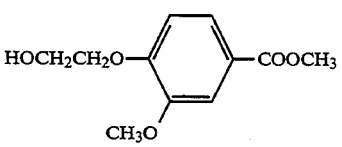

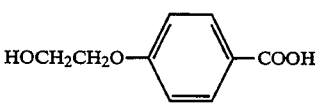

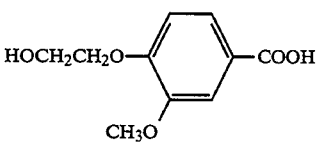

Copolyesters mainly composed of ethylene glycol and terephthalic acid are particularly preferred as the polyesters of the present invention. The amount of the constituent component having the hydrophilic group to be introduced into the copolyesters varies depending on the hydrophilicity of the constituent component itself and the physical properties (e.g., refractive index, mechanical strength) of the polyester to be formed, but is preferably 1 to 50% by weight, particularly preferably 2 to 40% by weight based on the total amount of the polyester.

The amounts of copolymerizable constituent components other than ethylene glycol, terephthalic acid and said constituent component having a hydrophilic group vary depending on the hydrophilicity and physical and mechanical properties (e.g., refractive index, transparency, glass transition temperature, melting point, folding endurance) of the polyester to be formed, but are preferably 0 to 50% by weight, particularly preferably 0 to 40% by weight based on the total amount of the polyester.

The polyesters of the present invention can be synthesized by conventional methods for preparing polyesters. For example, the acid component is directly esterified with the glycol component. When the acid component is used in the form of a dialkyl ester, an ester exchange reaction between the acid component and the glycol component can be carried out. The acid component is converted into an acid halide which is then reacted with the glycol component. If desired, a catalyst for ester exchange reaction or a catalyst for polymerization reaction may be used. If desired, a heat-resistant stabilizer may be added.

The above-described constituent components for polyesters and methods for synthesizing polyesters are described in, for example, *High Molecular Experiment*, Vol. 5, pp. 103 to 136, "Polycondensation and Polyaddition" (1980 Kyoritsu Shuppan) and *Synthetic High Molecular Material V*, pp. 187 to 286 (1971 Asakura Shoten).

The polyesters of the present invention have an average molecular weight of preferably about 3,000 to about 100,000.

Concrete examples of the polyesters which can be preferably used in the present invention include, but are not limited to, the following compounds (parenthesized numerals represent the ratio by mol of the components).

P-1 TPA/AA/SSIA/EG (88/5.3/6.7/100)
P-2 TPA/AA/SSIA/EG (90/7.2/2.8/100)
P-3 TPA/AA/SSIA/EG (88/7.2/4.8/100)
P-4 TPA/SSIA/EG/DEG (95/5/85/15)
P-5 TPA/SSIA/EG/TEG (93/7/80/20)
P-6 TPA/AA/SSIA/EG (90/4/6/100)
P-7 TPA/PEG (4000)/EG (100/0.5/99.5)
P-8 TPA/IPA/SSIA/PEG (4000)/EG (95/4/1/0.3/99.7)
P-9 TPA/SSIA/SA/TEEG/EG (95/3/2/5/95)
P-10 TPA/SCPP/AA/EG (90/5/5/100)
P-11 TPA/AA/SSIA/EG/DEG (88/5/7/90/10)
P-12 TPA/PSIB/AA/EG (94/3/3/100)
P-13 TPA/PISB/EG/DEG (97/3/95/5)
P-14 TPA/EG/DMPS (100/95/5)
P-15 TPA/SSIA/SA/EG/BHPP (90/2/8/95/5)

The above abbreviations used in the above examples of the polyesters means the following compounds.

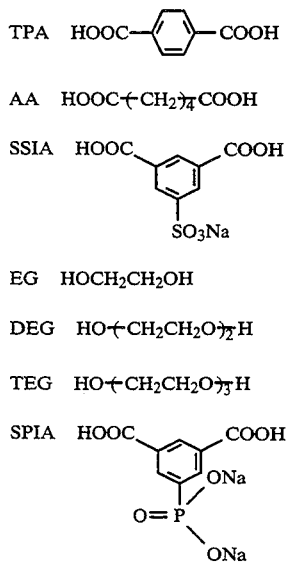

-continued

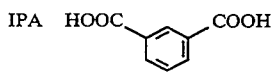

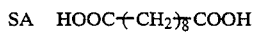

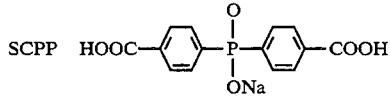

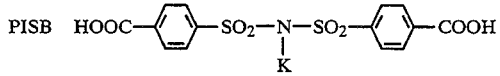

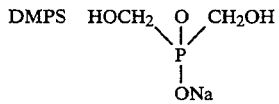

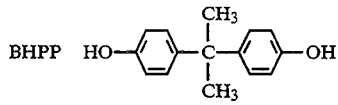

In the above-described copolymerization ratio, any of the dibasic acid components is represented by molar ratio charged. The amounts of the glycol components excluding EG is represented by percentage by mol charged on the basis of the amount of the whole acid components. EG is used in an excess amount in comparison with the acid component according to conventional ester exchange reaction. In the above list, however, the combined amount of the dibasic acid component and the glycol component in the final product is calculated so as to be 100, and the amount of EG is represented on the basis of this calculation.

Plasticizers are often added to these supports to impart flexibility. Particularly, the cellulose esters contain generally a plasticizer such as triphenyl phosphate, biphenyldiphenyl phosphate or dimethylethyl phosphate.

The thicknesses of these supports vary depending on polymer species, but are in a wide range of from a sheet of about 1 mm to a thin film of about 20μ according to use. Generally, the thickness is in the range of 50 to 300μ.

These support polymers have a molecular weight of preferably at least 10,000, more preferably 20,000 to 800,000.

The support may contain dyes to neutralize the color tone of the base or to prevent light piping or halation from being caused.

The supports are generally subjected to a surface activation treatment such as chemical treatment, mechanical treatment, corona discharge treatment, flame treatment, ultraviolet light treatment, high frequency treatment, glow discharge treatment, active plasma treatment, laser treatment, mixed acid treatment or ozone treatment to bond firmly photographic layers (e.g., light-sensitive silver halide emulsion layers, interlayers, filter layers and the transparent magnetic layer of the present invention). After the treatment, photographic emulsions may be directly coated thereon. Alternatively, a subbing layer is provided thereon after the surface treatment or without the surface treatment, and the photographic emulsion layers may be then coated.

When the supports are made of cellulose derivative, a single layer of a gelatin solution dispersed in a mixed organic solvent of methylene chloride/ketone/alcohol is coated thereon to provide a subbing layer.

Hardening agents for gelatin which can be used in the subbing layer include chromium salts ( e.g., chromium alum), aldehydes (e.g., formaldehyde, glutaraldehyde), isocyanates, active halogen compounds (e.g., 2,4-dichloro-6-hydroxy-s-triazine), and epichlorohydrin resins.

If desired, the coating composition of the subbing layer may contain various additives, such as surface active agents, antistatic agents, dyes for antihalation, pigments, coating aids, and antifoggants. In using the subbing layer composition, the composition may further contain etching agents, such as resorcin, hydrated chloral, and chlorophenol.

The subbing layer according to the present invention may further contain inorganic fine particles, e.g., $SiO_2$ and $TiO_2$, or polymethyl methacrylate copolymer fine particles (diameter: 1 to 10 μm) as a matting agent.

The subbing layer can be coated on a support by any well-known coating technique, such as dip coating, air knife coating curtain coating, roller coating, wire bar coating, gravure coating, and extrusion coating by the use of a hopper as disclosed in U.S. Pat. No. 2,681,294. If desired, two or more subbing layers can be coated simultaneously by the method disclosed in U.S. Pat. Nos. 2,761,791, 3,508,947, 2,941,898, and 3,526,528, and Yuji Harasaki, *Coating Engineering,* p. 253, Asakura Shoten (1973).

In the present invention, matting agents may be used to prevent sticking from being caused. Any of inorganic and organic matting agents or a mixture of two or more of them can be used without particular limitation with regard to the composition thereof.

The particles of the matting agents are left behind in the photographic materials after development. Accordingly, the matting agents are characterized by that they are not dissolved in processing solutions. It is desirable that the agents do not have much groups which are dissolved under high hydrophilic, alkaline or acidic conditions.

The matting agents of the present invention include inorganic and organic compounds. Examples of the inorganic compounds include fine powders of barium sulfate, manganese colloid, titanium dioxide, barium strontium sulfate and silicon dioxide. Further, silicon dioxide such as synthetic silica obtained by wet method or gelation of silicic acid and titanium dioxide (rutile type and anatase type) formed from titanium slag and sulfuric acid can be used. Furthermore, the matting agents may be obtained by crushing inorganic materials having a relatively larger particle size of 20 μm or above and classifying (vibration filtration, air classification) crushed particles.

Other examples of the matting agents include the crushed and classified products of organic high molecular compounds such as polytetrafluoroethylene, cellulose acetate, polystyrene, polymethyl methacrylate, polypropyl methacrylate, polymethyl acrylate, polyethylene carbonate and starch.

Further, high molecular compounds synthesized by suspension polymerization method, spherical high molecular compounds and inorganic compounds obtained by spray drying method or dispersion method can be used.

High molecular compounds which are polymers of one or more polymerizable monomers may be powdered.

Preferred examples of the monomers include acrylic esters, methacrylic esters, vinyl esters, styrenes and olefins.

Particles having fluorine atoms or silicon atoms as described in JP-A-62-14647, JP-A-62-17744 and JP-A-62-17743 may be used.

These matting agents have an average particle size of preferably 1 to 3.5 μm and such a particle size distribution that particles having a particle size of not smaller than 4 μm account for not more than 4% of the entire particles. More preferably, the matting agents have an average particle size of 1.5 to 2.8 μm and such a particle size distribution that particles having a particle size of not smaller than 3.5 μm account for not more than 5% of the entire particles.

The content of the matting agent is preferably 5 to 300 mg/m$^2$, more preferably 20 to 250 mg/m$^2$.

Concrete examples of the matting agents which can be used in the present invention include, but are not limited, the following compounds.

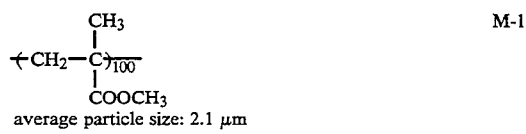

average particle size: 2.1 μm

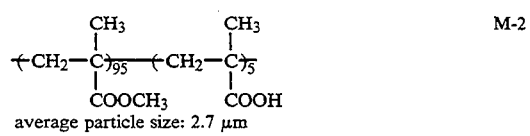

average particle size: 2.7 μm

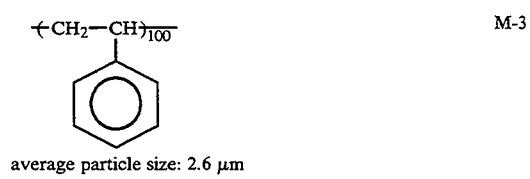

average particle size: 2.6 μm

average particle size: 2.4 μm

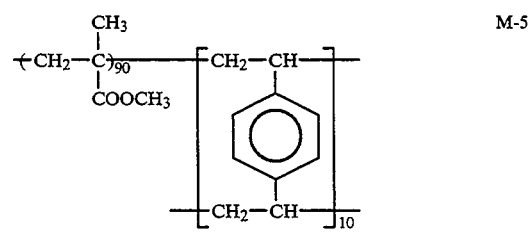

average particle size: 2.5 μm

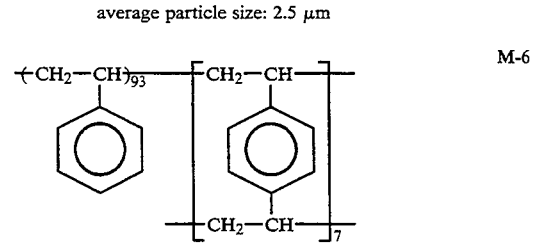

average particle size: 2.2 μm

-continued

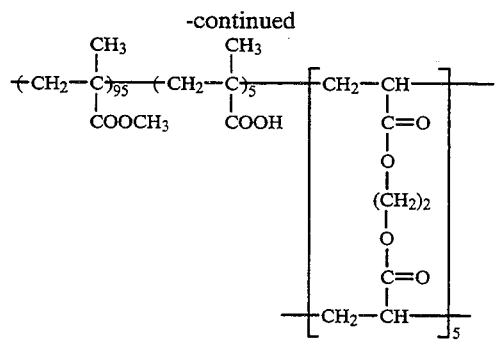

average particle size: 1.9 μm

The photographic materials of the present invention are illustrated in more detail below.

The photographic materials of the present invention comprise silver halide emulsion layers, back layers, protective layers, interlayers, antihalation layers, etc. These layers are mainly hydrophilic colloid layers.

Binders for the hydrophilic colloid layers include protein such as gelatin, colloidal albumin and casein; cellulose compounds such as carboxymethyl cellulose and hydroxyethyl cellulose; sugar derivatives such as agar-agar, sodium alginate and starch derivatives; synthetic hydrophilic colloid such as polyvinyl alcohol, poly-N-vinylpyrrolidone, polyacrylic acid copolymers, polyacrylamide or derivatives thereof or partial hydrolyzates thereof, dextran, polyvinyl acetate, polyacrylic acid esters and rosin. If desired, a mixture of two or more of these colloids may be used.

Among them, gelatin and gelatin derivatives are most widely used. The term "gelatin" as used herein includes lime-processed gelatin, acid-processed gelatin and enzyme-processed gelatin.

In the present invention, anionic, nonionic, cationic or betaine type fluorine-containing surfactants can be used.

These fluorine-containing surfactants are described in JP-A-49-10722, U.K. Patent 1,330,356, JP-A-53-84712, JP-A-54-14224, JP-A-50-113221, U.S. Pat. Nos. 4,335,201 and 4,347,308, U.K. Patent 1,417,915, JP-B-5226687, JP-B-57-26719, JP-B-59-38573, JP-A-55-149938, JP-A-54-48520, JP-A-54-14224, JP-A-58-200235, JP-A-57146248, JP-A-58-196544 and U.K. Patent 1,439,402.

Concrete examples of the fluorine-containing surfactants which can be preferably used include the following compounds.

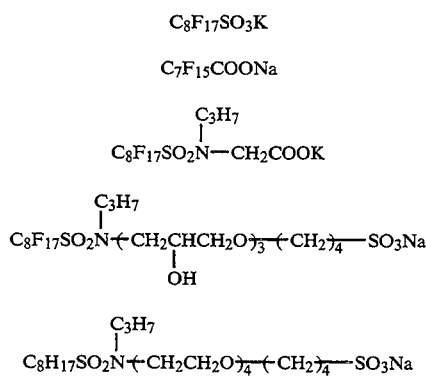

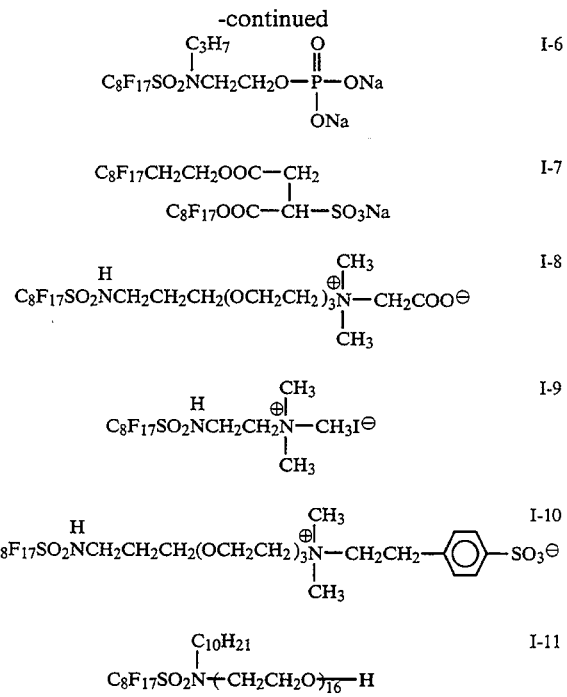

Nonionic surfactants may be used in the present invention.

Examples of the nonionic surfactants which can be preferably used in the present invention include the following compounds.

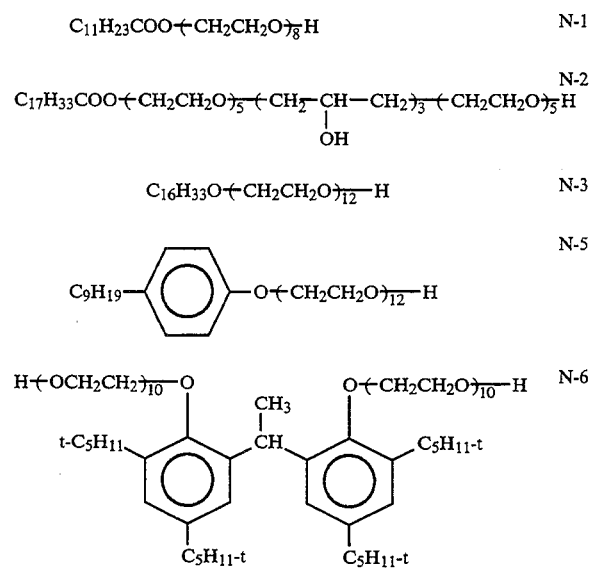

The fluorine-containing surfactant and the nonionic surfactant of the present invention may be added to at least one layer of the photographic material without no particular limitation with regard to the layer to which the surfactant is added. For example, the surfactant may be added to at least one of surface protective layers, emulsion layers, interlayers, subbing layers (undercoat layers), back layers.

The fluorine-containing surfactant and the nonionic surfactant may be used in an amount of preferably 0.0001 to 1 g/m², more preferably 0.0005 to 0.5 g/m², particularly preferably 0.0005 to 0.2 g/m². The surfactants may be used either alone or as a mixture of two or more of them.

Polyol compounds such as ethylene glycol, propylene glycol and 1,1,1-trimethylolpropane as described in JP-A-54-89626 can be added to the protective layer and other layers of the present invention.

Other conventional surfactants alone or in combination may be added to the photographic constituent layers of the present invention. These surfactants are used as coating aid, but are often used to improve emulsifying dispersion, sensitization and other photographic characteristics.

The photographic constituent layers of the present invention may contain lubricating compositions such as modified silicones as described in U.S. Pat. Nos. 3,079,837, 3,080,317, 3,545,970 and 3,294,537 and JP-A-52-129520. Such lubricating compounds are also described in U.S. Pat. Nos. 4,275,146 and 3,933,516, JP-B-58-33541, U.K. Patent 927,446, JP-A-55-126238 and JP-A-58-90633.

Concrete examples of these compounds include the following compounds.

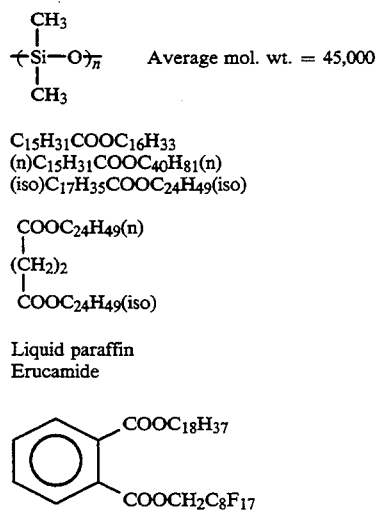

The photographic constituent layers of the photographic material of the present invention may contain polymer latex described in U.S. Pat. Nos. 3,411,911 and 3,411,912 and JP-B-45-5331.

The silver halide emulsion layers and other hydrophilic colloid layers of the photographic material of the present invention can be hardened by various organic or inorganic hardening agents (singly or in combination).

Typical examples of preferred silver halide color photographic materials of the present invention are reversal color films and negative color films. General-purpose negative color films are particularly preferred color photographic materials.

General-purpose negative color films are illustrated below.

The light-sensitive material of the present invention may comprise a support having thereon at least one blue-sensitive silver halide emulsion layer, at least one green-sensitive silver halide emulsion layer and at least one red-sensitive silver halide emulsion layer. There is no particular limitation with regard to the number and order of silver halide emulsion layers and non-sensitive layers. A typical example is a silver halide photographic material comprising a support having thereon at least one light-sensitive layer comprising a plurality of silver halide emulsion layers having substantially the same color sensitivity, but different light sensitivity, said light-sensitive layer being a unit light-sensitive layer having color sensitivity to any one of blue light, green light and red light. In the case of a multi-layer silver halide color photographic material, the unit light-sensitive layer is generally arranged in order of red-sensitive layer, green-sensitive layer and blue-sensitive layer from the side of the support. However, these layers may be arranged in the reverse order to that described above according to purpose.

Non-sensitive layers such as interlayers may be provided between the silver halide light-sensitive layers or as the uppermost layer and the lowermost layer.

The interlayers may contain couplers and DIR compounds a described in JP-A-61-43748, JP-A-59-113438, JP-A-59-113440, JP-A-61-20037 and JP-A-61-20038, and may also contain color mixing inhibitors as conventionally used.

A plurality of silver halide emulsion layers which constitute each unit light-sensitive layer are described in German Patent 1,121,470, U.K. Patent 923,045, JP-A-57-112751, JP-A-62-200350, JP-A-62-206541, JP-A-62-206543, JP-A-56-25738, JP-A-62-63936, JP-A-59-202464, JP-B-55-34932 and JP-B-49-15495.

Silver halide grains may have a regular crystal form, such as a cubic form, an octahedral form, and a tetradecahedral form, an irregular crystal form, such as a spherical form and a plate (tabular) form; a crystal form having a crystal defect, such as a twinning plane; or a composite crystal form thereof.

With regard to grain size, silver halide grains may range from fine grains having a grain size of not larger than about $0.2\mu$ to large-size grains having a grain size of about $10\mu$ in terms of the diameter of a projected area. The silver halide emulsion may be any of a polydisperse emulsion and a monodisperse emulsion.

Silver halide photographic emulsions which are used in the present invention can be prepared by the processes described, e.g., in *Research Disclosure* (RD), No. 17643 (Dec., 1978), pp. 22–23, "I. Emulsion Preparation and Types" Ibid No. 18716 p. 648 (Nov., 1979), Ibid., P. Glafkides, *Chemicet Phisique Photographique*, Paul Montel (1967), G. F. Duffin, *Photographic Emulsion Chemistry*, Focal Press (1966), and V. L. Zelikman et al., *Making and Coating Photographic Emulsion*, Focal Press (1964).

Mono-disperse emulsions described in U.S. Pat. Nos. 3,574,628 and 3,655,394 and U.K. Patent 1,413,748 are preferably used as well.

Tabular grains having an aspect ratio of about 5 or more are also useful. Such tabular grains can easily be prepared by the processes described, e.g., in Gutoff, *Photographic Science and Engineering*, Vol. 14, pp. 248–257 (1970), U.S. Pat. No. 4,434,226, 4,414,310, 4,433,048, and 4,439,520, and U.K. Patent 2,112,157.

The silver halide grain may have a uniform crystal structure throughout the whole of the grain, or may have such a crystal structure that the surface layer for the grain and the interior thereof are different in the halogen composition. Further, the crystal structure may be a laminar structure. Silver halide grains having different compositions may be joined together by epitaxial growth. Silver halide grains may be joined to other compound such as silver rhodanide or lead oxide other than silver halide. A mixture of grains having various crystal forms may be used.

Silver halide emulsions are generally subjected to physical ripening, chemical ripening and spectral sensitization. The effect of the present invention is particularly remarkable with emulsions sensitized by gold compounds and sulfur-containing compounds. Additives which can be used in these stages are described in *Research Disclosure*, No. 17643 and ibid., No. 18716 as listed below.

Other conventional additives which can be used in the present invention are also described in the aforesaid two *Research Disclosure* references as tabulated below.

| Additive | RD 17643 | RD 18716 |
|---|---|---|
| 1. Chemical Sensitizer | Page 23 | Page 648, right column |
| 2. Sensitivity Increasing Agent |  | Page 648, right column |
| 3. Spectral Sensitizer, Supersensitizer | Pages 23 to 24 | Page 648, right column to page 649, right column |
| 4. Brightening Agent | Page 24 |  |
| 5. Antifoggant, Stabilizer | Pages 24 to 25 | Page 649, right column |
| 6. Light Absorber, Filter Dye, Ultraviolet Absorber | Pages 25 to 26 | Page 649, right column to page 650, left column |
| 7. Staining Inhibitor | Page 25, right column | Page 650, left column to right column |
| 8. Dye Image Stabilizer | Page 25 |  |
| 9. Hardening Agent | Page 26 | Page 651, left column |
| 10. Binder | Page 26 | Page 651, left column |
| 11. Plasticizer, Lubricant | Page 27 | Page 650, right column |
| 12. Coating Aid, Surface Active Agent | Pages 26 to 27 | Page 650, right column |

It is preferred that compounds capable of reacting with formaldehyde to fix it are added to the light-sensitive materials to prevent photographic performance from being deteriorated by formaldehyde gas.

Various color couplers can be used in the present invention. Specific examples of useful color couplers are described in patent specifications cited in the aforesaid *Research Disclosure* (RD), No. 17643, VII-C to G.

Examples of suitable yellow couplers which can be used in the present invention are described, for example, in U.S. Pat. Nos. 3,933,501, 4,022,620, 4,326,024, 4,401,752, and 4,248,961, JP-B-58-10739, U.K. Patents 1,425,020 and 1,476,760, U.S. Pat. Nos. 3,973,968, 4,314,023 and 4,511,649, and European Patent 249,473A.

Examples of suitable magenta couplers include 5-pyrazolone couplers and pyrazoloazole couplers. Examples of particularly preferred magenta couplers are described in U.S. Pat. Nos. 4,310,619 and 4,351,897, European Patent 73,636, U.S. Pat. Nos. 3,061,432 and 3,725,064, RD No. 24220 (Jun., 1984), JP-A-60-33552, RD No. 24230 (Jun., 1984), JP-A-60-43659, JP-A-61-72238, JP-A-60-35730, JP-A-55-118034, JP-A-60-185951, U.S. Pat. Nos. 4,500,630, 4,540,654 and 4,556,630, and WO 88/04795.

Cyan couplers which can be used include phenol couplers and naphthol couplers. Examples of suitable cyan couplers are described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, and 4,327,173, German Patent (OLS) No. 3,329,729, EP 121,365A, EP 249,453A, U.S. Pat. Nos. 3,446,622, 4,333,999, 4,753,871, 4,451,559, 4,427,767, 4,690,889, 4,254,212, and 4,296,199, and JP-A-61-42658.

Examples of suitable colored couplers which can be used for correcting unnecessary absorption of a developed dye are those described in *RD*, No. 17643, VII-G, U.S. Pat. No. 4,163,670, JP-B-57-39413, U.S. Pat. Nos. 4,004,929 and 4,138,258 and U.K. Patent 1,146,368.

Examples of suitable couplers which develop a dye having moderate diffusibility are described in U.S. Pat. No. 4,366,237, U.K. Patent 2,125,570, European Patent 96,570, and German Patent (OLS) No. 3,234,533.

Typical examples of polymerized dye-forming couplers are described in U.S. Pat. Nos. 3,451,820, 4,080,211, 4,367,282, 4,409,320, and 4,576,910, and U.K. Patent 2,102,173.

Couplers capable of releasing a photographically useful residue on coupling are also advantageously used. Examples of suitable DIR couplers capable of releasing a restrainer are described in the patents cited in *RD*, No. 17643, VII-F, JP-A-57-151944, JP-A-57-154234, JP-A-60-184248, JP-A-63-37346, and U.S. Pat. No. 4,248,962.

Couplers capable of imagewise releasing a nucleating agent or a development accelerator preferably include those described in U.K. Patents 2,097,140 and 2,131,188, JP-A-59-157638, and JP-A-59-170840.

Additional examples of couplers which can be used in the light-sensitive material of the present invention include competitive couplers as described in U.S. Pat. No. 4,130,427; polyequivalent couplers as described in U.S. Pat. Nos. 4,283,472, 4,338,393 and 4,310,618; couplers capable of releasing a DIR redox compound, couplers capable of releasing a DIR coupler, redox compounds capable of releasing a DIR coupler, or redox compounds capable of releasing a DIR redox compound as described in JP-A-62-24252; couplers capable of releasing a dye which restores its color after release as described in EP 173,302A; couplers capable of releasing a bleaching accelerator as described in RD Nos. 11449 and 24241 and JP-A-61-201247; couplers capable of releasing a ligand as described in U.S. Pat. No. 4,553,477; couplers capable of releasing a leuco dye as described in JP-A-63-75747.

The couplers of the present invention can be introduced into the light-sensitive materials by various known methods.

High-boiling solvents which are used in an oil-in-water dispersion method are described in U.S. Pat. No. 2,322,027.

Examples of high-boiling organic solvents having a boiling point of not lower than 175° C. at atmospheric pressure which can be used in the oil-in-water dispersion method include phthalic esters, phosphoric or phosphonic esters, benzoic esters, amides, alcohols, phenols, aliphatic carboxylic acid esters, aniline derivatives and hydrocarbons. Organic solvents having a boiling point of not lower than 30° C., preferably not lower than 50° C, but not higher than about 160° C. can be used as co-solvents. Typical examples of the co-solvents include ethyl acetate, butyl acetate, ethyl propionate, methyl ethyl ketone, cyclohexanone, 2-ethoxyethyl acetate and dimethylformamide.

Concrete examples of the steps and effects of latex dispersion methods and impregnating latexes are described in U.S. Pat. No. 4,199,363, German Patent (OLS) Nos. 2,541,274 and 2,541,230.

The total of the film thicknesses of the entire hydrophilic colloid layers on the emulsion layer side of the light-sensitive material of the present invention is preferably not more than 28 μm and the film swelling rate $T_{\frac{1}{2}}$ of the light-sensitive material is preferably not more than 30 seconds. The film thickness refers to a film thickness as measured after conditioning at 25° C. and 55% RH for 2 days. The film swelling rate $T_{\frac{1}{2}}$ can be measured by known method in the art, for example, by using a swellometer of the type described in A, Green et al., *Photographic Science and Engineerings*, Vol. 19, No. 2, pp. 124–129.

The film swelling rate $T_{\frac{1}{2}}$ is defined as a time taken until the swollen film thickness reaches $\frac{1}{2}$ of the saturated swollen film thickness when 90% of the maximum swollen film thickness obtained as processed in a color developing solution at 30° C. for 3¼ minutes is referred to as the saturated swollen film thickness.

The film swelling rate $T_{\frac{1}{2}}$ can be controlled by adding a hardening agent to gelatin as a binder or changing conditions with time after coating. The swelling ratio of the light-sensitive material is preferably 150 to 400%. The term "swelling ratio" as used herein refers to a value obtained from the maximum swollen film thickness as defined above according to the following formula:

Swelling ratio=(maximum swollen film thickness−film thickness )/film thickness.

The color photographic materials of the present invention can be developed by conventional methods described in the aforesaid *RD* No. 17643, pp. 28 to 29 and ibid., No. 18716, page 615 left column to right column.

The silver halide color photographic materials of the present invention may contain color developing agents to simplify and expedite processing. It is preferable to use precursors for the color developing materials. Examples of the precursors include indoaniline compounds described in U.S. Pat. No. 3,342,597, Schiff bases described in U.S. Pat. No. 3,342,599 and *Research Disclosure*, No. 14,850 and ibid., No. 15,159 and compounds described in *Research Disclosure*, No. 13,924.

In the light-sensitive materials of the present invention, a roll-form film which allows signals to be easily inputted in the transparent magnetic recording layer during the conveying of the film in cameras or printers is a preferred form. In the roll-form film, it is preferred that the area of the image exposure part per one frame is not smaller than 350 mm², but not more than 1200 mm² and a space capable of recording magnetic information is at least 15% of said area of the image exposure part per one frame. Concretely, it is preferable that the number of perforations per a picture is less than 135 formats. It is particularly preferred that the number of perforations per a frame is not more than 4.

Optical information can be inputted in the magnetic information-recordable space by using emission devices such as LED. It is also preferable that magnetic information and optical information in a superposed form are inputted into said space. It is preferred that magnetic recording format is made according to the system disclosed in WO (PCT) 90-04205.

When the light-sensitive materials of the present invention are used in the form of a roll, it is preferred that a roll of a film is housed in a cartridge. Cartridges which are most widely used are current patrones with a 135 format. In the present invention, there can be particularly effectively used cartridges described in JP-A-U-58-67329 (the term "JP-A-U" as used herein means an "unexamined published Japanese utility model publication"), JP-A-58-181035, JP-A-58-182634, JP-A-U-58-195236, U.S. Pat. No. 4,221,479, JP-A-1-231045, JP-A-2-124564, JP-A-2-170156, Japanese Patent Application No. 1-21862, JP-A-2-205843, JP-A-2-210346, JP-A-2-199451, JP-A-2-201441, JP-A-2-214853, JP-A-2-211443, JP-A-2-264248, JP-A-3-37646, JP-A-3-37645, JP-A-2-124564 and U.S. Pat. Nos. 4,846,418, 4,848,693 and 4,832,275.

In the films of the present invention, a roll-form having a transparent magnetic recording layer or a stripe layer, which allows signal input to be easily made during conveying in cameras or printers is a preferred form. In the roll-form films, it is preferred that the area of image exposure part per one frame is 350 to 1200 mm², and a magnetic recordable space is at least 15% of said area of the image exposure part per one frame concretely, it is preferable that the number of perforations per one frame is less than 135 formats. It is particularly preferred that the number of perforations per one frame is not more than 4.

Optical information together with magnetic information may be recorded by using emission devices such as LED.

The present invention is now illustrated in greater detail by way of the following examples, but it should be understood that the present invention is not limited thereto.

EXAMPLE 1

(1-1) Preparation of Base

A dope solution (A) having the following composition was prepared by using a solution obtained by kneading Co-doped γ-ferric oxide (acicular particles, specific surface area: 38 m²/g, Hc: 800 Oe) with cellulose triacetate to disperse the oxide therein. Separately, a dope solution (B) containing no magnetic recording material was prepared.

|  | (A) Parts | (B) Parts |
|---|---|---|
| Cellulose triacetate | 10.0 | 23.0 |
| Triphenyl phosphate | 1.0 | 2.3 |
| Biphenyl diphenyl phosphate | 0.6 | 1.3 |
| Co-doped γ-ferric oxide | 3.0 | — |
| Methylene chloride | 76.1 | 65.7 |
| Methanol | 3.5 | 2.9 |
| n-Butanol | 5.8 | 4.8 |

The solution (B) only was cast on a casting band to prepare a base a of 115 μm in thickness. The solution (A) and the solution (B) were co-cast on a band by using a dual slip die in such a manner that the upper layer was formed by the solution (A). In this co-casting, the thickness of (A) was 5 μm, that of (B) was 110 μm and a spacer was provided on the slip of (A) to form a base wherein the width of (A) was 4 mm and that of the area of only (B) [(A) being not superposed thereon] was 31 mm. The base was referred to as base b. Further, there were prepared a base c wherein the width of (A) was 8 mm and that of the area of only (B) was 27 mm, and a base d wherein (B) was provided on the whole surface of (A).

Further, the solution (A) and a base wherein (B) was coated on the slip other than the slip part of (A) so as to give a thickness of 5 mm, were co-cast on (B) of 110 μm in thickness. In this casting, the resulting base wherein the width of (A) part was 4 mm and the width of other part than (A) on the slip was made 31 mm by using (B) was referred to as base e. The resulting base wherein the width of (A) part was 8 mm and the width of other part than (A) was made 27 mm by (B) was referred to as base f.

When the magnetic recording layer was provided, each sample was subjected to magnetic field orientation of 2000 gauss by permanent magnet before drying. Further, the following back layers were provided thereon. In the base b and the base e, the striped magnetic recording layer part rose slightly. Other bases had a smooth surface.

| Composition of back layer | |
|---|---|
| First layer | |
| Cellulose triacetate | 0.1 g/m² |
| Ethylene glycol | 0.08 g/m² |
| [structure: −[⊕N(piperazine)N⊕−CH₂−(phenyl)−CH₂−]ₙ 2Cl⊖] | 0.05 g/m² |
| Second layer | |
| Cellulose Diacetate | 0.32 g/m² |
| Aerosil | 0.02 g/m² |
| (n)C₁₅H₃₁COOC₄₀H₈₁(n) | 0.02 g/m² |
| Matting agent M-6 | 0.02 g/m² |

The bases obtained by coating the first back layer had a coercive force of 980 Oe and a square ratio of 0.84. Hence, it was confirmed that a signal input system disclosed in WO (PCT) 90-04205 was applicable.

(1-2) Preparation of Light-sensitive Material

Other side (side opposed to the back layer) of the above undercoated cellulose triacetate film support was subjected to a corona discharge treatment, and the following layers were coated thereon to prepare each of multi-layer color light-sensitive materials as samples.

Composition of Light-sensitive Layer

Light-sensitive layers were prepared in the same manner as in the preparation of light-sensitive layers of Example 1 of JP-A-2-93641 except that further 50 mg/m² of S-1, 10 mg/m² of I-9 and 20 mg/m² of M-2 were added to the outermost protective layer.

Processing of Sample

Each sample was slitted into a film of 35 mm in width. With regard to the bases b and e having a striped magnetic recording layer, each sample was processed into such a film that the magnetic recording layer of 4 mm in width was positioned on one end of the film. With regard to the bases c and f having the magnetic recording layer of 8 mm, each sample was processed into such a film that the center of the magnetic recording layer of 8 mm was cut so that the magnetic recording layer of 4 mm in width was positioned on both ends of the film of 35 mm in width.

Recording was carried out on the magnetic stripe at a recording density of 1000 BPI and at a feed rate of 30 mm/s by using 3-channel head capable of conducting input and output with a track width of 0.7 mmm and a width of 0.7 mmm between tracks. Each head had the same performance, head gap was 1.5μ and the number of turns was 1000. The sample using base b was similarly evaluated.

The format of the sample was made as shown in FIG. 1 and the sample was set as a film 24 exposures.

These samples were developed in the following manner.

| | |
|---|---|
| Color development | 3 min 15 sec |
| Bleaching | 6 min 30 sec |
| Rinse | 2 min 10 sec |
| Fixing | 4 min 20 sec |
| Rinse | 3 min 15 sec |
| Stabilization | 1 min 05 sec |

Each processing solution used in each stage had the following composition.

| | |
|---|---|
| Color developing solution | |
| Diethylenetriaminepentaacetic acid | 1.0 g |
| 1-Hydroxyethylidene-1,1-diphosphonic acid | 2.0 g |
| Sodium bisulfite | 4.0 g |
| Potassium carbonate | 30.0 g |
| Potassium bromide | 1.4 g |
| Potassium iodide | 1.3 g |
| Hydroxylamine sulfate | 2.4 g |
| 4-(N-Ethyl-N-β-hydroxyethylamino)-2-methylaniline sulfate | 4.5 g |
| Water to make | 1.0 liter |
| | pH 10.0 |
| Bleaching solution | |
| Ammonium (ethylenediaminetetra-acetate) iron(III) | 100.0 g |
| Disodium ethylenediaminetetraacetate | 10.0 g |
| Ammonium bromide | 150.0 g |
| Ammonium nitrate | 10.0 g |
| Water to make | 1.0 liter |
| | pH 6.0 |
| Fixing solution | |
| Disodium ethylenediaminetetraacetate | 1.0 g |
| Sodium sulfite | 4.0 g |
| Aqueous solution of ammonium thiosulfate (70%) | 175.0 g |
| Sodium bisulfite | 4.6 g |
| Water to make | 1.0 liter |
| | pH 6.6 |
| Stabilizing solution | |
| Formalin (40%) | 2.0 ml |
| Polyoxyethylene p-mononorylphenyl ether (average degree of polymerization: 10) | 0.3 g |
| Water to make | 1.0 liter |

The performance of the resulting samples was evaluated.

(1) Adhesion Test

The sample before and after development is housed as a roll film of 24 exposures in the cartridge of FIG. 1, and left to stand under temperature and humidity conditions of 40° C. and 80% RH for 2 days. The adhesion of the 10 cm top part thereof is evaluated. The evaluation is represented by the percentage of area bonded.

(2) Transmittance Test

An unexposed sample is developed and fixed. The resulting sample is used in the test. The overall light transmittance of the image area of the sample is measured. The sample 1-1 (control) is referred to as standard (100). The transmittance in terms of the relative transmittance is shown in Table 1.

The overall light transmittance was measured according to ASTM D-1003.

(3) Bonding Test

The finished sample is left to stand at 25° C. and 60% RH for 2 weeks, and the bonding test is then carried out in the following manner. The side tested is the back layer side.

36 cuts are made on the back side by making 7 cuts at intervals of 5 mm in a lengthwise direction and in a crosswise direction. An adhesive tape (Nitto Tape, a product of Nitto Electric Industrial Co., Ltd.) is stuck thereon and rapidly peeled off in the direct of 180 degrees. When 90% or more is not peeled off in this test, the evaluation is made as class A. When 60% or more is not peeled off, the evaluation is made as class B. When the area left not peeled off is 60% or less, the evaluation is made as class C. Among the three grades in the above evaluation, class A is considered to have bond strength capable of withstanding sufficiently practical use as photographic materials. The test is made on the back side.

(4) Evaluation of Magnetic Output Error

A light-sensitive material into which magnetic input is made from the back side by the signal input system disclosed in the aforesaid WO (PCT) 90-04205, is subjected to output operation 300 times by a magnetic head. The number of times of error made is shown in Table 1. The evaluation of output error is also made on a photographic material which is developed after magnetic input is made into the light-sensitive material.

The evaluation is made under conditions of 25° C. and 80% RH.

-continued

| | |
|---|---|
| Ethylene glycol | 0.08 g/m² |
| SnO₂/Sb₂O₃/SiO₂ (90/10/1 by mol, average particle size: 0.12 μm) | 0.2 g/m² |

(ii) Second Back Layer

A coating solution having the following formulation for the 2nd back layer was used.

| | (C) | (D) |
|---|---|---|
| Acetylcellulose | 6 g | 6 g |
| Fine powder of Co-doped iron oxide | 0.6 g | — |
| Methylene chloride | 100 cc | 100 cc |

Only (D) was coated in such an amount as to give a coating weight of 1.5 g/m² to prepare a base which was referred to as base g. A base wherein the width of an area coated with only (C) was 4 mm and that of uncoated area was 31 mmm, was referred to as base h. A base wherein the width of an area coated with only (C) was 8 mm and that of uncoated area was 27 mm, was referred to as base i. A base wherein the uncoated area of the base h was coated with (D) in a coating weight of 1.5 g/m² was referred to as base j. A base wherein the uncoated area of the base i was coated with (D) in a coating weight of 1.5 g/m² was referred to as base k. In the bases h and i, the magnetic recording part was protruded. Further, a base wherein the whole surface was coated with (C) in a coating weight of 1.5 g/m² was referred to as base l.

(iii) Third Back Layer

TABLE 1

| Sample No. | Base | Adhesion test Before processing | Adhesion test After processing | Transmittance | Bonding test | Magnetic output error Before processing | Magnetic output error After processing |
|---|---|---|---|---|---|---|---|
| 1-1 (control) | base a | 5 | 5 | 100 | A | — | — |
| 1-2 (invention) | base b | 10 | 5 | 100 | A | 1 | 0 |
| 1-3 (invention) | base c | 10 | 10 | 100 | A | 0 | 1 |
| 1-4 (comparison) | base d | 5 | 5 | 86 | A | 2 | 1 |
| 1-5 (invention) | base e | 5 | 5 | 100 | A | 0 | 0 |
| 1-6 (invention) | base f | 5 | 5 | 100 | A | 0 | 1 |

It is apparent from Table 1 that the samples 1-2, 1-3, 1-5 and 1-6 of the present invention are excellent in transmittance, have good adhesion and bond strength and exhibit good results with regard to the test of magnetic output error.

Particularly, the samples 1-5 and 1-6 using the base having a uniform thickness throughout the base are excellent ones which do not cause the deterioration of adhesion, while the comparative sample 1-4 is remarkably poor in transmittance.

EXAMPLE 2

(2-1) Preparation of Support

A cellulose triacetate dope solution was cast to prepare a film base (the film thickness being shown in Table 2).

One side (back layer) of the base was provided with the following back layers.

(i) First Back Layer

| | |
|---|---|
| Cellulose triacetate | 0.1 g/m² |

| | |
|---|---|
| Polymethyl methacrylate | 0.32 g/m² |
| Aerosil | 0.02 g/m² |
| M-6 | 0.01 g/m² |
| S'-3 | 0.02 g/m² |

The back side prepared above had a coercive force of 980 Oe.

(2-2) Preparation of Light-sensitive Layer

Light-sensitive layers were provided on other side (side opposed to the back layer) of the support prepared in the above (2-1) in the same manner as in Example 1-2.

The samples prepared above were evaluated as shown in Table 2.

It is apparent from Table 2 that the samples 2-2 to 2-5 having a striped magnetic recording layer according to the present invention are excellent in all respects, and particularly the samples 2-4 and 2-5 having a smooth surface are superior without causing the deterioration of adhesion, while the sample 2-1 (control) and comparative sample 2-6 are incapable of simultaneously satisfying all of performances described in Table 2.

TABLE 2

| Sample No. | Base | Adhesion test | | Transmittance | Bonding test | Magnetic output error | |
|---|---|---|---|---|---|---|---|
| | | Before processing | After processing | | | Before processing | After processing |
| 2-1 (control) | base g | 5 | 5 | 100 | A | — | — |
| 2-2 (invention) | base h | 10 | 15 | 100 | A | 1 | 0 |
| 2-3 (invention) | base i | 10 | 15 | 100 | A | 0 | 0 |
| 2-4 (invention) | base j | 5 | 5 | 100 | A | 1 | 0 |
| 2-5 (invention) | base k | 5 | 5 | 99 | A | 0 | 1 |
| 2-6 (comparison) | base l | 5 | 10 | 87 | A | 1 | 1 |

EXAMPLE 3

Supports having back layers were prepared in the same manner as in Example 2-1 except that the thickness of cellulose triacetate was 115 μm. Other side (side opposed to the back layer side) of each support was coated with the reversal color emulsion layers of the sample 101 of Example 1 of JP-A-2-854 except that 15 mg/m² of fluorine-containing surfactant of compound I-3 was added to the outermost layer (protective layer) of the emulsion layers.

Development was conducted by using CR-56 processing for reversal color development of Fuji Photo Film Co., Ltd.

Among the resulting samples 3-1 to 3-6, the samples 3-2 to 3-5 of the present invention are excellent in adhesion, transmittance, bond strength and magnetic characteristics, and the samples 3-4 and 3-5 having good surface smoothness are particularly superior, while the sample 3-1 (control) and comparative sample 3-6 are incapable of simultaneously satisfying all of the above performances. There is no Example 4.

EXAMPLE 5

(5-1) Preparation of Base

A cellulose triacetate dope solution containing γ-Fe₂O₃ (specific surface area: 25 m²/g, a product of Pfeizer, U.S.A.) dispersed therein and a cellulose triacetate dope solution were co-cast to prepare a film base having a transparent magnetic recording layer of 2 μm in thickness, the total thickness of the base film with the magnetic recording layer being 115 μm. The coating weight of $\gamma$-$Fe_2O_3$ was 0.14 g/m².

The base was coated with the back layers having the following compositions to prepare a base for light-sensitive material. The side having the magnetic recording layer was back layer side.

| Composition of back layer | |
|---|---|
| First layer | |
| Cellulose triacetate | 0.05 g/m² |
| Ethylene glycol | 0.08 g/m² |
| [⊕N⌐⌐N⊕—CH₂—⟨◯⟩—CH₂⌐]ₙ  Cl⊖ Cl⊖ | 0.06 g/m² |
| Second layer | |
| Cellulose diacetate | 0.32 g/m² |
| Aerosil | 0.02 g/m² |
| Slip agent | given in Table 5 |
| Poly(methyl methacrylate/divinyl-benzene) (molar ratio of 90:10, average particle size: 2.1 μm) | 0.03 g/m² |

The base had a coercive force of 520 Oe and a square ratio of 0.74 and hence it was confirmed that the signal input system disclosed in WO (PCT) 90-04205 was applicable.

(5-2) Preparation of Light-sensitive Material

Other side (side opposed to the back layer) of the above undercoated cellulose triacetate film support was subjected to a corona discharge treatment, and coated with the following layers to prepare a multi-layer color light-sensitive material as a sample.

Composition of Light-sensitive Layer

Light-sensitive layers were prepared in the same manner as in the preparation of the light-sensitive layers described in Example 1 of JP-A-2-93641 except that the slip agent of the present invention was added to the second protective layer as shown in Table 5.

Processing of Sample

Each sample was cut into a film of 24 exposures of 35 mm in width with a format of FIG. 1.

These samples were developed in the same manner as in Example 1.

These samples were evaluated in the following manner.

(1) Evaluation of Coefficient of Static Friction

After development, the sample is moisture-conditioned at 25° C. and 60% RH for 2 hours, and the static friction coefficient of the sample is measured by using a 5 mmφ stainless steel ball and HEIDON-10 static friction coefficient measuring apparatus. A smaller numerical value means better slipperiness.

(2) Evaluation of Delivery Torque of Film from Patrone After Development

The sample is cut into a film of 35 mm in width and 1.2 m in length, developed and then moisture-conditioned at 25° C. and 70% RH for 3 days. The patrone of FIG. 1 is loaded with the sample under same conditions.

The sample is placed in a moisture proof bag made of aluminum/polyethylene under the same temperature and humidity conditions, and the bag is hermetically sealed and allowed to stand at 40° C. for 3 days. The sample is taken out under conditions of 25° C. and 70% RH by rotating the spool (2 in FIG. 1), and evaluation is made by measuring torque when the film leaves the film leading-out port (5 in FIG. 1). A larger numerical value means poorer delivery.

(3) Evaluation of Mar Resistance

A diamond needle having a tip of 0.025 mmR is perpendicularly applied to the back side (side on which light-sensitive material is not coated) of the sample after development. A load is continuously applied thereto, and the back side of the sample is scratched at a rate of 60 cm/min (25° C., 60% RH).

After scratching, the sample is placed on a sharkasten, and a load on which mar begins to be observed therethrough is referred to as scratch strength. A larger numerical value means better results.

(4) Evaluation of Output Error of Magnetic Recording

A light-sensitive material into which magnetic input is made from the back side after development by the signal input system disclosed in the aforesaid WO (PCT) 90-04205, is subjected to output operation 1000 times by magnetic head. The number of times of error made is shown in Table 5.

The evaluation is made under conditions of 25° C. and 30% RH.

EXAMPLE 6

(6-1) Preparation of Support

A cellulose triacetate dope solution was cast to prepare a film base of 105 μm in thickness.

One side (back layer side) of the base was provided with the following back layers.

(i) First Back Layer

| | |
|---|---|
| Cellulose triacetate | 0.1 g/m$^2$ |
| Ethylene glycol | 0.08 g/m$^2$ |
| $SnO_2/Sb_2O_3/SiO_2$ (90/10/1 by mol, average partical size: 0.12 μm) | 0.19 g/m$^2$ |

(ii) Second Back Layer

| | |
|---|---|
| Butyl acetate/vinyl chloride polymer (50/50) | 2.5 g/m$^2$ |
| Fine powder of Co-doped iron oxide | 0.20 g/m$^2$ |

TABLE 5

| Sample No. | 2nd Back Layer Slip agent (mg/m$^2$) | 2nd Protective layer of light-sensitive material Slip agent (mg/m$^2$) | Static friction coefficient back layer side | Static friction coefficient light-sensitive material side | Delivery torque (g) | Mar resistance (g) | Magnetic output error (times) |
|---|---|---|---|---|---|---|---|
| 5-1 (control) | — | — | 0.49 | 0.53 | 1200 or above | 60 | 130 |
| 5-2 (comparison) | S-8 (40) | — | 0.21 | 0.51 | 730 | 105 | 9 |
| 5-3 (comparison) | — | S-1 (40) | 0.50 | 0.20 | 610 | 55 | 150 |
| 5-4 (comparison) | III-1 (40) | — | 0.19 | 0.49 | 590 | 120 | 8 |
| 5-5 (comparison) | III-5 (40) | — | 0.14 | 0.50 | 520 | 140 | 4 |
| 5-6 (comparison) | — | III-5 (40) | 0.47 | 0.17 | 750 | 60 | 93 |
| 5-7 (invention) | S-8 (40) | S-1 (40) | 0.22 | 0.20 | 280 | 110 | 10 |
| 5-8 (invention) | S-8 (40) | III-5 (40) | 0.21 | 0.16 | 220 | 125 | 7 |
| 5-9 (invention) | III-1 (40) | III-1 (40) | 0.20 | 0.19 | 190 | 105 | 5 |
| 5-10 (invention) | III-5 (40) | III-5 (40) | 0.14 | 0.15 | 160 | 140 | 2 |

It is apparent from Table 5 that the sample 5-1 (control) has a high static friction coefficient and is inferior in all of delivery torque, mar resistance and magnetic output error. The comparative samples 5-2 to 5-6 wherein either one of the back side and the emulsion side contains a slip agent, are somewhat improved in delivery torque, though the degree of the improvement is still insufficient. These comparative samples are incapable of satisfying both mar resistance and magnetic output error simultaneously, while the samples 5-7 to 5-10 having a static friction coefficient within the range of the present invention are satisfying in all respects with regard to delivery torque, mar resistance and magnetic output error. Accordingly, the present invention is superior.

(iii) Third Back Layer

| | |
|---|---|
| Polymethyl methacrylate | 0.32 g/m$^2$ |
| Aerosil | 0.02 g/m$^2$ |
| Poly(methyl methacrylate/divinylbenzene) (molar ratio: 95:5, average particle size: 0.85 μm) | 0.025 g/m$^2$ |

Light-sensitive material layers were provided on other side (side opposed to the back layer) of the support prepared above in the same manner as in Example 5-2 except that the slip agent was not added to the second protective layer.

After the resulting light-sensitive material was developed, a slip agent was coated on the back layer side and the emulsion layer side as shown in Table 6. The evaluation of performance was made.

TABLE 6

| Sample No. | Back layer side Slip agent (mg/m$^2$) | Light-sensitive material side Slip agent (mg/m$^2$) | Static friction coefficient back layer side | Static friction coefficient light-sensitive material side | Delivery torque (g) | Mar resistance (g) | Magnetic output error (times) |
|---|---|---|---|---|---|---|---|
| 6-1 (control) | — | — | 0.47 | 0.49 | 1200 or above | 65 | 163 |
| 6-2 (comparison) | S-1 (10) | — | 0.11 | 0.46 | 720 | 135 | 3 |
| 6-3 (comparison) | — | S-8 (10) | 0.46 | 0.12 | 670 | 60 | 192 |
| 6-4 (comparison) | III-5 (10) | — | 0.12 | 0.48 | 420 | 145 | 2 |
| 6-5 (comparison) | — | III-5 (10) | 0.48 | 0.12 | 390 | 55 | 149 |
| 6-6 (comparison) | III-6 (10) | — | 0.13 | 0.47 | 550 | 140 | 3 |
| 6-7 (invention) | S-1 (10) | S-8 (10) | 0.12 | 0.13 | 140 | 130 | 4 |

TABLE 6-continued

| Sample No. | Back layer side Slip agent (mg/m²) | Light-sensitive material side Slip agent (mg/m²) | Static friction coefficient back layer side | Static friction coefficient light-sensitive material side | Delivery torque (g) | Mar resistance (g) | Magnetic output error (times) |
|---|---|---|---|---|---|---|---|
| 6-8 (invention) | S-1 (10) | III-5 (10) | 0.11 | 0.12 | 120 | 135 | 5 |
| 6-9 (invention) | III-5 (10) | III-5 (10) | 0.12 | 0.12 | 100 | 140 | 3 |
| 6-10 (invention) | III-6 (10) | III-6 (10) | 0.13 | 0.12 | 100 | 135 | 3 |

It is apparent from Table 6 that the samples 6-7 to 6-10 having a static friction coefficient within the scope of the range of the present invention are excellent in all of delivery torque, mar resistance and magnetic output error, while the sample 6-1 (control) and comparative samples 6-2 to 6-6 wherein one side has a low static friction coefficient are incapable of satisfying simultaneously all of performances.

EXAMPLE 7

Supports having back layers were prepared in the same manner as in Example 6-1 except that the thickness of cellulose triacetate was 105 μm. Other side (side opposed to the back layer side) of each support was coated with the reversal color emulsion layers of the sample 101 of Example 1 of JP-A-2-854.

Development was conducted by using CR-56 processing for reversal color development of Fuji Photo Film Co., Ltd. In the same manner as in Example 6, a slip agent was coated on the back side and the emulsion layer side.

Among the resulting samples 7-1 to 7-10, the samples 7-7 to 7-10 of the present invention are excellent in delivery torque, mar resistance and magnetic characteristics, while the sample 7-1 (control) and comparative samples 7-2 to 7-6 are incapable of satisfying simultaneously all of performances.

EXAMPLE 8

(8-1) Preparation of Support

Polyethylene terephthalate was monoaxially oriented, and both side thereof were coated with an aqueous dispersion of a poly(vinylidene chloride/acrylonitrile/itaconic acid) (92:5:3 by mol, content after orientation: 1.5 g/m²), sodium dodecylbenzenesulfonate (2 mg/m²), silica particles (average particle size: 0.3 μm, 20 mg/m²), polystyrene particles (average particle size: 1.0 μm, 2 mg/m²), 2-hydroxy-4,6-dichloro-1,,3,5-triazine (35 mg/m²) and trimethylolpropane triaziridine (10 mg/m²). The coated support was again oriented on the way of drying to prepare a vinylidene chloride layer as the first undercoat layer on the support. The thickness of the resulting polyethylene terephthalate support was 90 μm.

Both sides were subjected to a corona discharge treatment and coated with gelatin (0.2 g/m²), poly-(degree of polymerization: 10)-oxyethylene dodecyl ether (2 mg/m²) and

(10 mg/m²) to form the second undercoat layer, thus obtaining a support.

(8-2) Preparation of Back Side

One side of the undercoated support prepared in (8-1) was coated with the following back layers.

(i) First Back Layer

| | |
|---|---|
| Fine powder of Co-doped iron oxide (contained as a gelatin dispersion, average particle size: 0.08 μm) | 0.2 g/m² |
| Gelatin | 3 g/m² |
| $(CH_2=CHSO_2NHCH_2CH_2NH)_2CO$ | 0.1 g/m² |
| 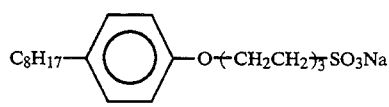 | 0.02 g/m² |
| Poly(ethyl acrylate) (average particle size: 0.08 μm) | 1 g/m² |

Second Back Layer

| | |
|---|---|
| Gelatin | 0.05 g/m² |
| $SnO_2/Sb_2O_3/SiO_2$ (90/10/1, average particle size: 0.1 μm) | 0.2 g/m² |
| Sodium dodecylbenzenesulfonate | 0.05 g/m² |

(iii) Third Back Layer

| | |
|---|---|
| Gelatin | 0.5 g/m² |
| Sodium di(2-ethylhexyl)sulfosuccinate | 0.01 g/m² |
| Slip agent | given in Table 8 |
| Poly(methyl methacrylate) (average particle size; 1.5 μm) | 0.04 g/m² |

The resulting back layer had a coercive force of 920 Oe.

(8-3) Preparation of Emulsion Layer Side

Other side of the support having the back layer side prepared in (8-2) was coated with the emulsion layers of the light sensitive material 1 of Example 1 of JP-A-2-93641.

Development was conducted in the same manner as in Example 1.

The characteristics of the resulting samples were evaluated in the same manner as in Example 5. The results are shown in Table 8.

TABLE 8

| Sample No. | 2nd Back layer Slip agent (mg/m²) | 2nd Protective layer of light-sensitive material Slip agent (mg/m²) | Static friction coefficient back layer side | Static friction coefficient light-sensitive material side | Delivery torque (g) | Mar resistance (g) | Magnetic output error (times) |
| --- | --- | --- | --- | --- | --- | --- | --- |
| 8-1 (control) | — | — | 0.51 | 0.52 | 1200 or above | 40 | 232 |
| 8-2 (comparison) | S-3 (30) | — | 0.21 | 0.51 | 670 | 100 | 12 |
| 8-3 (comparison) | — | S-3 (40) | 0.50 | 0.20 | 760 | 45 | 205 |
| 8-4 (comparison) | S-7 (30) | — | 0.19 | 0.50 | 530 | 110 | 15 |
| 8-5 (comparison) | III-5 (30) | — | 0.14 | 0.51 | 480 | 100 | 13 |
| 8-6 (comparison) | — | III-5 (40) | 0.49 | 0.18 | 690 | 40 | 187 |
| 8-7 (invention) | S-3 (30) | S-3 (40) | 0.19 | 0.22 | 290 | 115 | 9 |
| 8-8 (invention) | S-7 (30) | S-7 (40) | 0.20 | 0.20 | 270 | 105 | 10 |
| 8-9 (invention) | III-5 (30) | III-5 (40) | 0.15 | 0.16 | 180 | 105 | 6 |
| 8-10 (invention) | III-6 (30) | III-6 (40) | 0.15 | 0.17 | 170 | 105 | 8 |
| 8-11 (comparison) | S-3 (10) | S-3 (10) | 0.31 | 0.35 | 470 | 70 | 152 |
| 8-12 (comparison) | III-5 (10) | III-5 (10) | 0.28 | 0.32 | 510 | 75 | 79 |

It is apparent from Table 8 that the samples 8-7 to 8-10 having a static friction coefficient within the range of the present invention are excellent in all of delivery torque, mar resistance and magnetic output error, while the sample 8-1 (control) and comparative samples 8-2 to 8-6, 8-11 and 8-12 wherein only one side has a low static friction coefficient are incapable of satisfying simultaneously all of performances.

EXAMPLE 9

Dope solutions (A) and (B) prepared in Example 1 were co-cast on a casting band by using a dual slip die in such a manner that the upper layer was formed by (A). In this co-casting, (A) and (B) were used in such an amount that (A) gave a dry film of 5μ and (B) gave a dry film of 110 μm. Further, a spacer was provided on the slip of (A) to form a base wherein the width of the magnetic recording layer was 4 mm and the space between the magnetic recording layers was 26 mm.

When the magnetic recording layer was provided, the sample was subjected to magnetic field orientation of 2000 gauss by permanent magnet before drying.

The following protective layer for back layer was coated on the base having the magnetic recording layer.

| | |
| --- | --- |
| Cellulose diacetate | 0.2 g/m² |
| Aerosil | 0.02 g/m² |
| Poly(methyl methacrylate/divinyl-benzene) (90:10 by mol, average particle size: 1.5 μm) | 0.03 g/m² |
| Slip agent | given in Table 9 |

Other side (side opposed to the magnetic recording layer) was undercoated in conventional manner and then coated with color negative photographic emulsion layers having the same formulations as those of the sample 101 described in Example of JP-A-2-44345.

The resulting photographic film was developed in the same manner as in Example 1, and a slip agent as described in Table 9 was coated on the emulsion side. Each sample was slitted into a film of 35 mm in width so that the magnetic stripe layer of 4 mm in width was provided on both sides thereof. Recording was made on the magnetic stripe at a recording density of 1000 BPI and at a delivery rate of 30 mm/s by using 3-channel head capable of conducting input and output with a track width of 0.7 mm and a width of 0.7 mm between tracks. Each head had the same performance, head gap was 1.5μ and the number of turns was 1000.

Evaluation was made in the same manner as in Example 5. The results are shown in Table 9.

TABLE 9

| Sample No. | Back protective layer Slip agent (mg/m²) | Light-sensitive material side Slip agent (mg/m²) | Static friction coefficient back layer side | Static friction coefficient light-sensitive material side | Delivery torque (g) | Mar resistance (g) | Magnetic output error (times) |
| --- | --- | --- | --- | --- | --- | --- | --- |
| 9-1 (control) | — | — | 0.52 | 0.49 | 1200 or above | 35 | 215 |
| 9-2 (comparison) | S-3 (30) | — | 0.22 | 0.51 | 590 | 95 | 5 |
| 9-3 (comparison) | — | S-3 (10) | 0.51 | 0.16 | 730 | 40 | 187 |
| 9-4 (comparison) | S-7 (30) | — | 0.18 | 0.52 | 630 | 120 | 4 |
| 9-5 (comparison) | III-5 (30) | — | 0.16 | 0.50 | 580 | 120 | 5 |
| 9-6 (comparison) | — | III-5 (10) | 0.50 | 0.11 | 520 | 40 | 198 |
| 9-7 (invention) | S-3 (30) | S-3 (10) | 0.19 | 0.12 | 210 | 105 | 10 |
| 9-8 (invention) | S-7 (30) | S-7 (10) | 0.21 | 0.12 | 200 | 105 | 9 |
| 9-9 (invention) | III-5 (30) | III-5 (10) | 0.16 | 0.11 | 160 | 110 | 5 |
| 9-10 (invention) | III-6 (30) | III-6 (10) | 0.17 | 0.13 | 170 | 110 | 6 |
| 9-11 (comparison) | S-3 (10) | S-3 (2) | 0.30 | 0.29 | 430 | 60 | 132 |
| 9-12 (comparison) | III-5 (10) | III-5 (2) | 0.28 | 0.32 | 450 | 65 | 119 |

It is apparent from Table 9 that the samples 9-7 to 9-10 having a static friction coefficient within the scope of the present invention are excellent in all of delivery torque, mar resistance and magnetic output error, while the sample 9-1 (control) and comparative samples 9-2 to 9-6, 9-11 and 9-12 wherein only one side has a low static friction coefficient are incapable of satisfying simultaneously all of performances.

EXAMPLE 10

(10-1) Preparation of Base

A cellulose triacetate dope solution containing $\gamma$-$Fe_2O_3$ (specific surface area: 25 $m^2/g$, a product of Pfeizer, U.S.A.) dispersed therein and a cellulose triacetate dope solution were co-cast to prepare a film base having a transparent magnetic recording layer of 2 $\mu m$ in thickness, the total thickness of the bases with the magnetic recording layer being 115 $\mu m$. The coating weight of $\gamma$-$Fe_2O_3$ was 0.14 $g/m^2$.

Back layers having the following compositions were provided on the base to form a base for light-sensitive material. The side having the magnetic recording layer was the back layer side.

| Composition of back layer | |
|---|---|
| First layer | |
| Cellulose triacetate | 0.05 $g/m^2$ |
| Ethylene glycol | 0.08 $g/m^2$ |
| 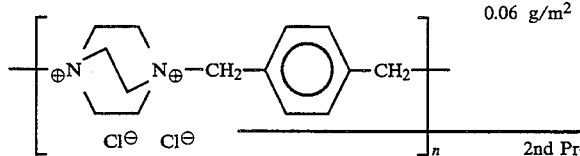 | 0.06 $g/m^2$ |
| Second layer | |
| Cellulose diacetate | 0.32 $g/m^2$ |
| Aerosil | 0.02 $g/m^2$ |
| Slip agent | given in Table 10 |
| Poly(methyl methacrylate/divinyl-benzene) (90:10 by mol, average particle size: 2.1 $\mu m$) | 0.03 $g/m^2$ |

The base had a coercive force of 520 Oe and a square ratio of 0.74. It was confirmed that the signal input system disclosed in WO (PCT) 90-04205 was applicable.

(10-2) Preparation of Light-sensitive Material

Other side (side opposed to the back layer) of the above undercoated cellulose triacetate film support was subjected to a corona discharge treatment, and coated with the following layers having the following compositions to prepare a multi-layer color light-sensitive material as a sample.

Composition of Light-sensitive Layer

Light-sensitive layers were prepared in the same manner as in the preparation of the light-sensitive layers of Example 1 of JP-A-2-93641 except that the slip agent of the present invention was added to the second protective layer as shown in Table 10.

Processing of Sample

Each sample was cut into a film of 24 exposures of 35 mm in width with the format of FIG. 1.

These samples were developed in the same manner as in Example 1.

The evaluation of these samples was made in the same manner as in Example 5. The evaluation of output error of magnetic recording was made in the following manner.

Evaluation of Output Error of Magnetic Recording

A light-sensitive material into which magnetic input is made from the back side by the signal input system disclosed in the aforesaid WO (PCT) 90-04205, is subjected to output operation 300 times by a magnetic head. The number of times of error made is shown in Table 10. The evaluation of output error is also made on a photographic material which is developed after magnetic input is made into the light-sensitive material.

The evaluation is made under conditions of 25° C. and 80% RH.

TABLE 10

| Sample No. | 2nd Back layer Slip agent (mg/m²) | 2nd Protective layer of light-sensitive material Slip agent (mg/m²) | Static friction coefficient back layer side | Static friction coefficient light-sensitive material side | Delivery torque (g) | Mar resistance (g) | Magnetic output error (times) |
|---|---|---|---|---|---|---|---|
| 10-1 (control) | — | — | 0.52 | 0.48 | 1200 or above | 50 | 65 |
| 10-2 (comparison) | S-8 (20) | — | 0.18 | 0.49 | 540 | 120 | 2 |
| 10-3 (comparison) | — | S-1 (30) | 0.47 | 0.16 | 690 | 40 | 58 |
| 10-4 (comparison) | III-1 (30) | — | 0.21 | 0.51 | 520 | 105 | 1 |
| 10-5 (comparison) | III-5 (30) | — | 0.12 | 0.48 | 490 | 135 | 1 |
| 10-6 (comparison) | — | III-5 (40) | 0.49 | 0.22 | 630 | 55 | 69 |
| 10-7 (invention) | S-8 (20) | S-1 (30) | 0.17 | 0.15 | 190 | 115 | 1 |
| 10-8 (invention) | S-8 (30) | III-5 (40) | 0.16 | 0.21 | 210 | 125 | 2 |
| 10-9 (invention) | III-1 (30) | III-1 (40) | 0.20 | 0.22 | 250 | 105 | 3 |
| 10-10 (invention) | III-5 (30) | III-5 (40) | 0.11 | 0.20 | 150 | 140 | 0 |

It is apparent from Table 10 that the sample 10-1 (control) has a high static friction coefficient and is inferior in all of delivery torque, mar resistance and magnetic output error. The comparative samples 10-2 to 10-6 wherein the slip agent is contained in either one of the back layer side or the emulsion layer side are somewhat improved in delivery torque, though the degree of the improvement is still insufficient, and these comparative samples are incapable of satisfying simultaneously both mar resistance and magnetic output error. On the other hand, the samples 10-7 to 10-10 having a static friction coefficient within the scope of the present invention are capable of satisfying all of delivery torque, mar resistance and magnetic output error. Accordingly, the present invention is superior.

EXAMPLE 11

(11-1) Preparation of Support

A cellulose triacetate dope solution was cast to prepare a film base of 105 $\mu m$ in thickness.

One side (back layer side) of the support was provided with the following back layers.

(i) First Back Layer

| | |
|---|---|
| Cellulose triacetate | 0.1 g/m² |
| Ethylene glycol | 0.08 g/m² |
| SnO₂/Sb₂O₃/SiO₂ (90/10/1 by mol, average particle size: 0.12 μm) | 0.19 g/m² |

(ii) Second Back Layer

| | |
|---|---|
| Butyl acetate/vinyl chloride polymer (50/50) | 2.5 g/m² |
| Fine powder of Co-doped iron oxide | 0.20 g/m² |

(iii) Third Back Layer

| | |
|---|---|
| Polymethyl methacrylate | 0.32 g/m² |
| Aerosil | 0.02 g/m² |
| Poly(methyl methacrylate/divinylbenzene) (95:5 by mol, average particle size: 0.85 μm) | 0.025 g/m² |
| Slip agent | given in Table 11 |

P The back side prepared above had a coercive force of 980 Oe.

(11-2) Preparation of Light-sensitive Material Layer

Other side (side opposed to the back layer) of the support prepared in the above (11-1) was coated with a light-sensitive material layer in the same manner as in Example 10-2.

The evaluation of the resulting samples was made. The results are shown in Table 11.

TABLE 11

| Sample No. | 2nd Back layer Slip agent (mg/m²) | 2nd Protective layer of light-sensitive material Slip agent (mg/m²) | Static friction coefficient back layer side | Static friction coefficient light-sensitive material side | Delivery torque (g) | Mar resistance (g) | Magnetic output error (times) |
|---|---|---|---|---|---|---|---|
| 11-1 (control) | — | — | 0.43 | 0.51 | 1200 or above | 70 | 32 |
| 11-2 (comparison) | S-1 (30) | — | 0.16 | 0.49 | 410 | 125 | 1 |
| 11-3 (comparison) | — | S-8 (40) | 0.45 | 0.15 | 670 | 60 | 29 |
| 11-4 (comparison) | III-5 (30) | — | 0.12 | 0.48 | 380 | 135 | 1 |
| 11-5 (comparison) | — | III-5 (30) | 0.45 | 0.16 | 580 | 60 | 35 |
| 11-6 (comparison) | III-6 (30) | — | 0.11 | 0.45 | 350 | 130 | 3 |
| 11-7 (invention) | S-1 (20) | S-8 (40) | 0.15 | 0.14 | 170 | 135 | 0 |
| 11-8 (invention) | S-1 (30) | III-5 (30) | 0.14 | 0.13 | 110 | 140 | 0 |
| 11-9 (invention) | III-5 (30) | III-5 (30) | 0.12 | 0.14 | 100 | 145 | 0 |
| 11-10 (invention) | III-6 (30) | III-6 (30) | 0.11 | 0.15 | 105 | 140 | 0 |

It is apparent from Table 11 that the samples 11-7 to 11-10 having a static friction coefficient within the range of the present invention are excellent in all of delivery torque, mar resistance and magnetic output error, while the sample 11-1 (control) and comparative samples 11-2 to 11-6 wherein only one side has a low static friction coefficient are incapable of satisfying simultaneously all of performances.

EXAMPLE 12

Supports having back layers were prepared in the same manner as in Example 11-1 except that the thickness of cellulose triacetate was 105 μm. Other side (side opposed to the back layer side) of each support was coated with the reversal color emulsion layers of the sample 101 of Example 1 of JP-A-2-854.

Development was carried out by using CR-56 processing for reversal color development of Fuji Photo Film Co., Ltd.

Among the resulting samples 12-1 to 12-10, the samples 12-7 to 12-10 of the present invention are excellent in delivery torque, mar resistance and magnetic characteristics, while the sample 12-1 (control) and comparative samples 12-2 to 12-6 are incapable of satisfying simultaneously all of performances.

EXAMPLE 13

(13-1) Preparation of Support

Polyethylene terephthalate was monoaxially oriented, and both side thereof were coated with an aqueous dispersion of poly(vinylidene chloride/acrylonitrile/itaconic acid) (92:5:3 by mol, content after orientation: 1.5 g/m²), sodium dodecylbenzenesulfonate (2 mg/m²), silica particles (average particle size: 0.3 μm, 20 mg/m²), polystyrene particles (average particle size: 1.0 μm, 2 mg/m²), 2-hydroxy-4,6-dichloro-1,3,5-triazine (35 mg/m²) and trimethylolpropane triaziridine (10 mg/m²). The coated support was again oriented on the way of drying to prepare a vinylidene chloride layer as the first undercoat layer on the support. The thickness of the resulting polyethylene terephthalate support was 90 μm.

Both sides thereof were subjected to a corona discharge treatment and coated with gelatin (0.2 g/m²), poly(degree of polymerization: 10)-oxyethylene dodecyl ether (2 mg/m²) and

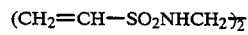

(10 mg/m²) to form the second undercoat layer, thus obtaining a support.

(13-2) Preparation of Back Side

The following back layers were coated on one side of the undercoated support prepared in the above (13-1).

(i) First Back Layer

| | |
|---|---|
| Fine powder of Co-doped iron oxide (contained as a gelatin dispersion, average particle size: 0.08 μm) | 0.2 g/m² |
| Gelatin | 3 g/m² |
| $(CH_2=CHSO_2NHCH_2CH_2NH)_2CO$ | 0.1 g/m² |

55

-continued

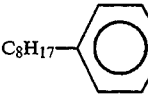
0.02 g/m²

| Poly(ethyl acrylate) (average particle size: 0.08 μm) | 1 g/m² |

(ii) Second Back Layer

| Gelatin | 0.05 g/m² |
| SnO₂/Sb₂O₃/SiO₂ (90/10/1, average particle size: 0.1 μm) | 0.2 g/m² |
| Sodium dodecylbenzenesulfonate | 0.05 g/m² |

(iii) Third Back Layer

| Gelatin | 0.5 g/m² |
| Sodium di(2-ethylhexyl)sulfosuccinate | 0.01 g/m² |
| Slip agent | given in Table 13 |
| Poly(methyl methacrylate) (average particle size; 1.5 μm) | 0.04 g/m² |

The resulting layer had a coercive force of 920 Oe.

(13-3) Preparation of Emulsion Layer Side

Other side (side opposed to the back layer side) of the support having the back layer side prepared in the above (13-2) was coated with the emulsion layers of the light sensitive material 1 of Example 1 of JP-A-2-93641.

Development was conducted in the same manner as in Example 1.

The characteristics of the resulting samples were evaluated in the same manner as in Example 10. The results are shown in Table 13.

56

EXAMPLE 14

(14-1) Preparation of Support

A cellulose triacetate dope solution was cast to prepare a film base (the thickness thereof being 110 μm).

The following back layers were coated on one side (back layer side) of the base.

(a) First Back Layer

| Cellulose triacetate | 0.1 g/m² |
| Ethylene glycol | 0.08 g/m² |
| SnO₂/Sb₂O₃/SiO₂ (90/10/1 by mol, average particle size: 0.12 μm) | 0.2 g/m² |

(b) Second Back Layer (i) Second Back Layer of the Present Invention

| Cellulose triacetate | 2.5 g/m² |
| Fine powder of Co-doped iron oxide | 0.5 g/m² |

The above layer having the above composition was coated on a photographic film of 35 mm in width in such a manner that both sides of the film was coated therewith, each coated side being 4 mm in width. Other area than both sides coated above was coated with triacetylcellulose through a spacer in such an amount as to give a coating weight of 2.6 g/m².

The back layer side prepared above had a coercive force of about 1000 Oe.

(14-2) Preparation of Light-sensitive Material Layer

Other side (side opposed to the back layer side) of the support prepared in the above (14-1) was coated with light-sensitive material layers in the same manner as in Example 10-2.

TABLE 13

| Sample No. | 2nd Back layer Slip agent (mg/m²) | 2nd Protective layer of light-sensitive material Slip agent (mg/m²) | Static friction coefficient back layer side | Static friction coefficient light-sensitive material side | Delivery torque (g) | Mar resistance (g) | Magnetic output error (times) |
|---|---|---|---|---|---|---|---|
| 13-1 (control) | — | — | 0.49 | 0.52 | 1200 or above | 30 | 75 |
| 13-2 (comparison) | S-3 (30) | — | 0.21 | 0.49 | 590 | 105 | 4 |
| 13-3 (comparison) | — | S-3 (40) | 0.47 | 0.22 | 830 | 35 | 60 |
| 13-4 (comparison) | S-7 (30) | — | 0.18 | 0.45 | 420 | 100 | 5 |
| 13-5 (comparison) | III-5 (30) | — | 0.12 | 0.48 | 390 | 120 | 1 |
| 13-6 (comparison) | — | — | 0.48 | 0.16 | 860 | 30 | 65 |
| 13-7 (invention) | S-3 (30) | S-3 (40) | 0.20 | 0.21 | 280 | 105 | 2 |
| 13-8 (invention) | S-7 (30) | S-7 (40) | 0.18 | 0.19 | 250 | 100 | 3 |
| 13-9 (invention) | III-5 (30) | III-5 (40) | 0.13 | 0.15 | 150 | 130 | 0 |
| 13-10 (invention) | III-6 (30) | III-6 (40) | 0.14 | 0.13 | 160 | 125 | 0 |
| 13-11 (comparison) | S-3 (10) | S-3 (10) | 0.30 | 0.32 | 650 | 60 | 28 |
| 13-12 (comparison) | III-5 (10) | III-5 (10) | 0.27 | 0.30 | 405 | 70 | 24 |

It is apparent from Table 13 that the samples 13-7 to 13-10 having a static friction coefficient within the range of the present invention are excellent in all of delivery torque, mar resistance and magnetic output error, while the sample 13-1 (control) and comparative samples 13-2 to 13-6 wherein only one side has a low static friction and the comparative samples 13-11 and 13-12 are incapable of satisfying simultaneously all of performances.

The evaluation of the resulting samples 14-1 to 14-10 was made.

The samples 14-2 to 14-6 of the present invention are excellent in delivery torque, mar resistance and magnetic output error, while the sample 14-1 (control) and comparative samples 14-7 to 14-10 are incapable of satisfying simultaneously all of delivery torque, mar resistance and magnetic output error.

EXAMPLE 15

(15-1) Preparation of Support (1) Preparation of Support A of the Present Invention To 100 parts by weight of dimethyl terephthalate, 70 parts by weight of ethylene glycol, 10 parts by weight of dimethyl 5-sodium-sulfoisophthalate and 10 parts by weight of dimethyl adipate were added 0.1 part by weight of calcium acetate and 0.03 part by weight of antimony trioxide. An ester exchange reaction was then carried out in a conventional manner. To the resulting product was added 0.05 part by weight of trimethyl phosphate. The temperature of the mixture was gradually elevated, pressure was reduced, and a polymerization reaction was carried out at 28° C. and under a pressure of finally not higher than 0.1 mmHg to obtain a copolymer polyethylene terephthalate A.

The copolymer polyethylene terephthalate A was dried in a conventional manner and melt-extruded at 280° C. to prepare an unoriented sheet. The sheet was oriented 3.5 times in the longitudinal direction at 90° C., then oriented 3.7 times in the crosswise direction at 95° C. and heat-fixed at 200° C. for 5 seconds to obtain a biaxially oriented film of 100 μm in thickness. This film was referred to as support A.

(2) Preparation of Support B of the Present Invention

The copolymerization was repeated in the same manner as described in the above (1) except that 10 parts by weight of disodium 3,5-di(methyloxycarbonyl)phenylphosphonate was used in place of 10 parts by weight of dimethyl 5-sodium-sulfoisophthalate to obtain a copolymer polyethylene terephthalate B. The resulting polyethylene terephthalate B was biaxially oriented in the same manner as described above to obtain a biaxially oriented film of 100 μm in thickness which was referred to as support B.

(3) Preparation of Comparative Support C

The procedure described in the above (1) was repeated except that 10 parts by weight of dimethyl isophthalate was used in place of 10 parts by weight of dimethyl 5-sodium-sulfoisophthalate. There was obtained a biaxially oriented film of 100 μm in thickness which was referred to as support C.

(4) Preparation of Comparative Support D

A coating solution comprising 23 parts by weight of cellulose triacetate, 2.3 parts by weight of triphenyl phosphate, 1.3 parts by weight of biphenyl diphenyl phosphate, 65.7 parts by weight of methylene chloride, 2.9 parts by weight of methanol and 4.8 parts by weight of n-butanol was coated on a casting band and dried to obtain a cellulose triacetate film of 115 μm in thickness which was referred to as support D.

(15-2) Preparation of Back of Photographic Film (1) Coating of Undercoat Layer One side of each of the supports A, B, C and D was subjected to a corona discharge treatment and coated with an undercoat layer having the following composition. The degree of the corona discharge treatment was 0.02 KVA·min/m².

| | |
|---|---|
| Gelatin | 3 g |
| Distilled water | 250 cc |
| Sodium α-sulfo-2-ethylhexyl succinate | 0.05 g |
| Formaldehyde | 0.02 g |

(2) Coating of Back Layer of Photographic Film (i) Coating of First Back Layer

The following first back layer was coated on the above undercoated support.

Preparation of Dispersion of Tin Oxide-antimony Oxide Composite Material 230 parts by weight of stannic chloride hydrate and 23 parts by weight of antimony trichloride were dissolved in 3000 parts by weight of ethanol to obtain a uniform solution. An aqueous solution of IN sodium hydroxide was added dropwise to the resulting solution until the pH of the solution reached 3 to obtain a coprecipitate of colloidal stannic oxide and antimony oxide. The resulting coprecipitate was left to stand at 50° C. for 24 hours to obtain a reddish brown colloidal precipitate.

The reddish brown colloidal precipitate was separated by centrifugation. Water was added to the precipitate to remove an excess of ion, and the precipitate was washed with water by centrifugation. This operation was repeated three times to remove an excess of ion.

After an excess of ion was remove, 200 parts by weight of colloidal precipitate was again dispersed in 1500 parts by weight of water. The dispersion was sprayed into a calcining furnace heated to 600° C. to obtain fine powder of a bluish tin oxide-antimony oxide composite material having an average particle size of 0.2μ. The fine powder had a resistivity of 25 Ω-cm.

The pH of a mixed solution of 40 parts by weight of the above fine powder and 60 parts by weight of water was adjusted to 7.0, and the mixture was roughly dispersed by means of a stirrer, and then dispersed in a horizontal sand mill (trade name: Dainomill, a product of Willya Bachofen AG) until residence time reached 30 minutes to prepare the desired dispersion.

Coating of Back Layer

The following formulation (A) was coated in such an amount as to give a dry film of 0.3μ in thickness, and the coated support was dried at 130° C. for 30 seconds.

| Formulation A | Parts by weight |
|---|---|
| Dispersion of electrically conductive fine particles | 10 |
| Gelatin | 1 |
| Water | 27 |
| Methanol | 60 |
| Resorcin | 2 |
| Polyoxyethylene nonylphenyl ether | 0.01 |

(ii) Coating of Second Back Layer

The following magnetic recording layer was coated on the first back layer prepared in the above (I).

| | |
|---|---|
| Gelatin | 0.2 g/m² |
| Fine powder of Co-doped iron oxide (specific surface area: 19 m²/g) | 0.03 g/m² |
| Fine powder of Co-doped iron oxide (specific surface area: 45 m²/g) | 0.01 g/m² |

-continued

| | |
|---|---|
| Fine powder of barium ferrite (specific surface area: 15 m²/g) | 0.01 g/m² |
| Fine powder of barium ferrite (specific surface area: 60 m²/g) | 0.01 g/m² |
| Poly(sodium styrenesulfonate) | 0.005 g/m² |
| Sodium di(2-ethylhexyl)sulfo-succinate | 0.005 g/m² |
| Poly(ethyl acrylate) (average particle size: 0.1 μm) | 0.01 g/m² |
| Carboxymethyl cellulose | 0.005 g/m² |
| Sodium dodecylbenzenesulfonate | 0.003 g/m² |
| 2-Hydroxy-4,6-dichloro-1,3,5-triazine | 0.01 g/m² |

(iii) Coating of Third Back Layer

The following third back layer was coated on the second back layer to obtain a support for light-sensitive material.

| | |
|---|---|
| Gelatin | 0.32 g/m² |
| Aerosil | 0.02 g/m² |
| Sodium dodecylbenzenesulfonate | 0.02 g/m² |
| (n)$C_{15}H_{31}COOC_{40}H_{81}$(n) | 0.02 g/m² |
| Matting agent Poly(methyl methacrylate/divinylbenzene) (90:10 by mol, average particle size: 1.2 μm) | 0.02 g/m² |
| $C_{21}H_{43}COOCH_2CH_2C_8H_{17}$(n) | 0.01 g/m² |
| $(CH_2=CHSO_2NHCH_2)_2-$ | 0.01 g/m² |

The resulting back side had a coercive force ranging from 800 to 900 Oe and was good.

(15-3) Preparation of Light Sensitive Material

Other side (side opposed to the back layer side) of each of the undercoated supports was subjected to a corona discharge treatment, and then coated with the following layers having the following compositions to prepare a multi-layer color light-sensitive material which was a photographic film.

Composition of Light-sensitive Layer

Light-sensitive layers were prepared in the same manner as in the preparation of the light-sensitive layers of Example 1 of JP-A-2-93641.

(15-4) Development of Photographic Film

The resulting photographic films were developed in the following manner when development was required.

The processor used was cine type automatic processor FNCP-900 manufactured by Fuji Photo Film Co., Ltd.

These samples were developed in the same manner as in Example 1.

The performance of the resulting samples was evaluated.

(15-5) Evaluation of Performance (1) Evaluation of Winding Smoothness

Each sample is slitted into a film of 35 mm in width. The resulting photographic film is charged into new cartridge of FIG. 6 according to the present invention.

The cartridge has outer diameter of 23 mm and an inner diameter of 21 mm, the spool 101 is 7 mm, and the photographic film charged is 1.5 m in length. The photographic film is left to stand at 40° C. and 60% RH for 24 hours, and the film is then taken out of the cartridge under the temperature and humidity conditions of 25° C. and 25% RH. The evaluation is made by measuring the diameter of the outermost periphery part. A larger numeral value means smoother in conducting winding. The evaluation is made for both undeveloped and developed photographic films.

(2) Evaluation of Delivery Torque of Photographic Film from Patrone

The cartridge having the photographic film obtained in the above (15-4) housed therein is moisture-conditioned at 25° C. and 70% RH for 3 days. The sample is placed in a moisture proof bag made of aluminum/polyethylene under the same temperature and humidity conditions, and bag is hermetically sealed and allowed to stand at 40° C. for 3 days. The sample is taken out under conditions of 25° C. and 70% RH by rotating the spool, and evaluation is made by measuring torque when the film leaves the film outlet. A large numerical value means poorer delivery.

Evaluation is made for both developed and undeveloped films.

(3) Evaluation of Conveyability in Printer

The same photographic film which is allowed to stand in the above (2) of (15-5) is cut into three pieces (each being 50 cm long × 35 mm wide) which are then joined by means of a cellophane adhesive tape. 100 sets of the joined samples are passed through printer FAP-7000 manufactured by Fuji Photo Film Co., Ltd. The evaluation is made by the number of times of failure in conveying in the printer.

(4) Evaluation of Output Error of Magnetic Recording

A light-sensitive material into which magnetic input is made from the back side after development by the signal input system disclosed in the aforesaid WO (PCT) 90-04205, is subjected to output operation 500 times by magnetic head. The number of times of error made is shown in Table 15.

The evaluation is made under conditions of 25° C. and 30% RH.

The results are shown in Table 15.

TABLE 15

| Sample No. | Support | Winding smoothness (mm) undeveloped film | Winding smoothness (mm) developed film | Delivery torque (g) undeveloped film | Delivery torque (g) developed film | Conveyability in printer (time) | Magnetic input and output error (times) | Adhesion* between magnetic substance layer and support layer |
|---|---|---|---|---|---|---|---|---|
| 15-1 (invention) | Support A | 50 | 49 | 270 | 240 | 0 | 2 | ◯ |
| 15-2 (invention) | Support B | 48 | 48 | 210 | 230 | 1 | 4 | ◯ |
| 15-3 (comparison) | Support C | 43 | 41 | 360 | 420 | 45 | 92 | ◯~△ |
| 15-4 (comparison) | Support D | 30 | 31 | 450 | 470 | 5 | 32 | ◯ |

*◯: Good, △: Moderate

It is apparent from Table 15 that the samples 15-1 and 15-2 using the support of the present invention are smooth in winding, have good delivery torque from patrone and good conveyability in printer and cause less input and output errors. On the other hand, the comparative sample 15-3 prepared by using comparative support C having no hydrophilic group is remarkably inferior in delivery torque, conveyability in printer and magnetic input and output errors, though winding is slightly smooth. Further, the sample 15-4 prepared by using triacetylcellulose support D has a difficulty in winding and is inferior in delivery torque and magnetic input and output errors.

The supports A and B having a hydrophilic group according to the present invention have good adhesion between the magnetic layer and support, while comparative support C having no hydrophilic group on the surface thereof has poor adhesion.

It will be understood that the problems which can not be solved by prior art can be solved by using the cartridge and photographic film of the present invention.

EXAMPLE 16

(16-1) Preparation of Support

Supports A, B, C and D were prepared in the same manner as in Example 15-1.

(16-2) Preparation of Back of Photographic Film (1) Coating of Undercoat Layer

The supports A, B, C and D were coated with an undercoat layer in the same manner as described in (1) of Example 15-2.

(2) Coating of Back Layer of Photographic Film

The following first, second and third back layers were coated on the whole surface of each of the supports A, B, C and D undercoated in the above (1).

(i) Coating of First Back Layer

| | |
|---|---|
| Cellulose triacetate | 0.1 g/m² |
| Ethylene glycol | 0.08 g/m² |
| SnO₂/Sb₂O₃/SiO₂ (90/10/1 by mol, average particle size: 0.12 μm) | 0.1 g/m² |

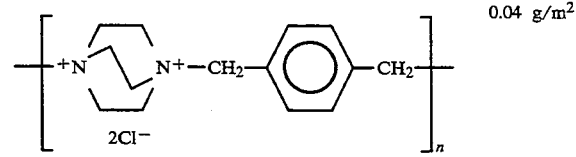

0.04 g/m²

| -continued | |
|---|---|
| (average particle size: 0.08 μm) | |

(ii) Coating of Second Back Layer

| | |
|---|---|
| Butyl acetate/vinyl chloride copolymer (1/1 by mol) | 0.5 g/m² |
| Fine powder of Co-doped iron oxide (specific surface area: 45 m²/g) | 0.03 g/m² |
| Fine powder of Co-doped iron oxide (specific surface area: 80 m²/g) | 0.03 g/m² |
| Fine powder of barium ferrite (specific surface area: 15 m²/g) | 0.03 g/m² |
| Fine powder of barium ferrite (specific surface area: 40 m²/g) | 0.03 g/m² |
| Toluene diisocyanate | 0.5 g/m² |
| Polyurethane resin | 0.1 g/m² |
| Triacetylcellulose | 0.1 g/m² |

(iii) Coating of Third Back Layer

| | |
|---|---|
| Diacetylcellulose | 0.2 g/m² |
| Colloidal sil (Aerosil) | 0.02 g/m² |
| C₁₅H₃₁COOC₄₀H₈₁ | 0.02 g/m² |
| C₂₁H₄₃COO(CH₂CH₂O)₃COC₉F₁₉ | 0.01 g/m² |
| Poly(vinylidene difluoride/vinylidene tetrafluoride) (9:1 by mol) | 0.01 g/m² |
| Poly(methyl methacrylate/divinylbenzene) (9:1 by mol, average particle size: 1.0 μm) | 0.03 g/m² |
| Silica (average particle size: 1.0 μm) | 0.005 g/m² |

The resulting back side had a coercive force ranging 950 to 1000 Oe.

(16-3) Preparation of Light-sensitive Material

Light-sensitive layers were coated in the same manner as described in Example 15-3 to prepare a photographic film.

(16-4) Development of Photographic Film

Development was conducted by using an automatic processor in the same manner as in Example 15-4 when development was required.

(16-5) Evaluation of Performance

Evaluation was made in the same manner as in Example 15-5.

The results are shown in Table 16.

TABLE 16

| Sample No. | Support | Winding smoothness (mm) | | Deliver torque (g) | | Conveyability in printer (time) | Magnetic input and output error (times) |
|---|---|---|---|---|---|---|---|
| | | undeveloped film | developed film | undeveloped film | developed film | | |
| 16-1 (invention) | Support A | 48 | 51 | 240 | 250 | 1 | 3 |
| 16-2 (invention) | Support B | 54 | 52 | 200 | 220 | 1 | 4 |
| 16-3 (comparison) | Support C | 41 | 39 | 390 | 400 | 33 | 164 |
| 16-4 (comparison) | Support D | 30 | 32 | 410 | 440 | 8 | 15 |

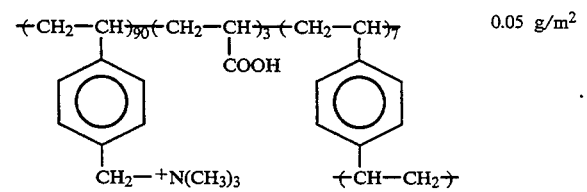

0.05 g/m²

It is apparent from Table 16 that the samples 16-1 and 16-2 using the support of the present invention are excellent in all of winding smoothness, delivery torque, conveyability in printer and magnetic input and output performance, while the comparative samples 16-3 and 16-4 are incapable of satisfying simultaneously all of these performances.

EXAMPLE 17

(17-1) Preparation of Support

Supports A, B, C and D were prepared in the same manner as in Example 15-1.

(17-2) Preparation of Back of Photographic Film

A back of the photographic film was prepared in the same manner as in Example 16-2.

(17-3) Preparation of Light-sensitive Material

Other side (side opposed to the back layer side) of each of the supports having the back layers obtained in the above (17-2) was subjected to a corona discharge treatment and then coated with the reversal color emulsion layers of the sample 101 of Example 1 of JP-A-2-854.

(17-4) Development of Photographic Film

Development was carried out by using CR-56 processing for the reversal color development of Fuji Photo Film Co., Ltd., when development was required. The processor used was E-6360 manufactured by Noritsu Koki KK.

Among the resulting samples 17-1 to 17-4, the samples 17-1 and 17-2 of the present invention are excellent in winding smoothness, delivery torque, conveyability in printer and magnetic input and output error, while the comparative samples 17-3 and 17-4 are inferior to those of the present invention in all of winding smoothness, delivery torque, conveyability in printer and magnetic input and output error.

Images obtained by using the samples of the present invention are excellent in sharpness and good images.

EXAMPLE 18

(18-1) Preparation of Support

Supports A, B, C and D were prepared in the same manner as in Example 15-1.

(18-2) Preparation of Back of Photographic Film

(1) Coating of Undercoat Layer

An undercoat layer was coated on each of the supports A, B, C and D in the same manner as in (1) of Example 15-2.

(2) Coating of Back Layer of Photographic Film

(i) Coating of First Back Layer

The first back layer was coated on the whole surface of the support in the same manner as described in (2-i) of Example 16-2.

(ii) Coating of Second Back Layer

| | |
|---|---|
| Butyl acetate/vinyl chloride copolymer (1:1 by mol) | 0.5 g/m$^2$ |
| Fine powder of Co-doped iron oxide (specific surface area: 45 m$^2$/g) | 0.2 g/m$^2$ |
| Fine powder of Co-doped iron oxide (specific surface area: 80 m$^2$/g) | 0.1 g/m$^2$ |
| Fine powder of barium ferrite (specific surface area: 15 m$^2$/g) | 0.2 g/m$^2$ |
| Fine powder of barium ferrite (specific surface area: 40 m$^2$/g) | 0.1 g/m$^2$ |
| Toluene diisocyanate | 0.5 g/m$^2$ |
| Polyurethane resin | 0.1 g/m$^2$ |
| Triacetylcellulose | 0.1 g/m$^2$ |

The above layer having the above composition was coated on a photographic film of 35 mm in width in such a manner that both sides of the film was coated therewith, each coated side being 4 mm in width.

Other area than both sides coated above was coated with a butyl acetate/vinyl chloride (1:1 by mol) copolymer (0.5 g/m$^2$), triacetylcellulose (0.2 g/m$^2$) and toluene diisocyanate (0.5 g/m$^2$) through a spacer.

(iii) Coating of Third Back Layer

A third back layer was coated in the same manner as described in (2-ii) of Example 16-2.

(iv) Coating of Fourth Back Layer

A fourth back layer was coated in the same manner as described in (2-iii) of Example 16-2.

Both sides of the resulting back layer had a coercive force of 1200 to 1300 Oe, and other part had a coercive force of 950 to 1000 Oe.

(18-3) Preparation of Light-sensitive Material

Photographic film samples 18-1 to 18-4 were prepared in the same manner as described in Example 16-3.

The resulting samples were developed in the same manner as in Example 1 when development was required. The evaluation of performance was made.

Among the resulting samples 18-1 to 18-4, the samples 18-1 and 18-2 of the present invention are excellent in winding smoothness, delivery torque and conveyability in printer and so good that magnetic input and output error is not made, while the comparative samples 18-3 and 18-4 using conventional supports C and D are poor in winding smoothness, have a high delivery torque, cause failure in the conveying of them through the printer and make many magnetic input and output errors.

It is clear from the above results that the new patrone system of the present invention is excellent in information recordability.

EXAMPLE 19

The procedure of Example 18 was repeated except that each of polyesters P-1, P-3, P-5, P-8, P-11, P-13 and P-15 of the present invention was used in place of the support A to obtain each of photographic films 19-1 to 19-7 of the present invention.

The performances thereof are so good that a difficulty in winding smoothness is scarcely caused, and they are excellent in delivery torque and cause neither failure in the conveying thereof through the printer nor magnetic input and output error.

EXAMPLE 20

(20-1) Preparation of Support

Dopes having the following compositions were prepared and co-cast to prepare a TAC support having a transparent magnetic layer on the whole surface thereof.

| | Parts by weight |
|---|---|
| Dope 1 | |
| TAC (cellulose triacetate) | 100 |
| Triphenyl phosphate | 16 |
| Dichloromethane | 270 |
| Butanol | 7 |
| Methanol | 70 |
| Dope 2 | |
| TAC | 100 |

-continued

| | Parts by weight |
|---|---|
| Triphenyl phosphate | 16 |
| Dichloromethane | 270 |
| Butanol | 7 |
| Methanol | 70 |
| Co-doped iron oxide (specific surface area: 19 m²/g) | 1.5 |
| Co-doped iron oxide (specific surface area: 45 m²/g) | 1.0 |
| Co-doped iron oxide (specific surface area: 15 m²/g) | 1.0 |
| Co-doped iron oxide (specific surface area: 60 m²/g) | 1.0 |

The dope 1 and the dope 2 were cocast on a casting band by using a cocasting dye in such an amount as to give a dry film of 110 μm and a dry film 3μ, respectively, to prepare a support having a transparent magnetic layer on the whole surface of one side thereof, The support was subjected to magnetic field orientation of 2000 gauss by a permanent magnet before drying when the magnetic recording layer was provided.

(20-2) Preparation of Back Layer

Back layers having the following compositions were coated on the back side (side having the magnetic recording layer) of the support.

| First back layer | |
|---|---|
| Cellulose triacetate | 0.1 g/m² |
| Ethylene glycol | 0.08 g/m² |
| [structure with ⊕N, N⊕—CH₂—(ring)—CH₂, 2Cl⊖]ₙ | 0.05 g/m² |
| Second back layer | |
| Cellulose diacetate | 0.32 g/m² |
| Aerosil | 0.02 g/m² |
| (n)C₁₅H₃₁COOC₄₁H₈₁(n) | 0.02 g/m² |
| Poly(methyl methacrylate/styrene) (95:5 by mol, average particle size: 2.0 μm) | 0.01 g/m² |

The resulting base had a coercive force of 500 to 550 Oe and a square ratio of 0.70 to 0.75. It was confirmed that the signal input system disclosed in WO (PCT) 90-04205 was applicable.

(20-3) Coating of Light-sensitive Layer

After the back layers were coated, other side was subjected to conventional undercoating treatment, and then coated with light-sensitive layers in the same manner as in the preparation of the light-sensitive layers of Example 1 of JP-A-2-93641. The layer structure of the thus-prepared photographic film is shown in FIG. 11.

(20-4) Processing of Sample

After the coating of the light-sensitive layers, the hardening reaction was allowed to proceed and the sample was slitted into a film of 35 mm in width, subjected to perforation processing as shown in FIG. 5 and then housed in the patrone as shown in FIG. 1. The film was wound up so that all of the light-sensitive layer side was inwardly positioned, and the film was housed in the patrone.

(20-5) Development of Photographic Film

After photographing was completed, the sample films were developed in the same manner as in Example 1. The processor used was cine type automatic FNCP-900 manufactured by Fuji Photo Film Co., Ltd.

Them performance of the resulting samples was evaluated.

(20-6) Housing of Developed Film in Patrone and Core Set

The above film was again rolled up in the same patrone in which the film was housed before development. The patrone had such a size that the outer diameter of the spool was 7.5 mm and the inner diameter of the main body of the patrone was 20 mm. The film was wound up in the patrone in such a manner that the light-sensitive layer side was outwardly positioned. For the purpose of comparison, another film was wound up in another patrone in such a manner that the light-sensitive layer side was inwardly positioned.

These samples were left to stand in an air constant temperature bath at 50° C. for 18 hours to fix the shape of the film in the wound-up form. The samples were then moisture-conditioned at 25° C. and 60% RH. Subsequently, these samples were used for evaluation.

(20-7) Evaluation of Performance

There were prepared samples wherein the film was wound up so that the light-sensitive layer side was outwardly positioned and samples wherein the film was wound up so that the light-sensitive layer side was inwardly positioned.

These samples were moisture-conditioned in an atmosphere of 25° C. and 20% RH for 3 hours or in an atmosphere of 25° C. and 60% RH for 3 hours. Subsequently, the following evaluation was made in each atmosphere.

(a) Evaluation of Winding Smoothness

Each sample film was taken out of the patrone in a predetermined atmosphere. After 5 minutes, the rolled diameter of the innermost periphery was measured by using a slide caliper. A larger numeral value means smoother in winding.

(b) Evaluation of Flatness and Conveyability in Printer

After a test pattern was photographed, the sample film was passed through a printer (Printer FAP-7000, manufactured by Fuji Photo Film Co., Ltd.) 10 times from the innermost side of the film, said innermost side being a position where the wound shape was most fixed. The passability was evaluated. The test pattern of the sample film was printed on photographic paper, and the flatness of the sample film in the printer was evaluated by the size of out-of-focus.

(c) Evaluation of Output Error of Magnetic Recording

A light-sensitive material into which magnetic input made from the back side after development by the signal input system described in the aforesaid WO (PCT) 90-04205, was subjected to output operation 100 times by magnetic head. The number of times of error made is shown in Table 20.

(d) Evaluation of Delivery Torque of Photographic Film from Patrone

The film was taken out by rotating the spool in the patrone, and evaluation was made by measuring torque when the film left the film outlet. A larger numeral value means poorer delivery.

(e) Measurement of Water Content in Gelatin layer

A sample as moisture-conditioned in a predetermined atmosphere was cut into a rectangle of 40 mm×9 mm, and the water content (x%) thereof was measured by Karl Fischer's method. Further, sampling was made from a part close to the above rectangle to obtain a sample having the same size. All of the light-sensitive layers were quickly shaven off by means of a razor. Immediately thereafter, the water content (y%) of the residue was measured by Karl Fischer's method. Accordingly, x−y (%)=water content in gelatin layer.

(20-8) Results of Evaluation

The results are shown in Table 20.

TABLE 20

| Type of winding | Atmosphere for evaluation | Winding smoothness (inmost diameter) (mm) | Jamming during conveying in printer* (times) | Out-of-focus during printing | Magnetic input and output error** (times) | Delivery torque (g) | Water content in gelatin layer (%) | |
|---|---|---|---|---|---|---|---|---|
| Light-sensitive layer side outwardly wound up | 25° C. 40% RH | 30 | 0 | ○ | 3 | 220 | 13.7 | invention |
| Light-sensitive layer side outwardly wound up | 25° C. 50% RH | 26 | 2 | Δ | 7 | 250 | 16.0 | Comp. Ex. A |
| Light-sensitive layer side inwardly wound up | 25° C. 40% RH | 22 | 3 | X | 12 | 260 | 13.3 | Comp. Ex. B |
| Light-sensitive layer side inwardly wound up | 25° C. 50% RH | 27 | 2 | Δ | 8 | 250 | 15.8 | Comp. Ex. C |

*The number of times of jamming during conveying was 10 times.
**The number of times of error made when evaluation was made 100 times.

It is apparent from Table 20 that in the sample of the present invention wherein the light-sensitive layer side is outwardly wound-up under low humidity conditions (20% RH) the wound-up shape can be greatly recovered in comparison with Comparative Examples A, B and C. This is because gelatin in the light-sensitive layers is shrunk under low humidity conditions and functions so as to allow curl to be recovered. On the other hand, when the light-sensitive layer side is inwardly wound up and placed under low humidity conditions as in Comparative Example B, curl is increased by the shrinking power of gelatin. Gelatin in the light-sensitive layers is apt to expand under high humidity conditions (60% RH), but modulus is reduced by the plasticizing effect of water. Hence, gelatin scarcely contributes to the recovery of wound-up shape. Accordingly, the results are scarcely changed as shown in Comparative Examples A to C even when the light-sensitive layer side is wound-up outwardly or inwardly.

When winding smoothness is improved as in the present invention, the property with regard to jamming during conveying in the printer can be greatly improved. Further, out-of-focus during printing can be reduced. This is because the property with regard to a lowering in the flatness of negative film within the printer caused by the shape of winding is improved. Further, the property with regard to failure in the contact with the magnetic head caused by a lowering in winding smoothness can be improved, and input and output error can be lowered. Furthermore, winding can be smoothly made and the film base can be readily taken out straight from the patrone, and hence delivery torque can be improved.

As described above, the problems which can not be solved by prior art can be solved by winding up outwardly the light-sensitive layer side and handling the film under low humidity conditions as in the present invention.

EXAMPLE 21

(21-1) Preparation of Support

A support comprising a thin PET film containing a magnetic substance was coated on one side of a PET support by coextrusion method as described below to prepare a film.

Starting material A
Polyethylene terephthalate
Starting material B

| Polyethylene terephthalate | 100 parts by weight |
| Fe metal magnetic substance (needle particles, specific surface area: 35 m²/g, Hc = 920 Oe) | 4.0 parts by weight |

The starting materials A and B were dried in conventional manner and extruded by using a co-extrusion die having two lips. Two lips on both ends of the co-extrusion die were spaced away from each other so that the starting materials gave the thicknesses of 300 μm and 10 μm after extrusion, respectively. The extrusion was carried out at 280° C.

The resulting film was oriented 3.5 times in the longitudinal direction at 90° C. and then 3.7 times in the crosswise direction at 95° C. The thus biaxially oriented film was fixed at 200° C. for 5 seconds.

The overall thickness of the thus-obtained support was 98 μm, and the thickness of the magnetic layer was 3 μm.

(21-2) Coating of Back Layer and Undercoat Layer (1) Coating of Undercoat Layer

One side of the support prepared in the above (21-1) was subjected to a corona discharge treatment and then coated with the following undercoat layer. The degree of the corona discharge treatment was 0.02 KVA·min/m².

| Gelatin | 3 g |
|---|---|
| Distilled water | 250 cc |
| Sodium α-sulfo-di-(2-ethylhexyl)succinate | 0.05 g |
| Formaldehyde | 0.02 g |

(2) Coating of Back Layer of Photographic Film (i) Coating of First Back Layer

The following first back layer was coated on the undercoated support.

Preparation of Dispersion of Tin Oxide-antimony Oxide Composite Material 230 parts by weight of stannic chloride hydrate and 23 parts by weight of antimony trichloride were dissolved in 3000 parts by weight of ethanol to obtain a uniform solution. An aqueous solution of 1N sodium hydroxide was added dropwise to the resulting solution until the pH of the solution reached 3 to obtain a coprecipitate of colloidal stannic oxide and antimony oxide. The resulting co-precipitate was left to stand at 50° C. for 24 hours to obtain a reddish brown colloidal precipitate.

The reddish brown colloidal precipitate was separated by centrifugation. Water was added to the precipitate to remove an excess of ion, and the precipitate was washed with water by centrifugation. This operation was repeated three times to remove an excess of ion.

After an excess of ion was removed, 200 parts by weight of the colloidal precipitate was re-dispersed in 1500 parts by weight of water. The dispersion was sprayed into a calcining furnace heated to 600° C. to obtain fine powder of bluish tin oxide-antimony oxide composite material having an average particle size of 0.2μ. The fine powder had a resistivity of 25 Ω·cm.

The pH of a mixed solution of 40 parts by weight of the above fine powder and 60 parts by weight of water was adjusted to 7.0, and the mixture was roughly dispersed by means of a stirrer, and then dispersed in a horizontal sand mill (trade name: Dainomill, a product of willya Bachofen AG) until residence time reached 30 minutes to prepare the desired dispersion.

Coating of Back Layer

The following formulation (A) was coated in such an amount as to give a dry film of 0.3μ, and the coated support was dried at 130° C. for 30 seconds.

| Formulation A | |
|---|---|
| | Parts by weight |
| Dispersion of electrically conductive fine particles | 10 |
| Gelatin | 1 |
| Water | 27 |
| Methanol | 60 |
| Resorcin | 2 |
| Polyoxyethylene nonylphenyl ether | 0.01 |

(ii) Coating of Second Back Layer

The following magnetic recording layer was coated on the first back layer prepared in the above (i).

| Gelatin | 0.2 g/m² |
|---|---|
| Poly(sodium styrenesulfonate) | 0.005 g/m² |
| Sodium α-sulfo-di(2-ethylhexyl)-succinate | 0.005 g/m² |
| Poly(ethyl acrylate) (average particle size: 0.1 μm) | 0.01 g/m² |
| Carboxymethyl cellulose | 0.005 g/m² |
| Sodium dodecylbenzenesulfonate | 0.003 g/m² |
| 2-Hydroxy-4,6-dichloro-1,3,5-triazine | 0.01 g/m² |

(iii) Coating of Third Back Layer

The following third back layer was coated on the second back layer, thus obtaining each support having the back layers for light-sensitive material.

| Gelatin | 0.32 g/m² |
|---|---|
| Aerosil | 0.02 g/m² |
| Sodium dodecylbenzenesulfonate | 0.02 g/m² |
| $(n)C_{15}H_{31}COOC_{40}H_{81}(n)$ | 0.02 g/m² |
| Matting agent Poly(methyl methacrylate/divinylbenzene) (90:10 by mol, average particle size: 1.2 μm) | 0.02 g/m² |
| $C_{21}H_{43}COOCH_2CH_2C_8F_{17}(n)$ | 0.01 g/m² |
| $(CH_2=CHSO_2NHCH_2)_2$ | 0.01 g/m² |

The resulting back side had a coercive force ranging from 800 to 900 Oe and was good.

(21-3) Preparation of Light-sensitive Material

Other side (side opposed to the back layer side) of each of the undercoated film supports was subjected to a corona discharge treatment and then coated with the following layers having the following compositions to prepare a multi-layer color light-sensitive material which was a photographic film.

Composition of Light-sensitive Layer

Light-sensitive layers were prepared in the same manner as in the preparation of the light-sensitive layers of Example 1 of JP-A-2-93641.

The layer structure of the thus-prepared photographic material is shown in FIG. 12.

(21-4) Processing of Sample

The processing of sample was carried out in the same manner as in Example 20.

(21-5) Development Photographic Film

Development was carried out in the same manner as in Example 20.

(21-6) Housing of Developed Film in Patrone and Core Set

The above film was again rolled up in the same patrone in which the film was housed before development. The size of the patrone was such that the outer diameter of the spool was 11 mm and the inner diameter of the patrone was 22 mm. The film was wound up in the patrone in such a manner that the light-sensitive layer side was outwardly positioned. For the purpose of comparison, another film was wound up in another patrone in such a manner that the light-sensitive layer side was inwardly positioned.

For the purpose of comparison, a patrone having an outer diameter of 35 mm and an inner diameter of 60 mm which was outside the scope of the size of the present invention was used. A film was wound up in the patrone in such a manner that the light sensitive layer side was positioned outwardly or inwardly.

These samples were left to stand in an air constant temperature bath at 60° C. for 18 hours to fix the shape of the film in the wound-up form. The samples were then moisture-conditioned at 25° C. and 60% RH for 3 hours. Subsequently, these samples were used for evaluation.

(21-7) Evaluation of Performance

The items and contents of the evaluation of performance are the same as described in Example 20.

(21-8) Results of Evaluation

The results are shown in Table 21.

| Dope | |
|---|---|
| Polycarbonate | 100 parts by weight |
| Dichloromethane | 700 parts by weight |

The dope was cast on a casting band to obtain a polycarbonate (hereinafter abbreviated to PC) film of 115 $\mu$m in thickness.

A polycarbonate dope solution containing $\gamma$-$Fe_2O_3$ (specific surface area: 25 $m^2/g$, a product of Pfeizer, U.S.A.) dispersed therein was coated on the polycarbonate film by using a Giesser provided with partition chamber so as to allow the dope to be coated in a striped form, thus preparing a film base having a striped mag-

TABLE 22

| Type of winding | Patrone (out diameter mm of spool) (inner diameter mm of patrons) | Atmosphere for evaluation (mm) | Winding smoothness (inmost diameter) (times) | Jamming during conveying in printer* | Out-of-focus during printing (times) | Magnetic input and output error** (g) | Delivery torque (%) | Water content in gelatin layer | |
|---|---|---|---|---|---|---|---|---|---|
| Light-sensitive layer side outwardly wound up | 11 22 | 25° C. 20% RH | 35 | 0 | ○ | 2 | 210 | 8.6 | invention |
| Light-sensitive layer side outwardly wound up | 11 22 | 25° C. 60% RH | 17 | 3 | △ | 9 | 240 | 18.2 | Comp. Ex. D |
| Light-sensitive layer side inwardly wound up | 11 22 | 25° C. 20% RH | 12 | 6 | x | 17 | 330 | 8.2 | Comp. Ex. E |
| Light-sensitive layer side inwardly wound up | 11 22 | 25° C. 60% RH | 18 | 3 | △ | 8 | 230 | 18.4 | Comp. Ex. F |
| Light-sensitive layer side outwardly wound up | 35 60 | 25° C. 20% RH | 38 | 0 | ○ | 1 | 200 | 8.4 | Comp. Ex. G |
| Light-sensitive layer side outwardly wound up | 35 60 | 25° C. 60% RH | 34 | 0 | ○ | 2 | 200 | 18.2 | Comp. Ex. H |
| Light-sensitive layer side inwardly wound up | 35 60 | 25° C. 20% RH | 35 | 0 | ○ | 1 | 190 | 8.8 | Comp. Ex. I |
| Light-sensitive layer side inwardly wound up | 35 60 | 25° C. 60% RH | 35 | 0 | ○ | 1 | 210 | 17.5 | Comp. Ex. J |

*The number of times of jamming during conveying was 10 times.
**The number of times of error made when evaluation was made 100 times.

It is clear from the results of the present invention and Comparative Examples D, E and F shown in Table 21 that a similar effect can be obtained even when the similar PET base to that of Example 20 is used. Embodiments wherein a patrone having a size larger than that defined by the present invention is used are shown by Comparative Examples G, H, I and J in Table 21. In the present invention, performance comparable with that obtained by these Comparative Examples can be obtained by using a small-sized patrone having a size of about $\frac{1}{3}$ of that of the Comparative Examples. When a patrone having a large diameter as used in Comparative Examples G, H, I and J is used, winding can be smoothly made from the beginning. Hence, a remarkable effect is not found when the present invention is applied to such a large-sized patrone.

EXAMPLE 22

(22-1) Preparation Of Support

A dope of a polycarbonate obtained from the condensation of $COCl_2$ and bisphenol A was prepared.

netic recording layer of 2 $\mu$m in thickness. The coating weight of $\gamma$-$Fe_2O_3$ was 2.5 $g/m^2$. The width and position of the stripe were controlled so that the stripe was not broken into image area after the preparation of the film.

The base was subjected to a corona discharge treatment and then coated with gelatin (0.2 $g/m^2$), poly(degree of polymerization: 10)-oxyethylene dodecyl ether (2 $mg/m^2$) and ($CH_2$=CH—$SO_2NHCH_2$)$_2$— (10 $mg/m^2$). Further, the following back layers were coated on the base to prepare a base for light-sensitive material. The side having the magnetic recording layer was the back layer side.

(22-2) Preparation of Back Layer Side (i) First Back Layer

| Gelatin | 0.12 $g/m^2$ |
|---|---|
| Polysodium acrylate (average MW = 150,000) | 0.03 $g/m^2$ |
| Fine particles of $SnO_2/Sb_2O_3/SiO_2$ (90/10/1 by mol, average particle size: 0.12 $\mu$m) | 0.2 $g/m^2$ |
| Sodium dodecylbenzenesulfonate | 0.02 $g/m^2$ |

(ii) Second Back Layer

| | |
|---|---|
| Gelatin | 0.5 g/m² |
| Polymethyl methacrylate (average particle size: 1.5 μm) | 0.02 g/m² |
| Cetyl stearate (dispersed by using sodium dodecylbenzenesulfonate) | 0.01 g/m² |
| Sodium di(2-ethylhexyl) sulfosuccinate | 0.01 g/m² |
| $\underset{\mid}{C_3H_7}$<br>$C_8F_{17}SO_2NCH_2COOK$ | 0.01 g/m² |

(22-3) Preparation of Light-sensitive Layer

The following undercoat layer was coated on other side (side opposed to the back layer side) of the support having the back layers prepared in the above (22-2).

| | |
|---|---|
| Gelatin | 10 parts by weight |
| Water | 20 parts by weight |
| Acetic acid | 40 parts by weight |
| Methanol | 400 parts by weight |
| Acetone | 550 parts by weight |

After coating, drying was conducted at 60° C. for 15 minutes.

The reversal color emulsion layers of the sample 101 of Example 1 of JP-A-2-854 were coated on the undercoat layer in the same manner as in Example 1 of JP-A-2-854.

The layer structure of the thus-prepared photographic film is shown in FIG. 13.

(22-4) Processing of Sample

The processing of sample was conducted in the same manner as in Example 20.

(22-5) Development of Photographic Film

The following reversal color development was carried out.

| Processing stage | Time | Temp. |
|---|---|---|
| First development | 6 min | 38° C. |
| Rinse | 2 min | 38° C. |
| Reversal | 2 min | 38° C. |
| Color development | 6 min | 38° C. |
| Compensation | 2 min | 38° C. |
| Bleaching | 6 min | 38° C. |
| Fixing | 4 min | 38° C. |
| Rinse | 4 min | 38° C. |
| Stabilization | 1 min | 25° C. |

Each processing solution had the following composition.

| First developing solution | |
|---|---|
| Pentasodium nitrilo-N,N,N-trimethylenephosphonate | 2.0 g |
| Sodium sulfite | 30 g |
| Potassium hydroquinone monosulfate | 20 g |
| Potassium carbonate | 33 g |
| 1-Phenyl-4-methyl-4-hydroxymethyl-3-pyrazolidone | 2.0 g |
| Potassium bromide | 2.5 g |
| Potassium thiocyanate | 1.2 g |
| Potassium iodide | 2.0 mg |
| Water to make | 1000 ml |

| -continued | |
|---|---|
| First developing solution | |
| pH | 9.60 | pH was adjusted with hydrochloric acid or potassium hydroxide.

| Reversal bath | |
|---|---|
| Pentasodium nitrilo-N,N,N-trimethylenephosphonate | 3.0 g |
| Stannous chloride dihydrate | 1.0 g |
| p-Aminophenol | 0.1 g |
| Sodium hydroxide | 8 g |
| Glacial acetic acid | 15 ml |
| Water to make | 1000 ml |
| pH | 6.00 | pH was adjusted with hydrochloric acid or sodium hydroxide.

| Color developing solution | |
|---|---|
| Pentasodium nitrilo-N,N,N-trimethylenephosphonate | 2.0 g |
| Sodium sulfite | 7.0 g |
| Sodium tertiary phosphate dodecahydrate | 36 g |
| Potassium bromide | 1.0 g |
| Potassium iodide | 90 mg |
| Sodium hydroxide | 3.0 g |
| Citrazinic acid | 1.5 g |
| N-Ethyl-N-($\beta$-methanesulfonamidoethyl)-3-methyl-4-aminoaniline sulfate | 11 g |
| 3,6-Dithiaoctane-1,8-diol | 1.0 g |
| Water to make | 1000 ml |
| pH | 11.80 | pH was adjusted with hydrochloric acid or potassium hydroxide.

| Compensating solution | |
|---|---|
| Disodium ethylenediaminetetraacetate dihydrate | 8.0 g |
| Sodium sulfite | 12 g |
| 1-Thioglycerin | 0.4 ml |
| Water to make | 1000 ml |
| pH | 6.20 | pH was adjusted with hydrochloric acid or sodium hydroxide.

| Bleaching solution | |
|---|---|
| Disodium ethylenediaminetetraacetate dihydrate | 2.0 g |
| Ammonium(ethylenediamine tetracetate) Fe(III) dihydrate | 120 g |
| Potassium bromide | 100 g |
| Ammonium nitrate | 10 g |
| Water to make | 1000 ml |
| pH | 5.70 | pH was adjusted with hydrochloric acid or sodium hydroxide.

| Fixing solution | |
|---|---|
| Sodium thiosulfate | 80 g |
| Sodium sulfite | 5.0 g |
| Sodium bisulfite | 5.0 g |

| Fixing solution | |
| --- | --- |
| Water to make | 1000 ml |
| pH | 6.60 | pH was adjusted with hydrochloric acid or ammonia water.

| Stabilizing solution | |
| --- | --- |
| Formalin (37%) | 5.0 ml |
| Polyoxyethylene p-monononylphenyl ether (average degree of polymerization: 10) | 0.5 ml |
| Water to make | 1000 ml |
| pH | not adjusted |

(20-6) Housing of Developed Film in Patrone and Core Set

The above film was again rolled up in the same patrone in which the film was housed before development. The patrone had such a size that the outer diameter of the spool was 7.5 mm and the inner diameter of the main body of the patrone was 20 mm. The film was wound up in the patrone in such a manner that the light-sensitive layer side was outwardly positioned. For the purpose of comparison, another film was wound up in another patrone in such a manner that the light-sensitive layer side was inwardly positioned.

These samples were left to stand in an air constant temperature bath at 60° C. for 18 hours to fix the shape of the film in the wound-up form. The samples were then moisture-conditioned at 25° C. and 60% RH for 3 hours. Subsequently, the samples were used for evaluation.

(22-7) Evaluation of Performance

There were prepared samples wherein the film was wound up so that the light sensitive layer side was outwardly positioned and samples wherein the film was wound up so that the light-sensitive layer side was inwardly positioned. Each sample was moisture-conditioned in a desiccator for 3 hours, said desiccator being moisture-conditioned at 25° C. and 10% RH or at 25° C. and 70% RH. The sample was taken out of the desiccator and transferred into an atmosphere of. 25° C. and 60% RH. After 10 minutes, the evaluation described in Example 20 was made.

When the whole of a laboratory is dried to low humidity in carrying out practically processing in the laboratory, costs are increased and working atmosphere is not preferred. Accordingly, the sample was stored in the low-humidity desiccator to remove water in the light-sensitive layers during storage and the sample was then passed through a printer to thereby examine the effect of the present invention. The moisture absorption behavior of the light-sensitive layers is reversible. Hence, when the sample is left to stand in a general atmosphere, the sample absorbs moisture and the effect of the present invention is reduced. Accordingly, it is desirable that the sample is fed to the printer within 30 minutes, more preferably within 20 minutes after the sample is taken out of the desiccator.

(22-8) Results of Evaluation

The results are shown in Table 22.

TABLE 22

| Type of winding | Atmosphere during temporarily storage in desiccator*** | Winding smoothness (inmost diameter) (mm) | Jamming during conveying in printer* (times) | Out-of-focus during printing | Magnetic input and output error** (times) | Delivery torque (g) | Water content in gelatin layer (%) | |
| --- | --- | --- | --- | --- | --- | --- | --- | --- |
| Light-sensitive layer side outwardly wound up | 25° C. 10% RH | 40 | 0 | ○ | 0 | 200 | 7.0 | invention |
| Light-sensitive layer side outwardly wound up | 25° C. 70% RH | 20 | 2 | Δ | 7 | 250 | 20.5 | Comp. Ex. K |
| Light-sensitive layer side inwardly wound up | 25° C. 10% RH | 16 | 5 | x | 10 | 270 | 7.1 | Comp. Ex. L |
| Light-sensitive layer side inwardly wound up | 25° C. 70% RH | 22 | 2 | Δ | 8 | 240 | 20.9 | Comp. Ex. N |

*The number of times of jamming during conveying was 10 times.
**The number of times of error made when evaluation was made 100 times.
***After the sample was moisture-conditioned in the desiccator in the above atmosphere for 3 hours, the sample was transferred into a chamber which was moisture-conditioned at 65° C. and 60% RH, and after 10 min., evaluation was made.

It is clear that the present invention is effective in a method wherein the sample is moisture-conditioned in the desiccator and taken out just before printing, and printing is conducted.

EXAMPLE 23

(23-1) Preparation of Support

There was prepared a support comprising a polyester copolymer capable of recovering winding shape by allowing water to be absorbed during developing by copolymerizing dimethyl 5-sodium-sulfoisophthalate having a water absorbing group and utilizing the resulting copolymer as a plasticizer in the following manner.

0.1 part by weight of calcium acetate and 0.03 part by weight of antimony trioxide were added to 100 parts by weight of dimethyl terephthalate, 70 parts by weight of ethylene glycol, 10 parts by weight of dimethyl 5-sodium-sulfoisophthalate and 10 parts by weight of dimethyl adipate. An ester exchange reaction was carried out in a conventional manner. To the resulting product was added 0.05 part by weight of trimethyl phosphate. The temperature of the mixture was gradually elevated and pressure was reduced. Finally, polymerization was carried out at 280° C. under a pressure of 1 mmHg or below to obtain a copolymer polyethylene terephthalate A. The copolymer terephthalate A was dried in a conventional manner, and melt-extruded at 280° C. to obtain an unoriented sheet. The sheet was oriented 3.5 times in the longitudinal direction at 90° C. and then 3.7 times in the crosswise direction at 95° C. The film was heat-fixed at 200° C. for 5 seconds to obtain a biaxially oriented film of 100 μm in thickness.

(23-2) Coating of Lack Layer and Undercoat Layer (1) Coating of Undercoat Layer

The undercoat layer was coated in the same manner as described in (1) of Example 21-2.

(2) Coating of Back Layer Photographic Film (i) Coating of First Back Layer

The first back layer was coated in the same manner as described in (2-i) of Example 21-2.

(ii) Coating of Second Back Layer

| | |
|---|---|
| Butyl acetate/vinyl chloride copolymer (1:1 by mol) | 0.5 g/m$^2$ |
| Fine powder of Co-doped iron oxide (specific surface area: 45 m$^2$/g) | 0.2 g/m$^2$ |
| Fine powder of Co-doped iron oxide (specific surface area: 80 m$^2$/g) | 0.1 g/m$^2$ |
| Fine powder of barium ferrite (specific surface area: 15 m$^2$/g) | 0.2 g/m$^2$ |
| Fine powder of barium ferrite (specific surface area: 40 m$^2$/g) | 0.1 g/m$^2$ |
| Toluene diisocyanate | 0.5 g/m$^2$ |
| Polyurethane resin | 0.1 g/m$^2$ |
| Triacetylcellulose | 0.1 g/m$^2$ |

The above layer having the above composition was coated on a photographic film of 35 mm in width in such a manner that both sides of the film was coated therewith, each coated side being 4 mm width. Other area than both sides coated above was coated with a butyl acetate/vinyl chloride (1:1 by mol) copolymer (0.5 g/m$^2$), triacetylcellulose (0.2 g/m$^2$) and toluene diisocyanate (0.5 g/m$^2$) through a spacer.

(iii) Coating of Third Back Layer

A layer having the following composition was coated on the whole surface to provide a transparent magnetic substance layer.

| | |
|---|---|
| Butyl acetate/vinyl chloride copolymer (1:1 by mol) | 0.5 g/m$^2$ |
| Fine powder of Co-doped iron oxide (specific surface area: 45 m$^2$/g) | 0.03 g/m$^2$ |
| Fine powder of Co-doped iron oxide (specific surface area: 80 m$^2$/g) | 0.03 g/m$^2$ |
| Fine powder of barium ferrite (specific surface area: 15 m$^2$/g) | 0.03 g/m$^2$ |
| Fine powder of barium ferrite (specific surface area: 40 m$^2$/g) | 0.03 g/m$^2$ |
| Toluene diisocyanate | 0.5 g/m$^2$ |
| Polyurethane resin | 0.1 g/m$^2$ |
| Triacetylcellulose | 0.1 g/m$^2$ |

(iv) Coating of Fourth Back Layer

A layer having the following composition was coated on the whole surface.

| | |
|---|---|
| Diacetylcellulose | 0.2 g/m$^2$ |
| Colloidal sil (Aerosil) | 0.02 g/m$^2$ |
| $C_{15}H_{31}COOC_{40}H_{81}$ | 0.02 g/m$^2$ |
| $C_{21}H_{43}COO(CH_2CH_2O)_3$—$COC_9F_{19}$ | 0.01 g/m$^2$ |
| Poly(vinylidene difluoride/vinylidene tetrafluoride) (9:1 by mol) | 0.01 g/m$^2$ |
| Poly(methyl methacrylate/divinylbenzene)(9:1 by mol, average particle size: 1.0 μm) | 0.03 g/m$^2$ |
| Silica (average particle size: 1.0 μm) | 0.005 g/m$^2$ |

Both sides of the resulting back layer side had a coercive force of 1200 to 1300 Oe, and other area thereof had a coercive force of 950 to 1000 Oe.

(23-3) Preparation of Light-sensitive Material

Light-sensitive layers were coated on each of the undercoated film supports in the same manner as in Example 20. The layer structure of the thus-prepared photographic film is shown in FIG. 14.

(23-4) Processing of Sample

The processing of sample was conducted in the same manner as in Example 20.

(23-5) Development of Photographic Film

Development was conducted in the same manner as in Example 20.

(23-6) Housing of Developed Film in Patrone and core set

This was conducted in the same manner as in Example 20.

(23-7) Evaluation of Performance

The items and contents of the evaluation of performance are the same as those of Example 20.

(23-8) Results of Evaluation

The results are shown in Table 23.

TABLE 23

| Type of winding | Atmosphere for evaluation | Winding smoothness (inmost diameter) (mm) | Jamming during conveying in printer* (times) | Out-of-focus during printing | Magnetic input and output error** (times) | Delivery torque (g) | Water content in gelatin layer (%) | |
|---|---|---|---|---|---|---|---|---|
| Light-sensitive layer side outwardly wound up | 25° C. 20% RH | 34 | 0 | ○ | 1 | 210 | 7.8 | invention |
| Light-sensitive layer side outwardly wound up | 25° C. 60% RH | 16 | 5 | Δ | 10 | 270 | 17.5 | Comp. Ex. O |
| Light-sensitive layer side inwardly wound up | 25° C. 20% RH | 11 | 9 | x | 27 | 360 | 7.9 | Comp. Ex. P |
| Light-sensitive layer side in- | 25° C. 60% RH | 17 | 6 | Δ | 10 | 260 | 17.7 | Comp. Ex. Q |

TABLE 23-continued

| Type of winding | Atmosphere for evaluation | Winding smoothness (inmost diameter) (mm) | Jamming during conveying in printer* (times) | Out-of-focus during printing | Magnetic input and output error** (times) | Delivery torque (g) | Water content in gelatin layer (%) |
|---|---|---|---|---|---|---|---|
| wardly wound up | | | | | | | |

*The number of times of jamming during conveying was 10 times.
**The number of times of error made when evaluation was made 100 times.

It is clear from Table 23 that the effect of the present invention can be obtained even when the modified polyester is used.

While the invention has been described in detail and with reference to specific embodiments thereof, it will be apparent to one skilled in the art that various changes and modifications can be made therein without departing from the spirit and scope thereof.

What is claimed is:

1. A photographic material comprising (1) a silver halide photographic material which has a magnetic recording layer having a coercive force of at least 400 Oe provided on a transparent support, and (2) a patrone for silver halide photographic materials wherein a leading end of a silver halide photographic material wound around a spool is delivered from a film leading-out port of a main body of the patrone to the outside by rotating said spool in the direction of film delivery, said spool being rotatably provided in the main body of the patrone, wherein the magnetic recording layer has a ferromagnetic fine powder content of from $4 \times 10^{-3}$ to 1 g/m$^2$ of the support, wherein the magnetic recording layer is present either on the whole surface of the back of the support or in a stripe form on the back of the support.

2. A photographic material as in claim 1, wherein said magnetic recording layer is in the form of at least one stripe.

3. A photographic material as in claim 2, wherein said silver halide photographic material has a non-magnetic recording layer having the same thickness as that of said magnetic recording layer, and the thickness of said photographic material is uniform throughout the whole thereof.

4. A photographic material as in claim 2, wherein said magnetic recording layer is striped by a coating, printing, depositing or heat transfer method.

5. A photographic material as in claim 1, wherein both sides of said silver halide photographic material have a coefficient of static friction of not higher than 0.25.

6. A photographic material as in claim 5, wherein said photographic material contains a slip agent in such an amount that both sides thereof have a coefficient of static friction of not higher than 0.25.

7. A photographic material as in claim 6, wherein said slip agent is selected from the group consisting of silicone compounds and higher fatty acid esters.

8. A photographic material as in claim 7, wherein said silicone compounds are polydimethylsiloxane and derivatives thereof.

9. A photographic material as in claim 7, wherein said higher fatty acid esters are compounds represented by the following general formula

(III)

wherein $R_6$ and $R_7$ each represent an alkyl group, an alkenyl group, an allylalkyl group or an aralkyl group each having 1 to 60 carbon atoms and the total of carbon atoms in $R_6$ and $R_7$ is at least 10; and $l_1$, $m_1$ and $n_1$ each represent an integer of 1 to 6.

10. A photographic material as in claim 1, wherein said silver halide photographic material is a developed silver halide photographic material.

11. A photographic material as in claim 1, wherein said silver halide photographic material has a light sensitive layer side and is wound up in the patrone in such a manner that the light-sensitive layer side thereof is outwardly positioned.

12. A photographic material as in claim 11, wherein said silver halide photographic material has a gelatin layer, and wherein printing is conducted under such condition that the water content of the gelatin layer of said silver halide photographic material is not higher than 14% by weight based on the total amount of gelatin.

13. A photographic material as in claim 1, wherein said magnetic recording layer contains at least one magnetic material selected from the group consisting of ferromagnetic iron oxide, Co-doped ferromagnetic iron oxide, ferromagnetic chromium dioxide, ferromagnetic alloys, ferromagnetic metals and barium ferrite.

14. A photographic material as in claim 1, wherein said silver halide photographic material is a color photographic material.

15. A photographic material as in claim 1, wherein the outermost layer on the back layer side of said silver halide photographic material contains a matting agent having an average particle size of 1 to 3 μm.

16. A photographic material as in claim 1, wherein the magnetic recording layer has a ferromagnetic fine powder content of from $4 \times 10^{-3}$ to 0.5 g/m$^2$ of the support.

* * * * *